(12) United States Patent
Tanaka et al.

(10) Patent No.: US 9,635,354 B2
(45) Date of Patent: Apr. 25, 2017

(54) IMAGE PROCESSING DEVICE AND METHOD

(71) Applicant: SONY CORPORATION, Tokyo (JP)

(72) Inventors: Junichi Tanaka, Kanagawa (JP); Ohji Nakagami, Tokyo (JP); Yoshitaka Morigami, Tokyo (JP)

(73) Assignee: SONY CORPORATION, Tokyo (JP)

( * ) Notice: Subject to any disclaimer, the term of this patent is extended or adjusted under 35 U.S.C. 154(b) by 326 days.

(21) Appl. No.: 14/359,765

(22) PCT Filed: Nov. 30, 2012

(86) PCT No.: PCT/JP2012/081057
§ 371 (c)(1),
(2) Date: May 21, 2014

(87) PCT Pub. No.: WO2013/094385
PCT Pub. Date: Jun. 27, 2013

(65) Prior Publication Data
US 2014/0321539 A1    Oct. 30, 2014

(30) Foreign Application Priority Data

Dec. 19, 2011 (JP) ................................ 2011-277745
Jan. 18, 2012 (JP) ................................ 2012-008462
Feb. 24, 2012 (JP) ................................ 2012-039216

(51) Int. Cl.
*H04N 19/124* (2014.01)
*H04N 19/126* (2014.01)
(Continued)

(52) U.S. Cl.
CPC ..... *H04N 19/00096* (2013.01); *H04N 19/103* (2014.11); *H04N 19/126* (2014.11);
(Continued)

(58) Field of Classification Search
CPC ........... H04N 19/00096; H04N 19/103; H04N 19/126; H04N 19/30; H04N 19/463;
(Continued)

(56) References Cited

U.S. PATENT DOCUMENTS

2006/0159165 A1* 7/2006 Lu .................. H04N 19/105
375/240.03
2007/0189626 A1* 8/2007 Tanizawa ............. H04N 19/176
382/251

(Continued)

FOREIGN PATENT DOCUMENTS

JP    2004-254327 A    9/2004

OTHER PUBLICATIONS

Zhou et al., Non-CE04: Carriage of large block size quantization matrices with up-sampling, Nov. 9, 2011, JCTVC-G094, pp. 1-6.*

(Continued)

*Primary Examiner* — Christopher S Kelley
*Assistant Examiner* — Kathleen Walsh
(74) *Attorney, Agent, or Firm* — Oblon, McClelland, Maier & Neustadt, L.L.P.

(57) ABSTRACT

The present disclosure relates to an image processing device and method that enable suppression of an increase in the amount of coding of a quantization matrix.
An image processing device of the present disclosure includes an up-conversion unit configured to up-convert a quantization matrix limited to a size less than or equal to a transmission size that is a maximum size allowed for transmission, from the transmission size to a size that is identical to a block size that is a processing unit of quantization or dequantization. The present disclosure is applicable to, for example, an image processing device for processing image data.

10 Claims, 39 Drawing Sheets

(51) Int. Cl.
H04N 19/70 (2014.01)
H04N 19/593 (2014.01)
H04N 19/103 (2014.01)
H04N 19/463 (2014.01)
H04N 19/59 (2014.01)
H04N 19/597 (2014.01)
H04N 19/30 (2014.01)

(52) U.S. Cl.
CPC .......... H04N 19/463 (2014.11); H04N 19/59 (2014.11); H04N 19/593 (2014.11); H04N 19/70 (2014.11); H04N 19/30 (2014.11); H04N 19/597 (2014.11)

(58) Field of Classification Search
CPC .... H04N 19/59; H04N 19/593; H04N 19/597; H04N 19/70
USPC ...................................... 375/240.03
See application file for complete search history.

(56) References Cited

U.S. PATENT DOCUMENTS

| 2011/0135000 A1* | 6/2011 | Alshina | H04N 19/105 375/240.13 |
| 2012/0140815 A1* | 6/2012 | Zhou | H04N 19/117 375/240.03 |

OTHER PUBLICATIONS

Zhang et al., Method and syntax for quantization matrices representation, Nov. 9, 2011, JCTVC-G152, pp. 1-8.*
Japanese Office Action issued Nov. 5, 2015 in Patent Application No. 2013-550202 (without English Translation).
Japanese Office Action issued Nov. 5, 2015 in Patent Application No. 2015-033125 (without English Translation).
Office Action issued Feb. 16, 2016 in Japanese Patent Application No. 2015-033125.
Combined Search Report and Examination Report issued Apr. 14, 2015 in Singapore Patent Application No. 11201402920T.
International Search Report issued Mar. 5, 2013 in PCT/JP2012/081057.
Minhua Zhou, et al. "Non-CE04: Carriage of large block size quantization matrices with up-sampling" Joint Collaborative Team on Video Coding (JCT-VC) of ITU-T SG16 WP3 and ISO/IEC JTC1/SC29/WG11 $7^{th}$ Meeting, Nov. 19-30, 2011, 6 pages.
Ximin Zhang, et al. "Method and syntax for quantization matrices representation" Joint Collaborative Team on Video Coding (JCT-VC) of ITU-T SG16 WP3 and ISO/IEC JTC1/SC29/WG11 $7^{th}$ Meeting, Nov. 21-30, 2011, 8 pages.
Junichi Tanaka, et al. "Quantization Matrix for HEVC" Joint Collaborative Team on Video Coding (JCT-VC) of ITU-T SG16 WP3 and ISO/IEC JTC1/SC29/WG11 $5^{th}$ Meeting, Mar. 16-23, 2011, 24 pages.
JCTVC-B205 "Test Model under Consideration" Joint Collaborative Team on Video Coding (JCT-VC) of ITU-T SG16 WP3 and ISO/IEC JTC1/SC29/WG11 2nd Meeting, Jul. 21-28, 2010, 198 pages.
VCEG-ADO6 "Adaptive Quantization Matrix Selection on KTA Software" ITU Telecommunications Standardization Sector $30^{th}$ Meeting, Oct. 23-24, 2006, 5 pages.
Extended Search Report issued Jun. 19, 2015 in European Patent Application No. 12860469.1.
Akiyuki Tanizawa, et al., "Simulation results of Adaptive Quantization Matrix Selection on KTA Software", Proposal, Q.6/SG16 (VCEG), ITU—Telecommunications Standardization Sector Document VCEG-AC07 Study Group 16 Question 6, Video Coding Experts Group (VCEG), Filename: VCEG-AC07.doc, Jul. 13, 2006, 4 pages.
Munsi Haque, et al., "HVS Model based Default Quantization Matrices", Input Document to JCT-VC, Sony Electronics Inc./Sony Corp., Joint Collaborative Team on Video Coding (JCT-VC) of ITU-T SG16 WP3 and ISO/IEC JTC1/SC29AVG11 7th Meeting: Geneva, CH, Nov. 21-30, 2011, Document: JCTVC-G0880, WG11 No. m22458, 14 pages.
U.S. Appl. No. 14/375,260, filed Jul. 29, 2014, Tanaka, et al.
U.S. Appl. No. 14/375,357, filed Jul. 29, 2014, Tanaka, et al.
U.S. Appl. No. 14/375,288, filed Jul. 29, 2014, Tanaka, et al.
U.S. Appl. No. 14/375,304, filed Jul. 29, 2014, Tanaka, et al.
Office Action issued Jan. 24, 2017 in Chinese Patent Application No. 201280061142.8 (with English Translation).

* cited by examiner

FIG. 8

| | Descriptor |
|---|---|
| Qscale0: QUANTIZATION VALUE FOR REGION 0 | ue(v) |
| Qscale1: QUANTIZATION VALUE FOR REGION 1 | ue(v) |
| Qscale2: QUANTIZATION VALUE FOR REGION 2 | ue(v) |
| Qscale3: QUANTIZATION VALUE FOR REGION 3 | ue(v) |
| for(SizeID = 0;SizeID<4;SizeID ++){ | |
| for(MatrixID = 0;MatrixID<(SizeID == 3)?2:6;MatrixID ++){ | |
| pred_mode: PREDICTION MODE FOR MATRIX | ue(v) |
| if(pred_mode == 0){ //Copy | |
| pred_matrix_id_delta: USED FOR PREDICTION OF MatrixID.  pred_matrix_id= MatrixID - (pred_matrix_id_delta + 1); | ue(v) |
| }else if(pred_mode == 1){ //Pred of arbitary size | |
| pred_matrix_id_delta: USED FOR PREDICTION OF MatrixID.  pred_matrix_id= MatrixID + pred_matrix_id_delta; | se(v) |
| pred_size_id_delta: USED FOR PREDICTION OF MatrixID.  pred_size_id= SizeID + pred_size_id_delta; | se(v) |
| residual_flag: WHETHER OR NOT RESIDUAL SIGNAL EXISTS? | u(1) |
| if(residual_flag){ | |
| residual_down_sampling_flag: WHETHER OR NOT RESIDUAL SIGNAL IS SUBJECTED TO DOWNSAMPLING? | u(1) |
| residual_symmetry_flag: WHETHER OR NOT RESIDUAL SIGNAL IS A 135-DEGREE SYMMETRIC MATRIX? | u(1) |
| scaling_list_residual(ScalingListResidual[SizeID][MatrixID],residual_symmetry_flag,(1<<(4 +(SizeID<<1)))) | |
| } | |
| } | |
| } | |

FIG. 9

| PARAMETER NAME | DESCRIPTION |
|---|---|
| QMPS ID | IDENTIFIER FOR IDENTIFYING QMPSs FROM EACH OTHER |
| GENERATION MODE PRESENCE FLAG | FLAG INDICATING WHETHER GENERATION MODE SEGMENT (pred_mode) IS PRESENT |
| GENERATION MODE <pred_mode> | SEGMENTS INDICATING MODES OF QUANTIZATION MATRIX GENERATION PROCESS<br>e.g.) 0: COPY, 1: SPECIFYING OF AXIS, 2: FULL-SCAN |
| IN COPY MODE (pred_mode = '0') ||
| SOURCE ID | QMPS ID SPECIFYING QMPS OF COPY SOURCE<br>* IF A SPECIFIED MATRIX IS USED, SELF ID IS SPECIFIED |
| COPY SOURCE SIZE | SIZE OF QUANTIZATION MATRIX OF COPY SOURCE |
| COPY SOURCE TYPE | TYPE OF QUANTIZATION MATRIX OF COPY SOURCE |
| RESIDUAL FLAG | FLAG INDICATING PRESENCE OF RESIDUE |
| RESIDUAL DATA | DATA FOR GENERATING RESIDUAL MATRIX |
| IN FULL-SCAN MODE (pred_mode = '1') ||
| DIFFERENCE DATA | LINEAR ARRAY OF DIFFERENCE VALUES CALCULATED USING DPCM METHOD FOR EACH ELEMENT IN QUANTIZATION MATRIX |

QUANTIZATION MATRIX PARAMETER SET

FIG. 10

```
01 | QuantizaionMatrixParameterSet(){
02 |   quantizaion_matrix_parameter_id    ···QMPS ID
03 |   pred_present_flag                  ···GENERATION MODE PRESENCE FLAG
04 |   for(j=0;i< Sizeidc;i++){                    //LOOP FOR EACH SIZE//
05 |     for(j=0;j<6;j++){                         //LOOP FOR EACH TYPE//
06 |       if(pred_present_flag){
07 |         pred_mode                    ···GENERATION MODE
08 |         if(pred_mode==0){                     //COPY MODE//
09 |           pred_qmps_id               ···SOURCE ID
10 |           pred_size_idc              ···COPY SOURCE SIZE
11 |           pred_matrix_id             ···COPY SOURCE TYPE
12 |           pred_matrix(j,i,pred_qmps_id,pred_size_idc,pred_matrix_id)
                                                   //COPY//
13 |           residual_flag              ···RESIDUAL FLAG
14 |           if(residual_flag){
15 |             residual_matrix(i)                //ADD RESIDUES//
51 |         }else if(pred_mode==1)                //FULL-SCAN MODE//
52 |           qmatrix(i.j)
53 |         }
54 |       }else{
55 |         qmatrix(i.j)
56 |       }
57 |     }
58 |   }
59 | }
```

FIG. 11

```
01 | residual_matrix(){
02 |   residual_dpcm_flag            ···RESIDUE SPECIFYING METHOD FLAG
03 |   if(residual_dpcm_flag){                    //DPCM METHOD//
04 |     nextcoef=0
05 |     for(i=0;i<coefNum;i++){
06 |       delta_coef
07 |         nextcoef=nextcoef+delta_coef
08 |         coef[i]=nextcoef
09 |     }
10 |   }else{                                     //RUN-LENGTH METHOD//
11 |     next_pos=0
12 |     while(last_pos==0){
13 |       run
14 |       data
15 |       last_pos
16 |       coef[next_pos+run]=data
17 |       next_pos+=run+1
18 |     }
19 |   }
20 | }
```

FIG. 12

```
01 | QuantizaionMatrixParameterSet(){
02 |   quantizaion_matrix_parameter_id      ···QMPS ID
03 |   use_default_only_flag
04 |   use_dqp_flag
05 |   if(use_default_only_flag
06 |     pred_present_flag                  ···GENERATION MODE PRESENCE FLAG
07 |     Qscale0                            ···FIRST QUANTIZATION SCALE
08 |     Qscale1                            ···SECOND QUANTIZATION SCALE
09 |     Qscale2                            ···THIRD QUANTIZATION SCALE
10 |     Qscale3                            ···FOURTH QUANTIZATION SCALE
11 |     for(i=0;i<4;j++){                           //LOOP FOR EACH SIZE//
12 |       for(i=0;j<6;j++){                         //LOOP FOR EACH SIZE//
13 |         if(pred_present_flag){
14 |           pred_mode                    ···GENERATION MODE
15 |           if(pred_mode==0){                     //COPY MODE//
16 |             pred_qmps_id               ···SOURCE ID
17 |             pred_size_idc              ···COPY SOURCE SIZE
18 |             pred_matrix_id             ···COPY SOURCE TYPE
19 |             residual_flag              ···RESIDUAL FLAG
20 |             if(residual_flag){
21 |               residual_matrix()                 //SPECIFY RESIDUES//
22 |             }
```

//SEE FIG. 11//

```
57 |     }else if(pred_mode == 1)          //FULL-SCAN MODE//
58 |       matrix_symmetry_flag
59 |       matrix_sign_flag
60 |       matrix_dpcm_run_flag            ···SPECIFYING METHOD FLAG
61 |       vlc_table_data                  ···VCL TABLE (DATA)
62 |       if(matrix_dpcm_run_flag){
63 |         vlc_table_run                 ···VCL TABLE (RUNS)
64 |       }
65 |       qmatrix()
66 |     }
67 |     }else{
68 |       matrix_symmetry_flag
69 |       matrix_sign_flag
70 |       matrix_dpcm_run_flalg           ···SPECIFYING METHOD FLAG
71 |       vlc_table_data                  ···VCL TABLE (DATA)
72 |       if(matrix_dpcm_run_flag){
73 |         vlc_table_run                 ···VCL TABLE (RUNS)
74 |       }
75 |       qmatrix()
76 |     }
```

EXAMPLE OF QUANTIZATION SCALE SETTING
REGION OF 8×8 QUANTIZATION MATRIX

EXAMPLE OF
QUANTIZATION SCALE SETTING

FIG. 20

IMAGE PROCESSING DEVICE AND METHOD

TECHNICAL FIELD

The present disclosure relates to an image processing device and method.

BACKGROUND ART

In H.264/AVC (Advanced Video Coding), which is a video coding standard, the profiles of High Profile or higher can use a quantization step whose size differs from one component of an orthogonal transform coefficient to another for the quantization of image data. The quantization step for each component of the orthogonal transform coefficient may be set based on a reference step value and a quantization matrix (also referred to as a scaling list) defined by a size equivalent to the unit of orthogonal transform.

For example, a specified value of the quantization matrix is determined for each of a transform unit of a 4×4 size in the intra-prediction mode, a transform unit of a 4×4 size in the inter-prediction mode, a transform unit of an 8×8 size in the intra-prediction mode, and a transform unit of an 8×8 size in the inter-prediction mode. Further, users are allowed to specify a unique quantization matrix different from the specified values in a sequence parameter set or a picture parameter set. If no quantization matrices are used, the value of the quantization step to be used for quantization is equal for all the components.

In HEVC (High Efficiency Video Coding), which is under standardization as a next-generation video coding standard and which is a successor to H.264/AVC, the concept of CUs (Coding Units) corresponding to existing macroblocks has been introduced (see, for example, NPL 1). The range of coding unit sizes is specified by a set of values which are powers of 2, called LCU (Largest Coding Unit) and SCU (Smallest Coding Unit), in a sequence parameter set. A specific coding unit size in the range specified by the LCU and the SCU is specified using split_flag.

In HEVC, one coding unit can be partitioned into one or more orthogonal transform units, or one or more transform units (TUs). Any of 4×4, 8×8, 16×16, and 32×32 is available as the size of a transform unit. Accordingly, a quantization matrix can also be specified for each of those candidate transform unit sizes.

In H.264/AVC, only one quantization matrix can be specified in each picture for the size of each transform unit. In contrast, it has been proposed to specify multiple candidate quantization matrices in each picture for the size of each transform unit and adaptively select a quantization matrix for each block in terms of RD (Rate-Distortion) optimization (see, for example, NPL 2).

CITATION LIST

Non Patent Literature

NPL 1: JCTVC-B205, "Test Model under Consideration", Joint Collaborative Team on Video Coding (JCT-VC) of ITU-T SG16 WP3 and ISO/IECJTC1/SC29/WG11 2nd Meeting: Geneva, CH, 21-28 Jul. 2010

NPL 2: VCEG-AD06, "Adaptive Quantization Matrix Selection on KTA Software", ITU-Telecommunications Standardization Sector STUDY GROUP 16 Question 6 Video Coding Experts Group (VCEG) 30th Meeting: Hangzhou, China, 23-24 Oct. 2006

SUMMARY OF INVENTION

Technical Problem

However, as the size of a transform unit increases, the size of a corresponding quantization matrix also increases, resulting in an increase in the amount of coding of a quantization matrix to be transmitted. In addition, an increase in the size of a transform unit causes an increase in overhead, and switching of quantization matrices may cause a problem in terms of compression efficiency.

The present disclosure has been proposed in view of such a situation, and it is an object of the present disclosure to enable suppression of an increase in the amount of coding of a quantization matrix.

Solution to Problem

An aspect of the present disclosure provides an image processing device including a receiving unit configured to receive encoded data obtained by performing an encoding process on an image, and a quantization matrix limited to a size less than or equal to a transmission size that is a maximum size allowed for transmission; a decoding unit configured to perform a decoding process on the encoded data received by the receiving unit to generate quantized data; an up-conversion unit configured to up-convert the quantization matrix received by the receiving unit from the transmission size to a size that is identical to a block size which is a processing unit in which dequantization is performed; and a dequantization unit configured to dequantize the quantized data generated by the decoding unit using the quantization matrix up-converted by the up-conversion unit.

The quantization matrix received by the receiving unit can be configured to have, as the transmission size, a size that is identical to a default quantization matrix size.

The quantization matrix received by the receiving unit can be configured to have, as the transmission size, a size that is identical to a maximum size of a default quantization matrix.

The transmission size can be 8×8, and the quantization matrix received by the receiving unit can be configured to have an 8×8 size.

The up-conversion unit can up-convert the quantization matrix limited to the size less than or equal to the transmission size, by performing an interpolation process on a matrix element in the quantization matrix received by the receiving unit.

The up-conversion unit can up-convert the quantization matrix limited to the size less than or equal to the transmission size, by performing a nearest neighbor interpolation process on a matrix element in the quantization matrix received by the receiving unit.

The transmission size can be 8×8, and the up-conversion unit can up-convert a quantization matrix having an 8×8 size to a quantization matrix having a 16×16 size by performing the nearest neighbor interpolation process on a matrix element in the quantization matrix having an 8×8 size.

The up-conversion unit can up-convert a quantization matrix having an 8×8 size to a quantization matrix having a 32×32 size by performing the nearest neighbor interpolation process on a matrix element in the quantization matrix having an 8×8 size.

The up-conversion unit can up-convert a square quantization matrix limited to a size less than or equal to the transmission size to a non-square quantization matrix by performing an interpolation process on a matrix element in the square quantization matrix.

The transmission size can be 8×8, and the up-conversion unit can up-convert a quantization matrix having an 8×8 size to a quantization matrix having an 8×32 size or a quantization matrix having a 32×8 size, by performing the interpolation process on a matrix element in the quantization matrix having an 8×8 size.

The transmission size can be 8×8, and the up-conversion unit can up-convert a quantization matrix having a 4×4 size to a quantization matrix having a 4×16 size or a quantization matrix having a 16×4 size, by performing the interpolation process on a matrix element in the quantization matrix having a 4×4 size.

The transmission size can be 8×8, and the up-conversion unit can up-convert a quantization matrix having an 8×8 size to a quantization matrix having a 2×32 size, a quantization matrix having a 32×2 size, a quantization matrix having a 1×16 size, or a quantization matrix having a 16×1 size, by performing the interpolation process on a matrix element in the quantization matrix having an 8×8 size.

A coding unit that is a processing unit in which a decoding process is performed and a transform unit that is a processing unit in which a transform process is performed can have a layered structure, the decoding unit can perform a decoding process on the encoded data using a unit having a layered structure, and the up-conversion unit can up-convert the quantization matrix received by the receiving unit from the transmission size to a size of a transform unit that is a processing unit in which dequantization is performed.

The quantization matrix can be set as a quantization matrix having matrix elements which differ in accordance with a block size that is a processing unit in which dequantization is performed, the receiving unit can receive a quantization matrix having matrix elements which differ in accordance with a block size that is a processing unit in which dequantization is performed, and the up-conversion unit can up-convert the quantization matrix received by the receiving unit, using a quantization matrix having matrix elements which differ in accordance with a block size that is a processing unit in which dequantization is performed.

The transmission size can be 8×8, and the up-conversion unit can up-convert a first quantization matrix in a case where a block size that is a processing unit in which dequantization is performed is 16×16, and can up-convert a second quantization matrix having matrix elements different from the first quantization matrix in a case where a block size that is a processing unit in which dequantization is performed is 32×32.

An aspect of the present disclosure further provides an image processing method for an image processing device. The image processing method includes receiving encoded data obtained by performing an encoding process on an image, and a quantization matrix limited to a size less than or equal to a transmission size that is a maximum size allowed for transmission; performing a decoding process on the received encoded data to generate quantized data; up-converting the received quantization matrix from the transmission size to a size that is identical to a block size which is a processing unit in which dequantization is performed; and dequantizing the generated quantized data using the up-converted quantization matrix, wherein the image processing method is performed by the image processing device.

Another aspect of the present disclosure provides an image processing device including a setting unit configured to set a quantization matrix used for up-conversion from a transmission size that is a maximum size allowed for transmission to a size that is identical to a block size, the block size being a processing unit in which quantized data obtained by quantizing an image is dequantized; a quantization unit configured to quantize the image using the quantization matrix set by the setting unit to generate quantized data; an encoding unit configured to perform an encoding process on the quantized data generated by the quantization unit to generate encoded data; and a transmission unit configured to transmit the encoded data generated by the encoding unit and the quantization matrix set by the setting unit, the quantization matrix being limited to a size less than or equal to the transmission size.

The transmission size can be 8×8, and the quantization matrix set by the setting unit can be configured to be 8×8.

The quantization matrix can be configured to be a quantization matrix used for up-conversion from an 8×8 size to a 16×16 size or a 32×32 size.

Another aspect of the present disclosure further provides an image processing method for an image processing device. The image processing method includes setting a quantization matrix used for up-conversion from a transmission size that is a maximum size allowed for transmission to a size that is identical to a block size, the block size being a processing unit in which quantized data obtained by quantizing an image is dequantized; quantizing the image using the set quantization matrix to generate quantized data; performing an encoding process on the generated quantized data to generate encoded data; and transmitting the generated encoded data and the set quantization matrix that is limited to a size less than or equal to the transmission size, wherein the image processing method is performed by the image processing device.

In an aspect of the present disclosure, encoded data obtained by performing an encoding process on an image and a quantization matrix limited to a size less than or equal to a transmission size that is a maximum size allowed for transmission are received; a decoding process is performed on the received encoded data to generate quantized data; the received quantization matrix is up-converted from the transmission size to a size that is identical to a block size which is a processing unit in which dequantization is performed; and the generated quantized data is dequantized using the up-converted quantization matrix.

In another aspect of the present disclosure, a quantization matrix used for up-conversion from a transmission size that is a maximum size allowed for transmission to a size that is identical to a block size which is a processing unit in which quantized data obtained by quantizing an image is dequantized is set; the image is quantized using the set quantization matrix to generate quantized data; an encoding process is performed on the generated quantized data to generate encoded data; and the generated encoded data and the set quantization matrix that is limited to a size less than or equal to the transmission size are transmitted.

Advantageous Effects of Invention

According to the present disclosure, it is possible to process an image. In particular, it is possible to suppress an increase in the amount of coding of a quantization matrix.

BRIEF DESCRIPTION OF DRAWINGS

FIG. 8 is a diagram illustrating an example of syntax.

FIG. 9 is a diagram illustrating an example of syntax.

FIG. 10 is a diagram illustrating an example of syntax.

FIG. 11 is a diagram illustrating an example of syntax.

FIG. 12 is a diagram illustrating an example of syntax.

FIG. 13 is a diagram illustrating an example of syntax.

FIG. 20 is a diagram illustrating an example of a nearest neighbor interpolation process.

DESCRIPTION OF EMBODIMENTS

Modes for carrying out the present disclosure (hereinafter referred to as embodiments) will be described hereinafter. Note that the description will be made in the following order.

1. First embodiment (image encoding device, image decoding device)
2. Second embodiment (image encoding device, image decoding device)
3. Third embodiment (up-conversion)
4. Fourth embodiment (multi-view image encoding/multi-view image decoding device)
5. Fifth embodiment (layered image encoding/layered image decoding device)
6. Sixth embodiment (computer)
7. Seventh embodiment (television receiver)
8. Eighth embodiment (mobile phone)
9. Ninth embodiment (recording/reproducing apparatus)
10. Tenth embodiment (imaging apparatus)
11. Exemplary applications of scalable coding

1. First Embodiment

1-1. Image Encoding Device

Figure 1:
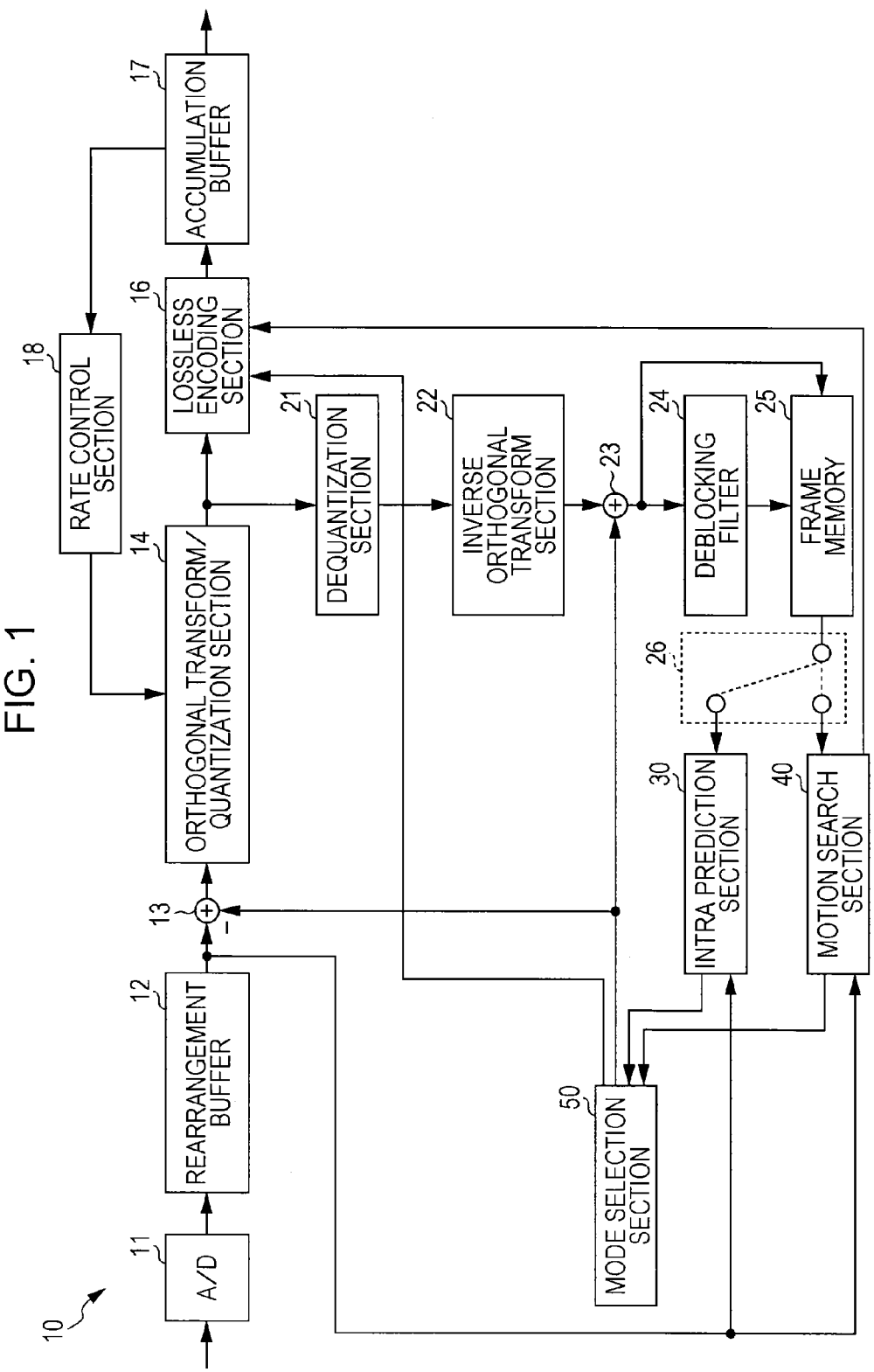
FIG. 1 is a block diagram illustrating a main example configuration of an image encoding device.

FIG. 1 is a block diagram illustrating an example of a configuration of an image encoding device 10 according to an embodiment of the present disclosure. The image encoding device 10 illustrated in FIG. 1 is an image processing device to which the present technology is applied, for encoding input image data and outputting obtained encoded data. Referring to FIG. 1, the image encoding device 10 includes an A/D (Analogue to Digital) conversion section 11 (A/D), a rearrangement buffer 12, a subtraction section 13, an orthogonal transform/quantization section 14, a lossless encoding section 16, an accumulation buffer 17, a rate control section 18, a dequantization section 21, an inverse orthogonal transform section 22, an adder section 23, a deblocking filter 24, a frame memory 25, a selector 26, an intra prediction section 30, a motion search section 40, and a mode selection section 50.

The A/D conversion section 11 converts an image signal input in analog form into image data in digital form, and outputs a digital image data sequence to the rearrangement buffer 12.

The rearrangement buffer 12 rearranges images included in the image data sequence input from the A/D conversion section 11. After rearranging the images in accordance with a GOP (Group of Pictures) structure for use in an encoding process, the rearrangement buffer 12 outputs the image data subjected to rearrangement to the subtraction section 13, the intra prediction section 30, and the motion search section 40.

The subtraction section 13 is supplied with the image data input from the rearrangement buffer 12 and prediction image data selected by the mode selection section 50, which will be described below. The subtraction section 13 calculates prediction error data that represents the difference between the image data input from the rearrangement buffer 12 and the prediction image data input from the mode selection section 50, and outputs the calculated prediction error data to the orthogonal transform/quantization section 14.

The orthogonal transform/quantization section 14 performs an orthogonal transform and quantization on the prediction error data input from the subtraction section 13, and outputs quantized transform coefficient data (hereinafter referred to as quantized data) to the lossless encoding section 16 and the dequantization section 21. The bit rate of the quantized data output from the orthogonal transform/quantization section 14 is controlled on the basis of a rate control signal supplied from the rate control section 18. A detailed configuration of the orthogonal transform/quantization section 14 will further be described below.

The lossless encoding section 16 is supplied with the quantized data input from the orthogonal transform/quantization section 14, information for generating a quantization matrix on the decoder side, and information concerning intra prediction or inter prediction which is selected by the mode selection section 50. The information concerning intra prediction may include, for example, prediction mode information indicating an optimum intra-prediction mode for each block. Further, the information concerning inter prediction may include, for example, prediction mode information for block-by-block prediction of motion vectors, differential motion vector information, reference image information, and so forth. Further, the information for generating a quantization matrix on the decoder side may include identification information indicating a maximum size of a quantization matrix to be transmitted (or a difference matrix between the quantization matrix and the prediction matrix thereof).

The lossless encoding section 16 performs a lossless encoding process on the quantized data to generate an encoded stream. The lossless encoding performed by the lossless encoding section 16 may be, for example, variable-length coding, arithmetic coding, or the like. Further, the lossless encoding section 16 multiplexes information for generating a quantization matrix, which will be described in detail below, into the encoded stream (e.g., a sequence parameter set, a picture parameter set, a slice header, etc.). Further, the lossless encoding section 16 multiplexes the information concerning intra prediction or inter prediction described above into the encoded stream. The lossless encoding section 16 then outputs the generated encoded stream to the accumulation buffer 17.

The accumulation buffer 17 temporarily accumulates an encoded stream input from the lossless encoding section 16, using a storage medium such as a semiconductor memory. Then, the accumulation buffer 17 outputs the accumulated encoded stream at a rate corresponding to the bandwidth of a transmission path (or an output line from the image encoding device 10).

The rate control section 18 checks the availability of capacity of the accumulation buffer 17. Further, the rate control section 18 generates a rate control signal in accordance with the available capacity of the accumulation buffer 17, and outputs the generated rate control signal to the orthogonal transform/quantization section 14. For example, when the available capacity of the accumulation buffer 17 is low, the rate control section 18 generates a rate control signal for reducing the bit rate of the quantized data. Further, for example, when the available capacity of the accumulation buffer 17 is sufficiently high, the rate control section 18 generates a rate control signal for increasing the bit rate of the quantized data.

The dequantization section 21 performs a dequantization process on the quantized data input from the orthogonal transform/quantization section 14. The dequantization section 21 outputs transform coefficient data acquired through the dequantization process to the inverse orthogonal transform section 22.

The inverse orthogonal transform section 22 performs an inverse orthogonal transform process on the transform coefficient data input from the dequantization section 21 to restore prediction error data. The inverse orthogonal transform section 22 then outputs the restored prediction error data to the adder section 23.

The adder section 23 adds together the restored prediction error data input from the inverse orthogonal transform section 22 and the prediction image data input from the mode selection section 50 to generate decoded image data. The adder section 23 then outputs the generated decoded image data to the deblocking filter 24 and the frame memory 25.

The deblocking filter 24 performs a filtering process for reducing blocking artifacts caused by the encoding of an image. The deblocking filter 24 filters the decoded image data input from the adder section 23 to remove blocking artifacts, and outputs the filtered decoded image data to the frame memory 25.

The frame memory 25 stores the decoded image data input from the adder section 23 and the filtered decoded image data input from the deblocking filter 24, using a storage medium.

The selector 26 reads decoded image data to be filtered, which is used for intra prediction, from the frame memory 25, and supplies the read decoded image data to the intra prediction section 30 as reference image data. The selector 26 further reads filtered decoded image data, which is used for inter prediction, from the frame memory 25, and supplies the read decoded image data to the motion search section 40 as reference image data.

The intra prediction section 30 performs an intra prediction process for each intra-prediction mode on the basis of the image data to be encoded, which is input from the rearrangement buffer 12, and the decoded image data (i.e., reference image data) supplied via the selector 26. For example, the intra prediction section 30 evaluates a prediction result obtained in each intra-prediction mode using a predetermined cost function. Then, the intra prediction section 30 selects an intra-prediction mode that minimizes the cost function value, that is, an intra-prediction mode that provides the highest compression ratio, as an optimum intra-prediction mode. Further, the intra prediction section 30 outputs information concerning intra prediction, such as prediction mode information indicating the optimum intra-prediction mode and the cost function value, together with the prediction image data in the selected intra-prediction mode, to the mode selection section 50.

The motion search section 40 performs an inter prediction process (an inter-frame prediction process) on the basis of the image data to be encoded, which is input from the rearrangement buffer 12, and the decoded image data supplied via the selector 26. For example, the motion search section 40 evaluates a prediction result obtained in each prediction mode using a predetermined cost function. Then, the motion search section 40 selects a prediction mode that minimizes the cost function value, that is, a prediction mode that provides the highest compression ratio, as an optimum prediction mode. Further, the motion search section 40 outputs information concerning inter prediction, such as prediction mode information indicating the selected optimum prediction mode and the cost function value, together with the prediction image data in the selected inter prediction mode, to the mode selection section 50.

The mode selection section 50 compares the cost function value related to intra prediction, which is input from the intra prediction section 30, with the cost function value related to inter prediction, which is input from the motion search section 40. Then, the mode selection section 50 selects a prediction technique having a smaller cost function value out of intra prediction and inter prediction. Further, if intra prediction is selected, the mode selection section 50 outputs the information concerning intra prediction to the lossless encoding section 16, and also outputs the prediction image data to the subtraction section 13 and the adder section 23. If inter prediction is selected, the mode selection section 50 outputs the information concerning inter prediction to the lossless encoding section 16, and also outputs the prediction image data to the subtraction section 13 and the adder section 23.

1-2. Example Configuration of Orthogonal Transform/Quantization Section

Figure 2:
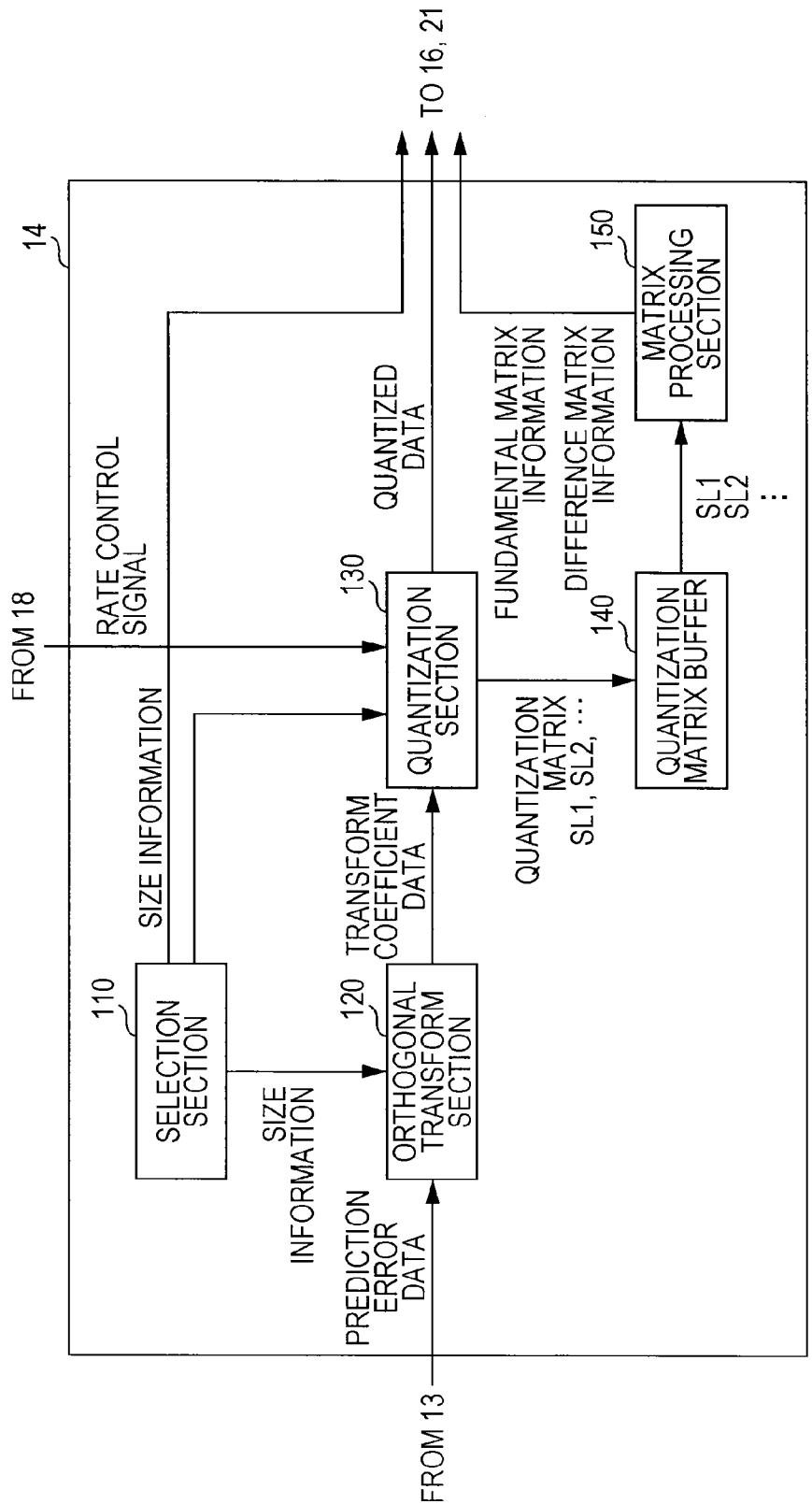
FIG. 2 is a block diagram illustrating a main example configuration of an orthogonal transform/quantization section.

FIG. 2 is a block diagram illustrating an example of a detailed configuration of the orthogonal transform/quantization section 14 of the image encoding device 10 illustrated in FIG. 1. Referring to FIG. 2, the orthogonal transform/quantization section 14 includes a selection section 110, an orthogonal transform section 120, a quantization section 130, a quantization matrix buffer 140, and a matrix processing section 150.

(1) Selection Section

The selection section 110 selects a transform unit (TU) to be used for the orthogonal transform of image data to be encoded from among a plurality of transform units having different sizes. For example, the candidate sizes of the transform units selectable by the selection section 110 include 4×4 and 8×8 for H.264/AVC (Advanced Video Coding), and include 4×4, 8×8, 16×16, and 32×32 for HEVC (High Efficiency Video Coding). The selection section 110 may select a transform unit in accordance with, for example, the size or quality of an image to be encoded, the performance of the device, or the like. The selection of the transform unit by the selection section 110 may be hand-tuned by a user who develops the device. The selection section 110 then outputs information specifying the size of the selected transform unit to the orthogonal transform section 120, the quantization section 130, the lossless encoding section 16, and the dequantization section 21.

(2) Orthogonal Transform Section

The orthogonal transform section 120 performs an orthogonal transform on the image data (i.e., prediction error data) supplied from the subtraction section 13, in units of the transform unit selected by the selection section 110. The orthogonal transform executed by the orthogonal transform section 120 may be, for example, discrete cosine transform (DCT), Karhunen-Loève transform, or the like. The orthogonal transform section 120 then outputs transform coefficient data acquired through the orthogonal transform process to the quantization section 130.

(3) Quantization Section

The quantization section 130 quantizes the transform coefficient data generated by the orthogonal transform section 120, using a quantization matrix corresponding to the transform unit selected by the selection section 110. Further, the quantization section 130 switches the quantization step in accordance with the rate control signal supplied from the rate control section 18 to change the bit rate of the quantized data to be output.

Further, the quantization section 130 causes a set of quantization matrices each corresponding to one of a plurality of transform units selectable by the selection section 110 to be stored in the quantization matrix buffer 140. For example, as in HEVC, if there are four candidate transform unit sizes, namely, 4×4, 8×8, 16×16, and 32×32, a set of four quantization matrices each corresponding to one of those four sizes may be stored in the quantization matrix buffer 140. Note that if a specified quantization matrix is used for a given size, only a flag indicating that the specified quantization matrix is used (a quantization matrix defined by the user is not used) may be stored in the quantization matrix buffer 140 in association with the given size.

A set of quantization matrices that can possibly be used by the quantization section 130 may be typically set for each sequence of encoded streams. The quantization section 130 may update a set of quantization matrices set for each sequence on a picture-by-picture basis. Information for controlling such setting and update of a set of quantization matrices may be inserted in, for example, the sequence parameter set and the picture parameter set.

(4) Quantization Matrix Buffer

The quantization matrix buffer 140 temporarily stores a set of quantization matrices each corresponding to one of a plurality of transform units selectable by the selection section 110, using a storage medium such as a semiconductor memory. The set of quantization matrices stored in the quantization matrix buffer 140 is referenced for a process of the matrix processing section 150 described below.

(5) Matrix Processing Section

The matrix processing section 150 refers to a set of quantization matrices stored in the quantization matrix buffer 140 for each sequence of encoded streams and for each picture, and generates information for generating, from a quantization matrix corresponding to a transform unit of a certain size, a quantization matrix or matrices corresponding to another or other transform units of one or more sizes. The size of the transform unit on which the generation of a quantization matrix is based may be typically the minimum size among a plurality of transform unit sizes. That is, as in HEVC, if there are four candidate transform unit sizes, namely, 4×4, 8×8, 16×16, and 32×32, information for generating a quantization matrix of another size from, for example, a 4×4 quantization matrix may be generated. The information generated by the matrix processing section 150 may include, for example, fundamental matrix information and difference matrix information, which will be described below. Then, the information generated by the matrix processing section 150 is output to the lossless encoding section 16, and may be inserted in the header of an encoded stream.

Note that a description will be given herein mainly of an example in which a quantization matrix of a larger size is generated from a quantization matrix of a minimum size. However, this example is not given in a limiting sense, and at least one of a quantization matrix of a smaller size and a quantization matrix of a larger size may be generated from a quantization matrix of a non-minimum size.

1-3. Detailed Example Configuration of Matrix Processing Section

Figure 3:
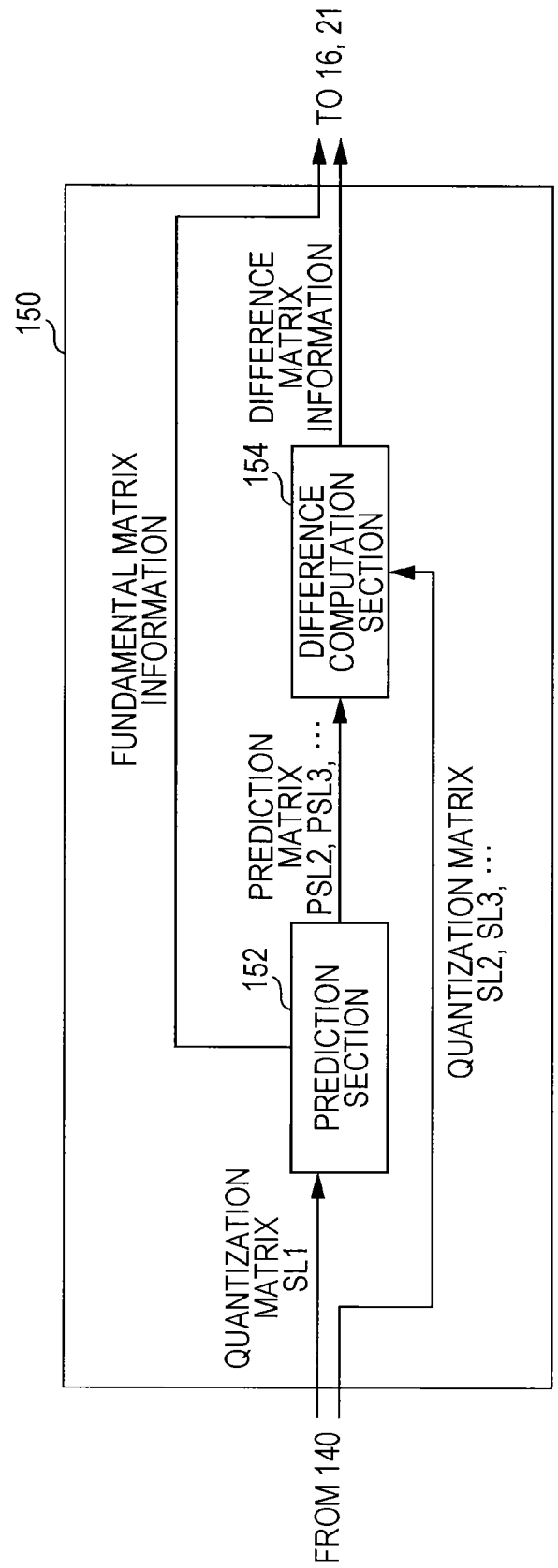
FIG. 3 is a block diagram illustrating a main example configuration of a matrix processing section.

FIG. 3 is a block diagram illustrating an example of a more detailed configuration of the matrix processing section 150 of the orthogonal transform/quantization section 14 illustrated in FIG. 2. Referring to FIG. 3, the matrix processing section 150 includes a prediction section 152 and a difference computation section 154.

(1) Prediction Section

The prediction section 152 acquires a set of quantization matrices stored in the quantization matrix buffer 140, and predicts, from a first quantization matrix included in the acquired set, a second quantization matrix of a larger size (generates a prediction matrix (also referred to as a prediction quantization matrix)).

Upon generating a prediction matrix PSL2 from a 4×4 quantization matrix SL1, the prediction section 152 outputs the generated prediction matrix PSL2 to the difference computation section 154. The prediction section 152 further predicts, for example, a 16×16 prediction matrix PSL3 from an 8×8 quantization matrix SL2 included in the set of quantization matrices, and outputs the prediction matrix PSL3 to the difference computation section 154. The prediction section 152 further predicts a 32×32 prediction matrix PSL4 from a 16×16 quantization matrix SL3 included in the set of quantization matrices, and outputs the prediction matrix PSL4 to the difference computation section 154. The prediction section 152 further outputs fundamental matrix information specifying the 4×4 quantization matrix SL1, on which the generation of the prediction matrices PSL2, PSL3, and PSL4 described above is based, to the lossless encoding section 16.

(2) Difference Computation Section

The difference computation section 154 calculates difference matrices (also referred to as residual matrices) DSL2, DSL3, and DSL4 representing the differences (also referred to as residues) between the prediction matrices PSL2, PSL3, and PSL4 input from the prediction section 152 and the corresponding quantization matrices SL2, SL3, and SL4, respectively.

The difference computation section 154 then outputs difference matrix information indicating the difference matrices DSL2, DSL3, and DSL4 to the lossless encoding section 16.

Note that if a specified quantization matrix is used for a given size, the matrix processing section 150 outputs only a flag indicating that the specified quantization matrix is used to the lossless encoding section 16 in association with a corresponding size without executing the prediction of a quantization matrix of the given size or executing difference computation. Further, if the difference between a prediction matrix and a quantization matrix is zero, the difference computation section 154 may output only a flag indicating that no difference is present to the lossless encoding section 16 instead of outputting difference matrix information. Further, if a quantization matrix is not updated at the timing of switching from one picture to another, the matrix processing section 150 may output only a flag indicating that the quantization matrix is not updated to the lossless encoding section 16.

1-4. Detailed Example Configuration of Matrix Processing Section

Figure 4:
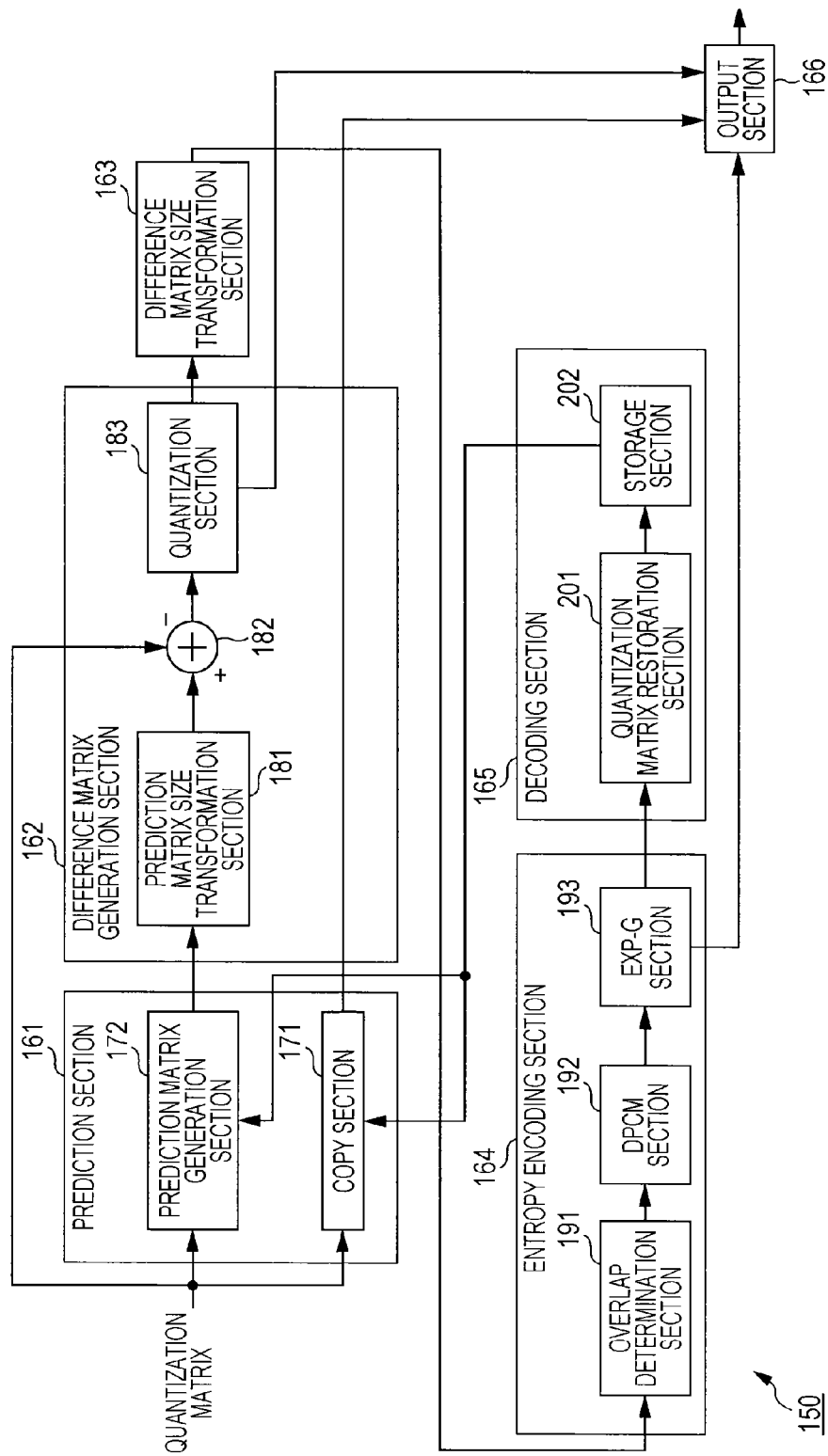
FIG. 4 is a block diagram illustrating a main example configuration of the matrix processing section.

FIG. 4 is a block diagram illustrating a more detailed example configuration of the matrix processing section 150.

Referring to FIG. 4, the matrix processing section 150 includes a prediction section 161, a difference matrix generation section 162, a difference matrix size transformation section 163, an entropy encoding section 164, a decoding section 165, and an output section 166.

An important feature of the present technology is as follows. On the encoder side, a residual matrix (residual signal) having a small size (e.g., 16×16) is generated with respect to a quantization matrix of a large size (e.g., 32×32), and is transmitted. On the decoder side, the residual matrix of the small size is enlarged ("upsampled") and is then added to a prediction quantization matrix.

The following approaches are conceivable.

Approach 1:

An approach in which a maximum quantization matrix serving as a threshold is transmitted and upsampling is performed for a larger size. This approach can reduce the used memory because the maximum quantization matrix that the decoder holds can be specified. In this case, identification information indicating the maximum size may be transmitted from the encoder side, and used on the decoder side. In addition, a maximum size may be specified in accordance with the level or profile defined in the standard (e.g., a larger size is specified for a higher profile or level).

Approach 2:

Identification information indicating whether to upsample and the layer to be upsampled are transmitted for each quantization matrix. This approach can be used as an exemplary application of compression although this approach makes it necessary for a decoder to support a quantization matrix of the maximum size in a case where no upsampling is performed.

The prediction section 161 generates a prediction matrix. As illustrated in FIG. 4, the prediction section 161 includes a copy section 171 and a prediction matrix generation section 172.

In a copy mode, the copy section 171 creates a copy of a previously transmitted quantization matrix, and uses the copy as a prediction matrix (or predicts a quantization matrix of an orthogonal transform unit to be processed). More specifically, the copy section 171 acquires the size of the previously transmitted quantization matrices and a list ID from a storage section 202 in the decoding section 165. The size is information indicating the size of quantization matrices (e.g., 4×4 to 32×32, etc.). The list ID is information indicating the type of prediction error data to be quantized.

For example, the list ID includes identification information indicating the quantization target is prediction error data (Intra Luma) of the luminance component which is generated using an intra-predicted prediction image, prediction error data (Intra Cr) of the color difference component (Cr) which is generated using an intra-predicted prediction image, prediction error data (Intra Cb) of the color difference component (Cb) which is generated using an intra-predicted prediction image, or prediction error data (Inter Luma) of the luminance component which is generated using an inter-predicted prediction image.

The copy section 171 selects, as a copy source quantization matrix, a previously transmitted quantization matrix of the same size as the quantization matrix input to the matrix processing section 150 (the quantization matrix of the orthogonal transform unit to be processed), and supplies the list ID of the copy source quantization matrix to the output section 166 to output the list ID to sections outside the matrix processing section 150 (the lossless encoding section 16 and the dequantization section 21). That is, in this case, only the list ID is transmitted to the decoder side (is included in encoded data) as information indicating a prediction matrix generated by a copy of the previously transmitted quantization matrix. Accordingly, the image encoding device 10 can suppress an increase in the amount of coding of a quantization matrix.

Furthermore, in a normal case, the prediction matrix generation section 172 acquires a previously transmitted quantization matrix from the storage section 202 in the decoding section 165, and generates a prediction matrix using the quantization matrix (predicts a quantization matrix of an orthogonal transform unit to be processed). The prediction matrix generation section 172 supplies the generated prediction matrix to the difference matrix generation section 162.

The difference matrix generation section 162 generates a difference matrix (residual matrix) that is a difference between the prediction matrix supplied from the prediction section 161 (the prediction matrix generation section 172) and the quantization matrix input to the matrix processing section 150. As illustrated in FIG. 4, the difference matrix generation section 162 includes a prediction matrix size transformation section 181, a computation section 182, and a quantization section 183.

The prediction matrix size transformation section 181 transforms (hereinafter also referred to as converts) the size of the prediction matrix supplied from the prediction matrix generation section 172 so as to match the size of the quantization matrix input to the matrix processing section 150.

Figures 5, 6:
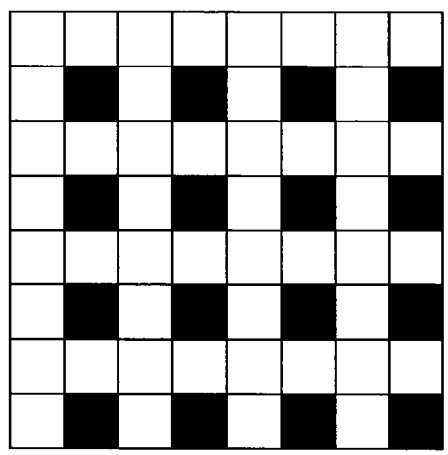
FIG. 5 is a diagram illustrating an example of downsampling.
FIG. 6 is a diagram illustrating an example of how an overlapping portion is removed.

For example, if the size of the prediction matrix is larger than the size of the quantization matrix, the prediction matrix size transformation section 181 reduces the size of (hereinafter also referred to as down-converts) the prediction matrix. More specifically, for example, when the prediction matrix has a 16×16 size and the quantization matrix has an 8×8 size, the prediction matrix size transformation section 181 down-converts the prediction matrix to an 8×8 prediction matrix. Note that any down-conversion method may be used. For example, the prediction matrix size transformation section 181 may reduce (hereinafter also referred to as downsample) the number of elements in the prediction matrix (by performing computation) using a filter. Alternatively, the prediction matrix size transformation section 181 may also reduce the number of elements in the prediction matrix by, for example, as illustrated in FIG. 5, thinning out some of the elements (e.g., only the even numbered elements (in FIG. 5, the elements in solid black) among the two-dimensional elements) without using a filter (hereinafter also referred to as subsampling).

Further, for example, if the size of the prediction matrix is smaller than the size of the quantization matrix, the prediction matrix size transformation section 181 increases the size of (hereinafter also referred to as up-converts) the prediction matrix. More specifically, for example, when the prediction matrix has an 8×8 size and the quantization matrix has a 16×16 size, the prediction matrix size transformation section 181 up-converts the prediction matrix to a 16×16 prediction matrix. Note that any up-conversion method may be used. For example, the prediction matrix size transformation section 181 may increase (hereinafter also referred to as upsample) the number of elements in the prediction matrix (by performing computation) using a filter. Alternatively, the prediction matrix size transformation section 181 may also increase the number of elements in the prediction matrix by, for example, creating a copy of each of the elements in the prediction matrix without using a filter (hereinafter also referred to as inverse subsampling).

The prediction matrix size transformation section 181 supplies the prediction matrix whose size has been adjusted so as to match that of the quantization matrix to the computation section 182.

The computation section 182 subtracts the quantization matrix input to the matrix processing section 150 from the prediction matrix supplied from the prediction matrix size transformation section 181, and generates a difference matrix (residual matrix). The computation section 182 supplies the calculated difference matrix to the quantization section 183.

The quantization section 183 quantizes the difference matrix supplied from the computation section 182. The quantization section 183 supplies the result of quantizing the difference matrix to the difference matrix size transformation section 163. The quantization section 183 further supplies information used for quantization, such as quantization parameters, to the output section 166 to output the information to sections outside the matrix processing section 150 (the lossless encoding section 16 and the dequantization section 21). Note that the quantization section 183 may be omitted (i.e., the quantization of the difference matrix may not necessarily be performed).

The difference matrix size transformation section 163 converts the size of the difference matrix (quantized data) supplied from the difference matrix generation section 162 (the quantization section 183) to a size less than or equal to a maximum size allowed for transmission (hereinafter also referred to as a transmission size), if necessary. The maximum size is arbitrary and may be, for example, 8×8.

The encoded data output from the image encoding device 10 is transmitted to an image decoding device corresponding to the image encoding device 10 via, for example, a transmission path or a storage medium, and is decoded by the image decoding device. The upper limit of the size (maximum size) of the difference matrix (quantized data) during such transmission, that is, in the encoded data output from the image encoding device 10, is set in the image encoding device 10.

If the size of the difference matrix is larger than the maximum size, the difference matrix size transformation section 163 down-converts the difference matrix so that the size of the difference matrix becomes less than or equal to the maximum size.

Note that this down-conversion may be performed using any method, similarly to the down-conversion of the prediction matrix described above. For example, downsampling may be performed using a filter or the like, or subsampling which involves thinning out elements may be performed.

The down-converted difference matrix may have any size smaller than the maximum size. However, in general, the larger the difference in size between before and after conversion, the larger the error. Thus, the difference matrix is preferably down-converted to the maximum size.

The difference matrix size transformation section 163 supplies the down-converted difference matrix to the entropy encoding section 164. Note that if a difference matrix has a size smaller than the maximum size, this down-conversion is not necessary, and therefore the difference matrix size transformation section 163 supplies the difference matrix input thereto to the entropy encoding section 164 as it is (i.e., the down-conversion of the difference matrix is omitted).

The entropy encoding section 164 encodes the difference matrix (quantized data) supplied from the difference matrix size transformation section 163 using a predetermined method. As illustrated in FIG. 4, the entropy encoding section 164 includes an overlap determination section (135-degree section) 191, a DPCM (Differential Pulse Code Modulation) section 192, and an exp-G section 193.

The overlap determination section 191 determines symmetry of the difference matrix supplied from the difference matrix size transformation section 163. If the residue represents a 135-degree symmetry matrix, for example, as illustrated in FIG. 6, the overlap determination section 191 removes the data (matrix elements) of the symmetric part that is overlapping data. If the residue does not represent a 135-degree symmetry matrix, the overlap determination section 191 omits the removal of data (matrix elements). The overlap determination section 191 supplies the data of the difference matrix from which the symmetric part has been removed, if necessary, to the DPCM section 192.

The DPCM section 192 performs DPCM encoding on the data of the difference matrix from which the symmetric part has been removed, if necessary, which is supplied from the overlap determination section 191, and generates DPCM data. The DPCM section 192 supplies the generated DPCM data to the exp-G section 193.

The exp-G section 193 performs signed or unsigned exponential Golomb encoding (hereinafter also referred to as extended Golomb codes) on the DPCM data supplied from the DPCM section 192. The exp-G section 193 supplies the result of encoding to the decoding section 165 and the output section 166.

The decoding section 165 restores a quantization matrix from the data supplied from the exp-G section 193. The decoding section 165 supplies information concerning the restored quantization matrix to the prediction section 161 as a previously transmitted quantization matrix.

As illustrated in FIG. 4, the decoding section 165 includes a quantization matrix restoration section 201 and the storage section 202.

The quantization matrix restoration section 201 decodes the extended Golomb codes supplied from the entropy encoding section 164 (the exp-G section 193) to restore a quantization matrix to be input to the matrix processing section 150. For example, the quantization matrix restoration section 201 restores the quantization matrix by decoding the extended Golomb codes using the method corresponding to the encoding method for the entropy encoding section 164, performing transformation opposite to size transformation performed by the difference matrix size transformation section 163, performing dequantization corresponding to quantization performed by the quantization section 183, and subtracting an obtained difference matrix from the prediction matrix.

The quantization matrix restoration section 201 supplies the restored quantization matrix to the storage section 202, and stores the restored quantization matrix in the storage section 202 in association with the size and the list ID of the quantization matrix.

The storage section 202 stores the information concerning the quantization matrix supplied from the quantization matrix restoration section 201. The information concerning the quantization matrix stored in the storage section 202 is used to generate prediction matrices of other orthogonal transform units which are processed later in time. That is, the storage section 202 supplies the stored information concerning the quantization matrix to the prediction section 161 as information concerning a previously transmitted quantization matrix.

Note that, instead of storing the information concerning the restored quantization matrix, the storage section 202 may store the quantization matrix input to the matrix processing section 150 in association with the size and the list ID of the input quantization matrix. In this case, the quantization matrix restoration section 201 may be omitted.

The output section 166 outputs the supplied various types of information to sections outside the matrix processing section 150. For example, in a copy mode, the output section 166 supplies the list ID of the prediction matrix supplied from the copy section 171 to the lossless encoding section 16 and the dequantization section 21. Further, for example, in a normal case, the output section 166 supplies the extended Golomb codes supplied from the exp-G section 193 and the quantization parameter supplied from the quantization section 183 to the lossless encoding section 16 and the dequantization section 21.

The output section 166 further supplies identification information indicating a maximum size (transmission size) allowed for the transmission of the quantization matrix (difference matrix between the quantization matrix and the prediction matrix thereof) to the lossless encoding section 16 as information for generating a quantization matrix on the decoder side. As described above, the lossless encoding section 16 creates an encoded stream including the information for generating a quantization matrix, and supplies the encoded stream to the decoder side. Note that the identification information indicating the transmission size may be specified in advance by level, profile, and the like. In this case, information concerning the transmission size is shared in advance between the device on the encoder side and the device on the decoder side. Thus, the transmission of the identification information described above may be omitted.

As described above, the matrix processing section 150 down-converts the quantization matrix (difference matrix) to be transmitted to reduce the size of the quantization matrix to a size less than or equal to the transmission size. Accordingly, the image encoding device 10 can suppress an increase in the amount of coding of a quantization matrix.

1-5. Flow of Quantization Matrix Encoding Process

Next, an example of the flow of a quantization matrix encoding process executed by the matrix processing section 150 illustrated in FIG. 4 will be described with reference to a flowchart illustrated in FIG. 7.

When a quantization matrix encoding process is started, in step S101, the prediction section 161 acquires a quantization matrix for a current region (also referred to as a region of interest) that is an orthogonal transform unit to be processed.

In step S102, the prediction section 161 determines whether or not the current mode is a copy mode. If it is determined that the current mode is not a copy mode, the prediction section 161 causes the process to proceed to step S103.

In step S103, the prediction matrix generation section 172 acquires a previously transmitted quantization matrix from the storage section 202, and generates a prediction matrix using the quantization matrix.

In step S104, the prediction matrix size transformation section 181 determines whether or not the size of the prediction matrix generated in step S103 is different from that of the quantization matrix for the current region (region of interest) acquired in step S101. If it is determined that both sizes are different, the prediction matrix size transformation section 181 causes the process to proceed to step S105.

In step S105, the prediction matrix size transformation section 181 converts the size of the prediction matrix generated in step S103 to the size of the quantization matrix for the current region acquired in step S101.

When the processing of step S105 is completed, the prediction matrix size transformation section 181 causes the process to proceed to step S106. If it is determined in step S104 that the size of the prediction matrix is the same as the size of the quantization matrix, the prediction matrix size transformation section 181 causes the process to proceed to step S106 while omitting the processing of step S105 (without performing the processing of step S105).

In step S106, the computation section 182 subtracts the quantization matrix from the prediction matrix to calculate the difference matrix between the prediction matrix and the quantization matrix.

In step S107, the quantization section 183 quantizes the difference matrix generated in step S106. Note that this processing may be omitted.

In step S108, the difference matrix size transformation section 163 determines whether or not the size of the quantized difference matrix is larger than the transmission size (maximum size allowed for transmission). If it is determined that the size of the quantized difference matrix is larger than the transmission size, the difference matrix size transformation section 163 causes the process to proceed to step S109, and down-converts the difference matrix to the transmission size or less.

When the processing of step S109 is completed, the difference matrix size transformation section 163 causes the process to proceed to step S110. Also, if it is determined in step S108 that the size of the quantized difference matrix is less than or equal to the transmission size, the difference matrix size transformation section 163 causes the process to proceed to step S110 while omitting the processing of step S109 (without performing the processing of step S109).

In step S110, the overlap determination section 191 determines whether or not the quantized difference matrix has 135-degree symmetry. If it is determined that the quantized difference matrix has 135-degree symmetry, the overlap determination section 191 causes the process to proceed to step S111.

In step S111, the overlap determination section 191 removes the overlapping portion (overlapping data) in the quantized difference matrix. After the overlapping data is removed, the overlap determination section 191 causes the process to proceed to step S112.

If it is determined in step S110 that the quantized difference matrix does not have 135-degree symmetry, the overlap determination section 191 causes the process to proceed to step S112 while omitting the processing of step S111 (without performing the processing of step S111).

In step S112, the DPCM section 192 performs DPCM encoding on the difference matrix from which the overlapping portion has been removed, if necessary.

In step S113, the exp-G section 193 determines whether or not the DPCM data generated in step S112 has a positive or negative sign. If it is determined that such a sign exists, the exp-G section 193 causes the process to proceed to step S114.

In step S114, the exp-G section 193 performs signed extended Golomb encoding on the DPCM data. The output section 166 outputs the generated extended Golomb codes to the lossless encoding section 16 and the dequantization section 21. When the processing of step S114 is completed, the exp-G section 193 causes the process to proceed to step S116.

Further, if it is determined in step S113 that the sign does not exist, the exp-G section 193 causes the process to proceed to step S115.

In step S115, the exp-G section 193 performs unsigned extended Golomb encoding on the DPCM data. The output section 166 outputs the generated extended Golomb codes to the lossless encoding section 16 and the dequantization section 21. When the processing of step S115 is completed, the exp-G section 193 causes the process to proceed to step S116.

If it is determined in step S102 that the current mode is a copy mode, the copy section 171 creates a copy of a previously transmitted quantization matrix, and uses the copy as a prediction matrix. The output section 166 outputs the list ID corresponding to the prediction matrix to the lossless encoding section 16 and the dequantization section 21 as information indicating the prediction matrix. Then, the copy section 171 causes the process to proceed to step S116.

In step S116, the quantization matrix restoration section 201 restores a quantization matrix. In step S117, the storage section 202 stores the quantization matrix restored in step S116.

When the processing of step S117 is completed, the matrix processing section 150 causes the quantization matrix encoding process to end.

The matrix processing section 150 performs the process in the manner described above. Accordingly, the image encoding device 10 can suppress an increase in the amount of coding of a quantization matrix.

1-6. Syntax

FIGS. 8 to 13 are diagrams illustrating an example of syntax in a case where the present technology is applied. As illustrated in FIGS. 8 to 13, for example, various parameters and flags concerning a quantization matrix are added to encoded data, and are transmitted to the decoder side. Note that these pieces of information may be added at arbitrary positions in the encoded data. In addition, these pieces of information may be transmitted to the decoder side separately from encoded data.

1-7. Quantization Scale

Here, first to fourth quantization scales illustrated in FIG. 12 will be described. Four quantization scales (Qscale0, Qscale1, Qscale2, Qscale3) are specified. These quantization scales are parameters that can be employed in order to quantize the values of the individual elements in the quantization matrix to reduce the amount of coding.

Figure 14:
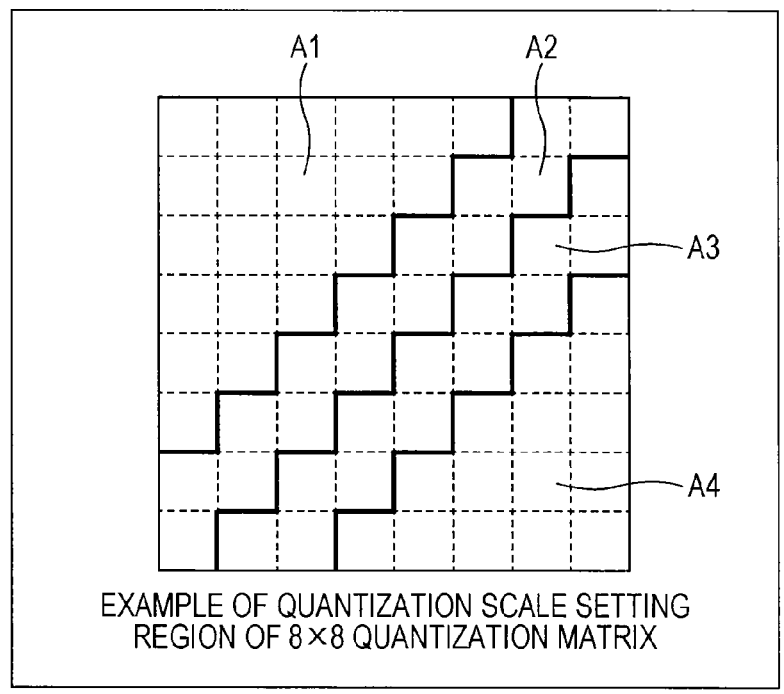
FIG. 14 is a diagram illustrating an example of a quantization scale setting region.
Figure 15:
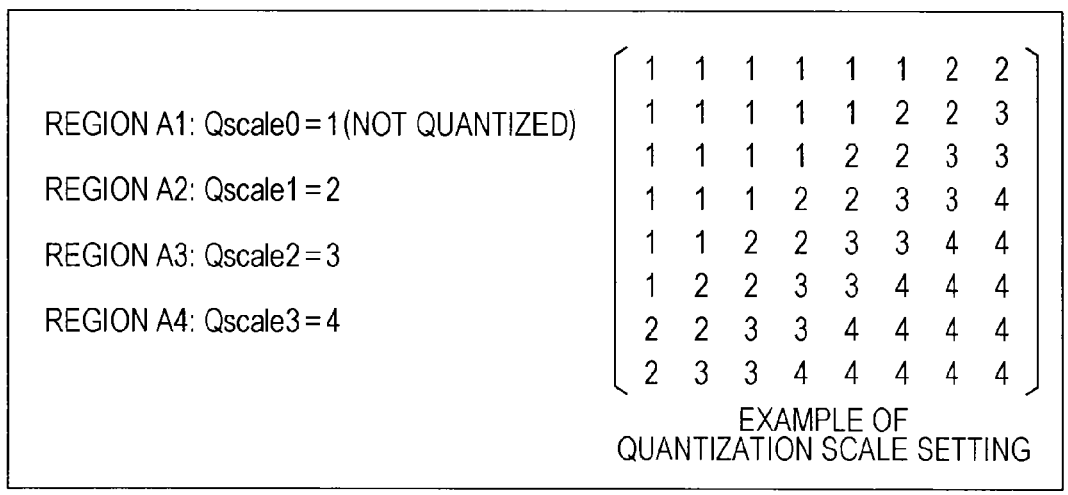
FIG. 15 is a diagram illustrating an example of a quantization scale setting region.

More specifically, for example, four quantization scale setting regions A1 to A4 illustrated in FIGS. 14 and 15 are defined for an 8×8 quantization matrix. The quantization scale setting region A1 is a region for an element group corresponding to a low-frequency signal including the DC component.

Each of the quantization scale setting regions A2 and A3 is a region for an element group corresponding to an intermediate-frequency signal. The quantization scale setting region A4 is a region for an element group corresponding to a high-frequency signal. A quantization scale for quantizing the values of the elements in the quantization matrix may be set for each of the above regions.

For example, referring to FIG. 15, the first quantization scale (Qscale0) for the quantization scale setting region A1 is equal to "1". This means that the values of the quantization matrix for the element group corresponding to the low-frequency signal are not quantized.

In contrast, the second quantization scale (Qscale1) for the quantization scale setting region A2 is equal to "2". The third quantization scale (Qscale2) for the quantization scale setting region A3 is equal to "3". The fourth quantization scale (Qscale3) for the quantization scale setting region A4 is equal to "4". The larger the quantization scale, the larger the number of errors caused by quantization.

In general, however, errors are somewhat allowed in the high-frequency signals. In a case where it is desirable that high coding efficiency be achieved, such setting of quantization scales as above for the quantization of a quantization matrix can effectively reduce the amount of coding required for the definition of the quantization matrix without significantly degrading image quality.

Note that the arrangement of quantization scale setting regions illustrated in FIGS. 14 and 15 is merely an example. For example, a different number of quantization scale setting regions may be defined for each quantization matrix size (e.g., the larger the size, the more the quantization scale setting regions may be defined).

Further, the positions of the boundaries between quantization scale setting regions are not limited to those in the example illustrated in FIG. 14. Generally, the scan pattern in which a quantization matrix is transformed into a one-dimensional array is a zigzag scan. For this reason, preferably, a region boundary extending along a diagonal line from the upper right to the lower left, as illustrated in FIG. 14, is used.

However, a region boundary extending in a vertical or horizontal direction may also be used in accordance with correlation between elements in the quantization matrix, the scan pattern used, or the like. That is, a region boundary may be inclined at any angle, and a pattern inclined at a desired angle may be selected from among a plurality of candidates. In addition, the arrangement of quantization scale setting regions (the number of regions and the position, inclination, etc. of a boundary) may be adaptively selected in terms of coding efficiency. For example, when a nearly flat quantization matrix is defined, a smaller number of quantization scale setting regions may be selected.

Next, an example configuration of an image decoding device according to an embodiment of the present disclosure will be described.

1-8. Example Overall Configuration of Image Decoding Device

Figure 16:
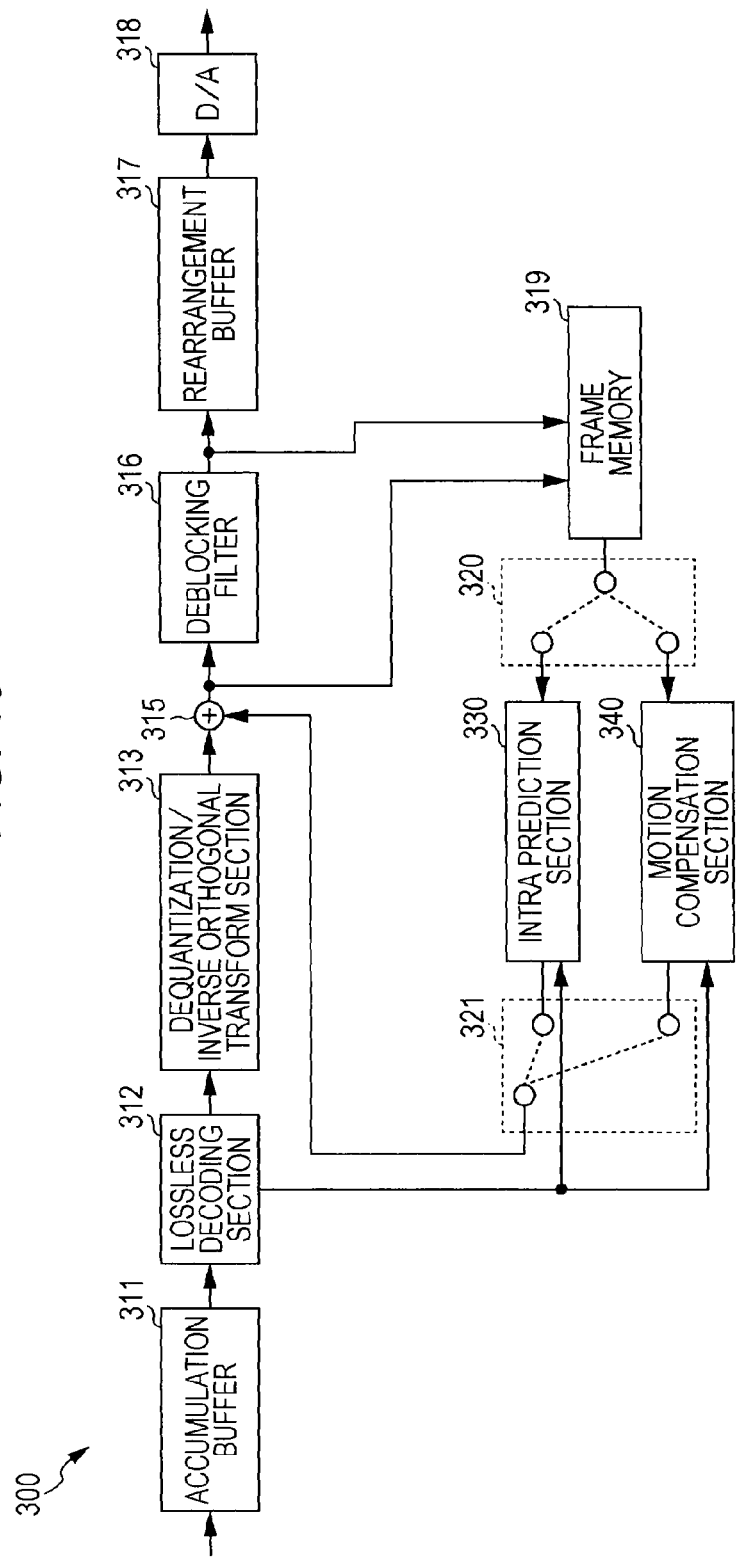
FIG. 16 is a block diagram illustrating a main example configuration of an image decoding device.

FIG. 16 is a block diagram illustrating an example of a configuration of an image decoding device 300 according to an embodiment of the present disclosure. The image decoding device 300 illustrated in FIG. 16 is an image processing device to which the present technology is applied, for decoding encoded data generated by the image encoding device 10. Referring to FIG. 16, the image decoding device 300 includes an accumulation buffer 311, a lossless decoding section 312, a dequantization/inverse orthogonal transform section 313, an adder section 315, a deblocking filter 316, a rearrangement buffer 317, a D/A (Digital to Analogue) conversion section 318, a frame memory 319, selectors 320 and 321, an intra prediction section 330, and a motion compensation section 340.

The accumulation buffer 311 temporarily accumulates an encoded stream input via a transmission path, using a storage medium.

The lossless decoding section 312 decodes the encoded stream input from the accumulation buffer 311 in accordance with the encoding scheme used for encoding. The lossless decoding section 312 further decodes the information multiplexed in the header region of the encoded stream. The information multiplexed in the header region of the encoded stream may include, for example, the fundamental matrix information and difference matrix information described above for generating a quantization matrix, and information concerning intra prediction and information concerning inter prediction, which are contained in the block header. The lossless decoding section 312 outputs the decoded quantized data and the decoded information for generating a quantization matrix to the dequantization/inverse orthogonal transform section 313. The lossless decoding section 312 further outputs the information concerning intra prediction to the intra prediction section 330. The lossless decoding section 312 further outputs the information concerning inter prediction to the motion compensation section 340.

The dequantization/inverse orthogonal transform section 313 performs dequantization and an inverse orthogonal transform on the quantized data input from the lossless decoding section 312 to generate prediction error data. The dequantization/inverse orthogonal transform section 313 then outputs the generated prediction error data to the adder section 315.

The adder section 315 adds together the prediction error data input from the dequantization/inverse orthogonal transform section 313 and prediction image data input from the selector 321 to generate decoded image data. The adder section 315 then outputs the generated decoded image data to the deblocking filter 316 and the frame memory 319.

The deblocking filter 316 filters the decoded image data input from the adder section 315 to remove blocking artifacts, and outputs the filtered decoded image data to the rearrangement buffer 317 and the frame memory 319.

The rearrangement buffer 317 rearranges images input from the deblocking filter 316 to generate a time-series image data sequence. The rearrangement buffer 317 then outputs the generated image data to the D/A conversion section 318.

The D/A conversion section 318 converts the digital image data input from the rearrangement buffer 317 into an analog image signal. The D/A conversion section 318 then outputs the analog image signal to, for example, a display (not illustrated) connected to the image decoding device 300 to display an image.

The frame memory 319 stores the decoded image data to be filtered, which is input from the adder section 315, and the filtered decoded image data input from the deblocking filter 316, using a storage medium.

The selector 320 switches the destination to which the image data supplied from the frame memory 319 is to be output between the intra prediction section 330 and the motion compensation section 340, for each block in the image, in accordance with mode information acquired by the lossless decoding section 312. For example, if an intra-prediction mode is specified, the selector 320 outputs the decoded image data to be filtered, which is supplied from the frame memory 319, to the intra prediction section 330 as reference image data. Further, if an inter-prediction mode is specified, the selector 320 outputs the filtered decoded image data supplied from the frame memory 319 to the motion compensation section 340 as reference image data.

The selector 321 switches the source from which prediction image data to be supplied to the adder section 315 is to be output between the intra prediction section 330 and the motion compensation section 340, for each block in the image, in accordance with mode information acquired by the lossless decoding section 312. For example, if an intra-prediction mode is specified, the selector 321 supplies the prediction image data output from the intra prediction section 330 to the adder section 315. If an inter-prediction mode is specified, the selector 321 supplies the prediction image data output from the motion compensation section 340 to the adder section 315.

The intra prediction section 330 performs intra-screen prediction of a pixel value on the basis of the information concerning intra prediction, which is input from the lossless decoding section 312, and the reference image data supplied from the frame memory 319, and generates prediction image data. The intra prediction section 330 then outputs the generated prediction image data to the selector 321.

The motion compensation section 340 performs a motion compensation process on the basis of the information concerning inter prediction, which is input from the lossless decoding section 312, and the reference image data supplied from the frame memory 319, and generates prediction image data. The motion compensation section 340 then outputs the generated prediction image data to the selector 321.

Figure 17:
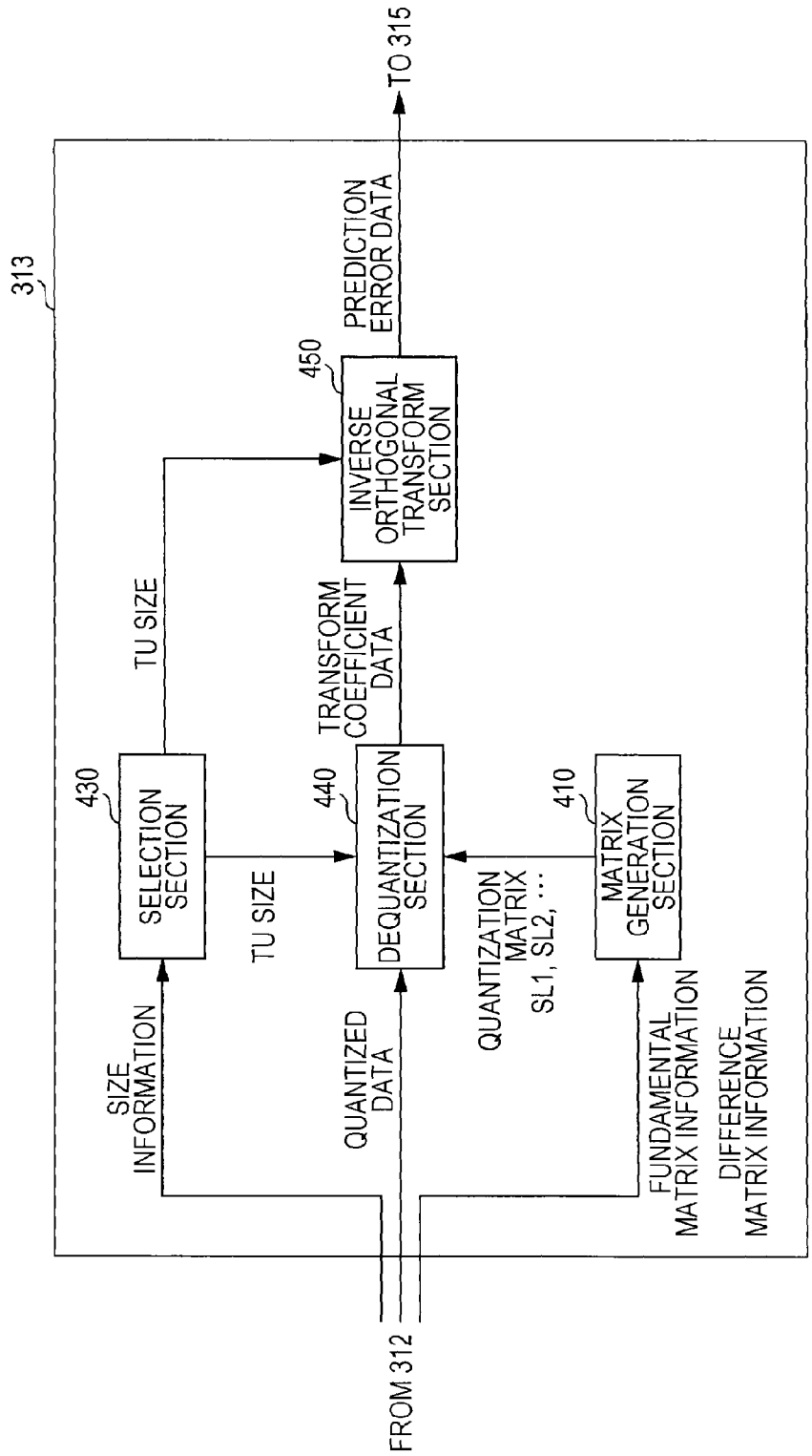
FIG. 17 is a block diagram illustrating a main example configuration of a dequantization/inverse orthogonal transform section.

1-9. Example Configuration of Dequantization/Inverse Orthogonal Transform Section FIG. 17 is a block diagram illustrating an example of a main configuration of the dequantization/inverse orthogonal transform section 313 of the image decoding device 300 illustrated in FIG. 16. Referring to FIG. 17, the dequantization/inverse orthogonal transform section 313 includes a matrix generation section 410, a selection section 430, a dequantization section 440, and an inverse orthogonal transform section 450.

(1) Matrix Generation Section

The matrix generation section 410 generates, from a quantization matrix corresponding to a transform unit of a certain size, a quantization matrix or matrices corresponding to another or other transform units of one or more sizes for each sequence of encoded streams and for each picture. The size of the transform unit on which the generation of a quantization matrix is based may be typically the minimum size among a plurality of sizes of transform units. In this embodiment, the matrix generation section 410 generates 8×8, 16×16, and 32×32 quantization matrices from a 4×4 quantization matrix of the minimum size, using difference matrix information concerning sizes larger than 4×4.

(2) Selection Section

The selection section 430 selects a transform unit (TU) to be used for the inverse orthogonal transform of image data to be decoded from among a plurality of transform units having different sizes. For example, the candidate sizes of the transform unit selectable by the selection section 430 include 4×4 and 8×8 for H.264/AVC, and include 4×4, 8×8, 16×16, and 32×32 for HEVC. The selection section 430 may select a transform unit on the basis of, for example, the LCU, SCU, and split_flag contained in the header of the encoded stream. The selection section 430 then outputs information specifying the size of the selected transform unit to the dequantization section 440 and the inverse orthogonal transform section 450.

(3) Dequantization Section

The dequantization section 440 dequantizes transform coefficient data quantized when the images were encoded, using a quantization matrix corresponding to the transform unit selected by the selection section 430. The quantization matrix used here for a dequantization process includes a matrix generated by the matrix generation section 410. For example, if the selection section 430 selects a transform unit with an 8×8, 16×16, or 32×32 size, a quantization matrix generated from a 4×4 quantization matrix by the matrix generation section 410 may be used as the quantization matrix corresponding to the selected transform unit. The dequantization section 440 then outputs the dequantized transform coefficient data to the inverse orthogonal transform section 450.

(4) Inverse Orthogonal Transform Section

The inverse orthogonal transform section 450 performs an inverse orthogonal transform on the transform coefficient data dequantized by the dequantization section 440 using the selected transform unit in accordance with the orthogonal transform scheme used for encoding to generate prediction error data. The inverse orthogonal transform section 450 then outputs the generated prediction error data to the adder section 315.

1-10. Example Configuration of Matrix Generation Section

Figure 18:
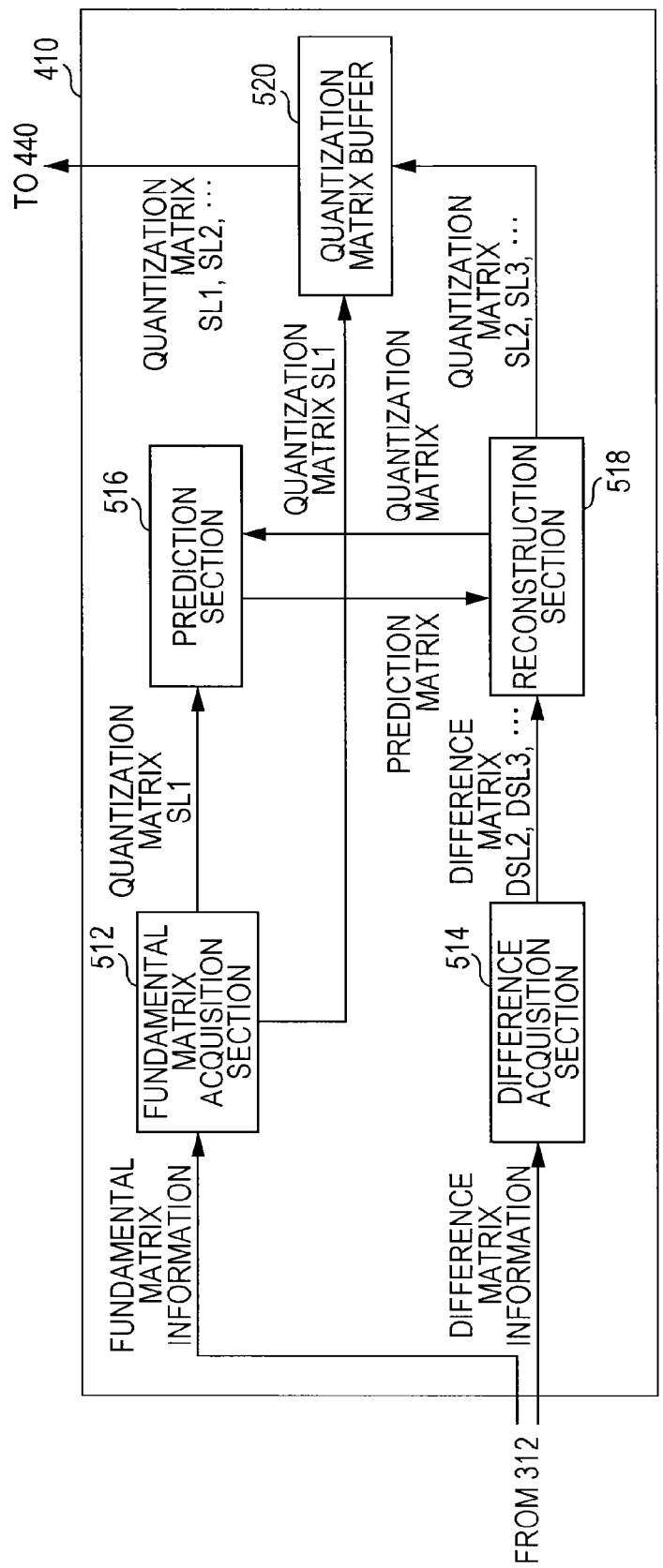
FIG. 18 is a block diagram illustrating a main example configuration of a matrix generation section.

FIG. 18 is a block diagram illustrating an example of a more detailed configuration of the matrix generation section 410 of the dequantization/inverse orthogonal transform section 313 illustrated in FIG. 17. Referring to FIG. 18, the matrix generation section 410 includes a fundamental matrix acquisition section 512, a difference acquisition section 514, a prediction section 516, a reconstruction section 518, and a quantization matrix buffer 520.

(1) Fundamental Matrix Acquisition Section

The fundamental matrix acquisition section 512 acquires fundamental matrix information input from the lossless decoding section 312. In this embodiment, as described above, the fundamental matrix information is, for example, information specifying a 4×4 (or 8×8) quantization matrix SL1 having the minimum size. Then, the fundamental matrix acquisition section 512 causes the 4×4 quantization matrix SL1 specified by the acquired fundamental matrix information to be stored in the quantization matrix buffer 520. Note that if a matrix type flag acquired for each sequence or each picture is equal to "0", the fundamental matrix acquisition section 512 causes a specified 4×4 quantization matrix to be stored in the quantization matrix buffer 520 without acquiring fundamental matrix information. Further, if an update flag acquired for each picture is equal to "0", the fundamental matrix acquisition section 512 does not update the quantization matrix SL1 stored in the quantization matrix buffer 520 in the previous processing. The fundamental matrix acquisition section 512 then outputs the 4×4 quantization matrix SL1 to the prediction section 516.

(2) Difference Acquisition Section

The difference acquisition section 514 acquires difference matrix information (residual matrix information) input from the lossless decoding section 312. In this embodiment, as described above, the difference matrix information is information specifying difference matrices DSL2, DSL3, and DSL4 representing the differences between prediction matrices PSL2, PSL3, and PSL4 predicted from the 4×4 quantization matrix SL1 and quantization matrices SL2, SL3, and SL4, respectively. The difference acquisition section 514 outputs the difference matrices DSL2, DSL3, and DSL4 specified by the difference matrix information to the reconstruction section 518. Note that if a matrix type flag acquired for each sequence or each picture is equal to "0" or if a difference flag is equal to "0", the difference acquisition section 514 sets the difference matrix of the corresponding size to a zero matrix without acquiring difference matrix information. Further, if an update flag acquired for each picture is equal to "0", the difference acquisition section 514 does not output a difference matrix for the corresponding size.

(3) Prediction Section

The prediction section 516 calculates an 8×8 prediction matrix PSL2 having a larger size from the fundamental matrix input from the fundamental matrix acquisition section 512, that is, in this embodiment, from the 4×4 quantization matrix SL1. The prediction section 516 further calculates a 16×16 prediction matrix PSL3 from a quantization matrix SL2 reconstructed by the reconstruction section 518 using the calculated 8×8 prediction matrix PSL2. The prediction section 516 further calculates a 32×32 prediction matrix PSL4 from a quantization matrix SL3 reconstructed by the reconstruction section 518 using the calculated 16×16 prediction matrix PSL3. The prediction section 516 outputs the prediction matrices PSL2, PSL3, and PSL4 to the reconstruction section 518. Note that the prediction section 516 does not generate a prediction matrix for a size for which the matrix type flag is equal to "0", and uses a specified quantization matrix to calculate a prediction matrix of a larger size. Further, the fundamental matrix acquisition section 512 does not also generate a prediction matrix for a size for which the update flag is equal to "0", and uses a quantization matrix generated in the previous processing to calculate a prediction matrix of a larger size.

(4) Reconstruction Section

The reconstruction section 518 adds together the prediction matrices PSL2, PSL3, and PSL4 input from the prediction section 516 and the difference matrices DSL2, DSL3, and DSL4 input from the difference acquisition section 514 to reconstruct the quantization matrices SL2, SL3, and SL4, respectively.

Then, the reconstruction section 518 causes the reconstructed 8×8, 16×16, and 32×32 quantization matrices SL2, SL3, and SL4 to be stored in the quantization matrix buffer 520. Note that if a matrix type flag acquired for each sequence or each picture is equal to "0", the reconstruction section 518 causes a specified quantization matrix to be stored in the quantization matrix buffer 520 as a quantization matrix of the corresponding size. Further, if an update flag acquired for each picture is equal to "0", the fundamental matrix acquisition section 512 does not update the quantization matrix SL2, SL3, or SL4 having the corresponding size stored in the quantization matrix buffer 520 in the previous processing.

(5) Quantization Matrix Buffer

The quantization matrix buffer 520 temporarily stores the quantization matrix SL1 specified by the fundamental matrix acquisition section 512 and the quantization matrices SL2, SL3, and SL4 reconstructed by the reconstruction section 518. The quantization matrices SL1, SL2, SL3, and SL4 stored in the quantization matrix buffer 520 are used by the dequantization section 440 to perform a dequantization process on the quantized transform coefficient data.

1-11. Detailed Example Configuration of Matrix Generation Section

Figure 19:
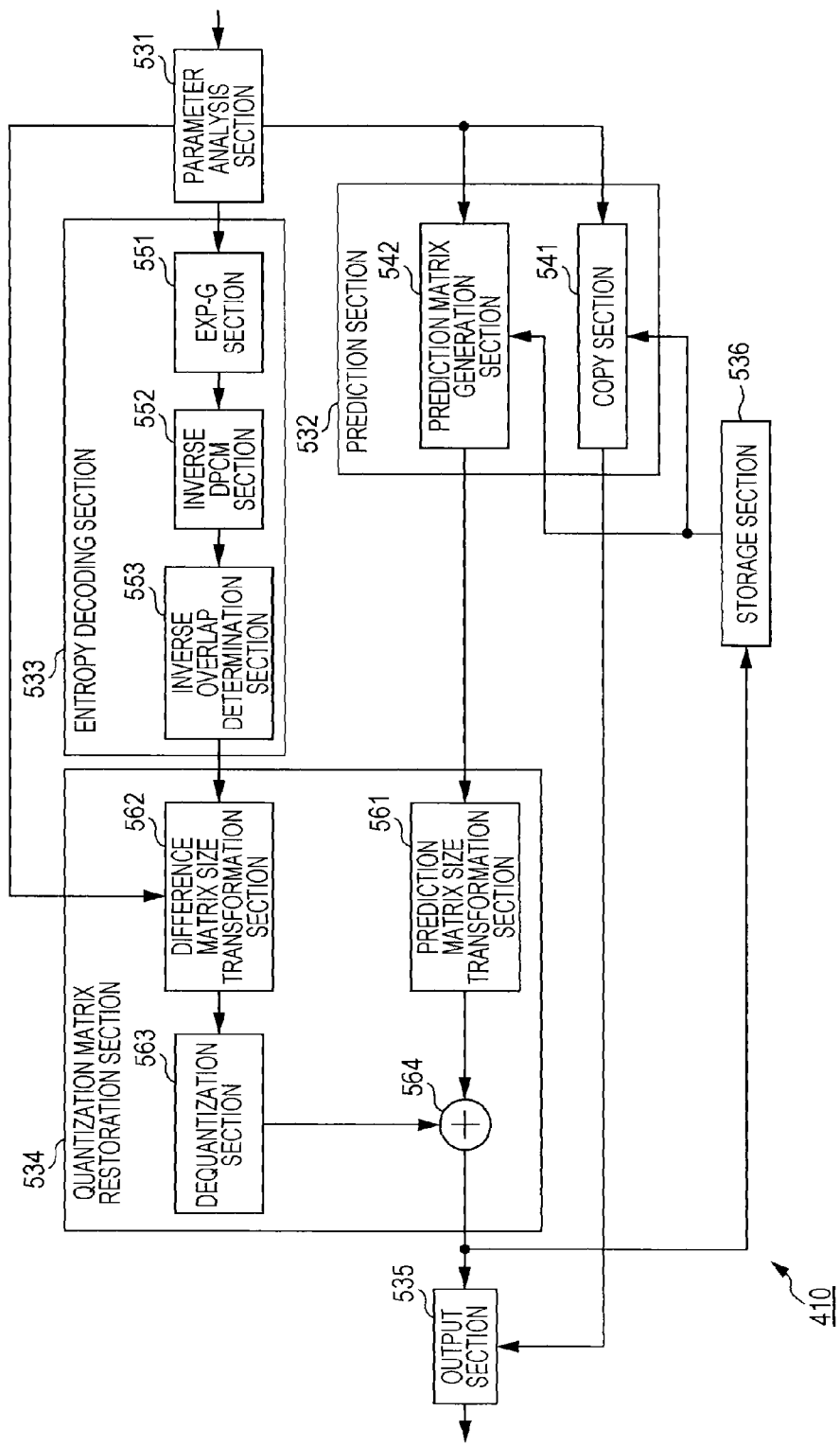
FIG. 19 is a block diagram illustrating a main example configuration of the matrix generation section.

FIG. 19 is a block diagram illustrating an example of a more detailed configuration of the matrix generation section 410 illustrated in FIG. 18. Referring to FIG. 19, the matrix generation section 410 includes a parameter analysis section 531, a prediction section 532, an entropy decoding section 533, a quantization matrix restoration section 534, an output section 535, and a storage section 536.

The parameter analysis section 531 analyzes the various flags and parameters related to the quantization matrix, which are supplied from the lossless decoding section 312. In accordance with the analysis results, the parameter analysis section 531 supplies various information supplied from the lossless decoding section 312, such as encoded data of the difference matrix, to the prediction section 532 or the entropy decoding section 533.

For example, if pred_mode is equal to 0, the parameter analysis section 531 determines that the current mode is a copy mode, and supplies pred_matrix_id_delta to a copy section 541. Further, for example, if pred_mode is equal to 1, the parameter analysis section 531 determines that the current mode is a full-scan mode (normal case), and supplies pred_matrix_id_delta and pred_size_id_delta to a prediction_ _ matrix generation section 542.

Further, for example, if residual_flag is equal to true, the parameter analysis section 531 supplies the encoded data of the quantization matrix (extended Golomb codes) supplied from the lossless decoding section 312 to an exp-G section 551 of the entropy decoding section 533. The parameter analysis section 531 further supplies residual_symmetry_ flag to the exp-G section 551.

Further, the parameter analysis section 531 supplies residual_down_sampling_flag to a difference matrix size transformation section 562 of the quantization matrix restoration section 534.

The prediction section 532 generates a prediction matrix in accordance with the control of the parameter analysis section 531. As illustrated in FIG. 19, the prediction section 532 includes the copy section 541 and the prediction matrix generation section 542.

In the copy mode, the copy section 541 creates a copy of a previously transmitted quantization matrix, and uses the copy as a prediction matrix. More specifically, the copy section 541 reads a previously transmitted quantization matrix corresponding to pred_matrix_id_delta and having the same size as the quantization matrix for the current region from the storage section 536, uses the read quantization matrix as a prediction image, and supplies the prediction image to the output section 535.

In the normal case, the prediction matrix generation section 542 generates (predicts) a prediction matrix using a previously transmitted quantization matrix. More specifically, the prediction matrix generation section 542 reads a previously transmitted quantization matrix corresponding to pred_matrix_id_delta and pred_size_id_delta from the storage section 536, and generates a prediction matrix using the read quantization matrix. In other words, the prediction matrix generation section 542 generates a prediction matrix similar to the prediction matrix generated by the prediction matrix generation section 172 (FIG. 4) of the image encoding device 10. The prediction matrix generation section 542 supplies the generated prediction matrix to a prediction matrix size transformation section 561 of the quantization matrix restoration section 534.

The entropy decoding section 533 restores a difference matrix from the extended Golomb codes supplied from the parameter analysis section 531. As illustrated in FIG. 19, the entropy decoding section 533 includes the exp-G section 551, an inverse DPCM section 552, and an inverse overlap determination section 553.

The exp-G section 551 performs signed or unsigned exponential Golomb decoding (hereinafter also referred to as extended Golomb decoding) to restore DPCM data. The exp-G section 551 supplies the restored DPCM data together with residual_symmetry_flag to the inverse DPCM section 552.

The inverse DPCM section 552 performs DPCM decoding on data from which an overlapping portion has been removed to generate residual data from the DPCM data. The inverse DPCM section 552 supplies the generated residual data together with residual_symmetry_flag to the inverse overlap determination section 553.

If residual_symmetry_flag is equal to true, that is, if the residual data is a remaining portion of a 135-degree symmetry matrix from which the data (matrix elements) of the overlapping symmetric part has been removed, the inverse overlap determination section 553 restores the data of the symmetric part. In other words, a difference matrix of a 135-degree symmetry matrix is restored. Note that if residual_symmetry_flag is not equal to true, that is, if the residual data represents a matrix that is not a 135-degree symmetry matrix, the inverse overlap determination section 553 uses the residual data as a difference matrix without restoring data of a symmetric part. The inverse overlap determination section 553 supplies the difference matrix restored in the manner described above to the quantization matrix restoration section 534 (the difference matrix size transformation section 562).

The quantization matrix restoration section 534 restores a quantization matrix. As illustrated in FIG. 19, the quantization matrix restoration section 534 includes the prediction matrix size transformation section 561, the difference matrix size transformation section 562, a dequantization section 563, and a computation section 564.

If the size of the prediction matrix supplied from the prediction section 532 (the prediction matrix generation section 542) is different from the size of the restored quantization matrix for the current region, the prediction matrix size transformation section 561 converts the size of the prediction matrix.

For example, if the size of the prediction matrix is larger than the size of the quantization matrix, the prediction matrix size transformation section 561 down-converts the prediction matrix. Further, for example, if the size of the prediction matrix is smaller than the size of the quantization matrix, the prediction matrix size transformation section 561 up-converts the prediction matrix. The same conversion method as that of the prediction matrix size transformation section 181 (FIG. 4) of the image encoding device 10 is selected.

The prediction matrix size transformation section 561 supplies the prediction matrix whose size has been made to match that of the quantization matrix to the computation section 564.

If residual_down_sampling_flag is equal to true, that is, if the size of the transmitted difference matrix is smaller than the size of the current region to be dequantized, the difference matrix size transformation section 562 up-converts the size of the difference matrix to a size corresponding to the current region to be dequantized. Any up-conversion method may be used. For example, a method corresponding to the down-conversion method performed by the difference matrix size transformation section 163 (FIG. 4) of the image encoding device 10 may be used.

For example, if the difference matrix size transformation section 163 has downsampled the difference matrix, the difference matrix size transformation section 562 may upsample the difference matrix. Further, if the difference matrix size transformation section 163 has subsampled the difference matrix, the difference matrix size transformation section 562 may perform inverse subsampling on the difference matrix.

Figure 20:
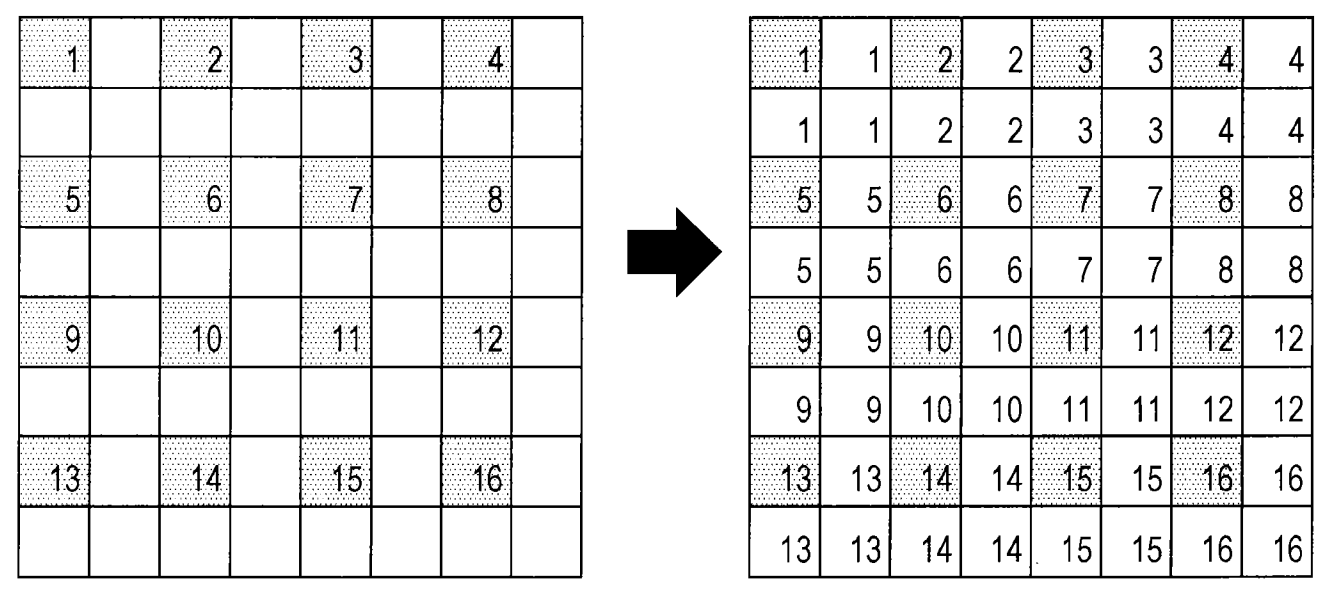

For example, as illustrated in FIG. 20, the difference matrix size transformation section 562 may perform interpolation using a nearest neighbor interpolation process interpolation process (a nearest neighbor interpolation process) rather than general linear interpolation. The nearest neighbor interpolation process enables a reduction in memory capacity.

Accordingly, even if a quantization matrix of a large size is not transmitted, there is no need to hold upsampled data when upsampling from a quantization matrix of a small size is performed. In addition, an intermediate buffer or the like is no longer necessary for the storage of data to be used for computation during upsampling.

Note that if residual_down_sampling_flag is not equal to true, that is, if the difference matrix is transmitted with the same size as that when the difference matrix was used for a quantization process, the difference matrix size transformation section 562 omits the up-conversion of the difference matrix (or may up-convert the difference matrix by a factor of 1).

The difference matrix size transformation section 562 supplies the difference matrix up-converted in the manner described above, as necessary, to the dequantization section 563.

The dequantization section 563 dequantizes the supplied difference matrix (quantized data) using a method corresponding to that for quantization performed by the quantization section 183 (FIG. 4) of the image encoding device 10, and supplies the dequantized difference matrix to the computation section 564. Note that if the quantization section 183 is omitted, that is, if the difference matrix supplied from the difference matrix size transformation section 562 is not quantized data, the dequantization section 563 may be omitted.

The computation section 564 adds together the prediction matrix supplied from the prediction matrix size transformation section 561 and the difference matrix supplied from the dequantization section 563, and restores a quantization matrix for the current region. The computation section 564 supplies the restored quantization matrix to the output section 535 and the storage section 536.

The output section 535 outputs the supplied information to a section outside the matrix generation section 410. For example, in the copy mode, the output section 535 supplies the prediction matrix supplied from the copy section 541 to the dequantization section 440 as a quantization matrix for the current region. Further, for example, in the normal case, the output section 535 supplies the quantization matrix for the current region supplied from the quantization matrix restoration section 534 (the computation section 564) to the dequantization section 440.

The storage section 536 stores the quantization matrix supplied from the quantization matrix restoration section 534 (the computation section 564) together with the size and the list ID of the quantization matrix. The information concerning the quantization matrix stored in the storage section 536 is used to generate prediction matrices of other orthogonal transform units which are processed later in time. In other words, the storage section 536 supplies the stored information concerning the quantization matrix to the prediction section 532 as information concerning a previously transmitted quantization matrix.

As described above, the matrix generation section 410 up-converts a quantization matrix (difference matrix) having a size less than or equal to the transmission size to a size corresponding to the current region to be dequantized. Accordingly, the image decoding device 300 can suppress an increase in the amount of coding of a quantization matrix.

1-12. Flow of Quantization Matrix Decoding Process

Figure 21:
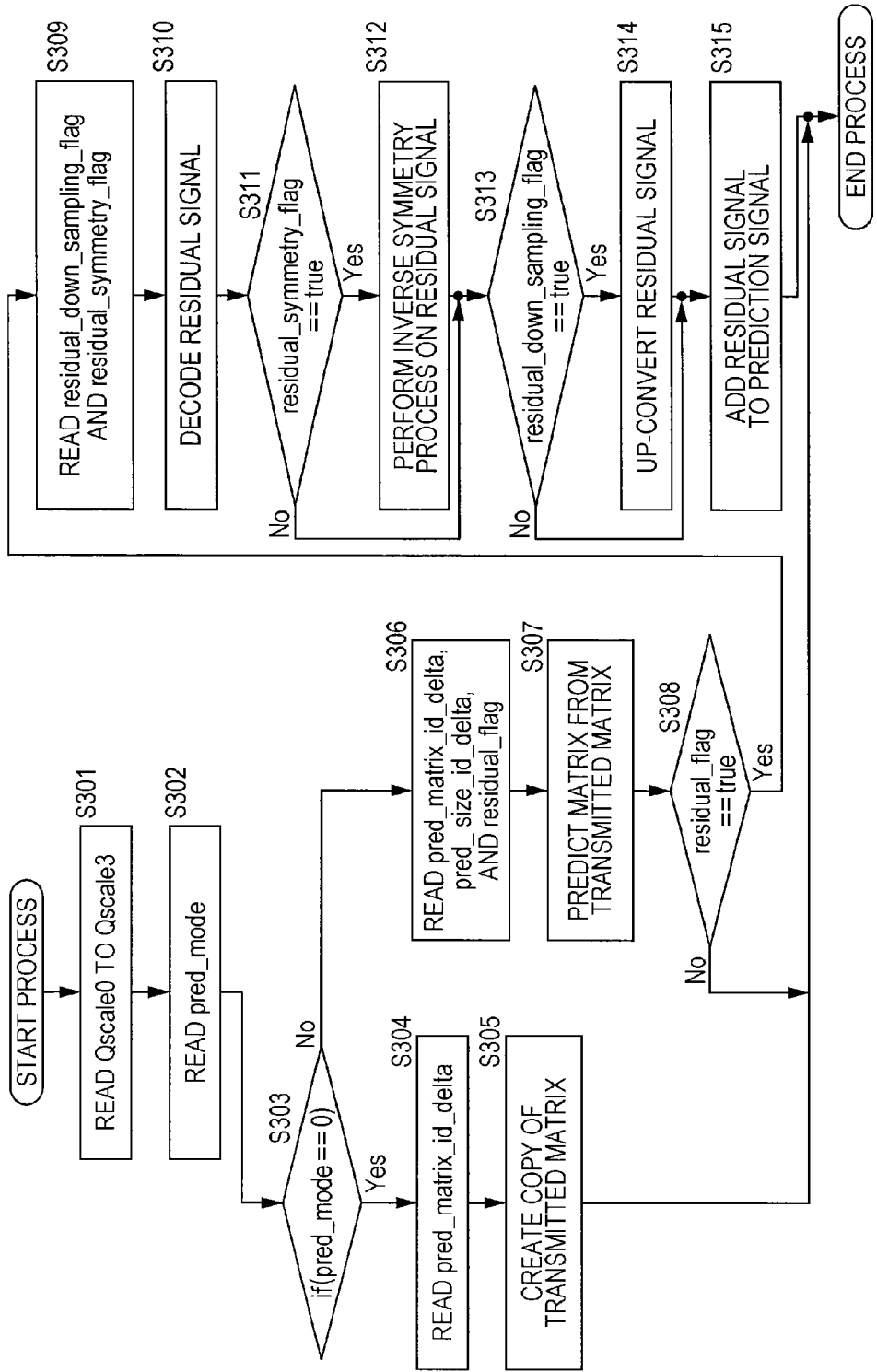
FIG. 21 is a flowchart illustrating an example of the flow of a matrix generation process.

An example of the flow of a quantization matrix decoding process executed by the matrix generation section 410 described above will be described with reference to a flowchart illustrated in FIG. 21.

When a quantization matrix decoding process is started, in step S301, the parameter analysis section 531 reads the quantized values (Qscale0 to Qscale3) of regions 0 to 3.

In step S302, the parameter analysis section 531 reads pred_mode. In step S303, the parameter analysis section 531 determines whether or not pred_mode is equal to 0. If it is determined that pred_mode is equal to 0, the parameter analysis section 531 determines that the current mode is a copy mode, and causes the process to proceed to step S304.

In step S304, the parameter analysis section 531 reads pred_matrix_id_delta. In step S305, the copy section 541 creates a copy of a quantization matrix that has been transmitted, and uses the copy as a prediction matrix. In the copy mode, the prediction matrix is output as the quantization matrix for the current region. When the processing of step S305 is completed, the copy section 541 causes the quantization matrix decoding process to end.

Further, if it is determined in step S303 that pred_mode is not equal to 0, the parameter analysis section 531 determines that the current mode is a full-scan mode (normal case), and causes the process to proceed to step S306.

In step S306, the parameter analysis section 531 reads pred_matrix_id_delta, pred_size_id_delta, and residual_flag. In step S307, the prediction matrix generation section 542 generates a prediction matrix from a quantization matrix that has been transmitted.

In step S308, the parameter analysis section 531 determines whether or not residual_flag is equal to true. If it is determined that residual_flag is not equal to true, no residual matrix exists, and the prediction matrix generated in step S307 is output as the quantization matrix for the current region. In this case, therefore, the parameter analysis section 531 causes the quantization matrix decoding process to end.

Further, if it is determined in step S308 that residual_flag is equal to true, the parameter analysis section 531 causes the process to proceed to step S309.

In step S309, the parameter analysis section 531 reads residual_down_sampling_flag, and residual_symmetry_flag.

In step S310, the exp-G section 551 and the inverse DPCM section 552 decode extended Golomb codes of the residual matrix, and generate residual data.

In step S311, the inverse overlap determination section 553 determines whether or no: residual_symmetry_flag is equal to true. If it is determined that residual_symmetry_flag is equal to true, the inverse overlap determination section 553 causes the process to proceed to step S312, and restores the removed overlapping portion of the residual data (performs an inverse symmetry process). When a difference matrix that is a 135-degree symmetry matrix is generated in the manner described above, the inverse overlap determination section 553 causes the process to proceed to step S313.

Further, if it is determined in step S311 that residual_symmetry_flag is not equal to true (if the residual data is a difference matrix that is not a 135-degree symmetry matrix), the inverse overlap determination section 553 causes the process to proceed to step S313 while omitting the processing of step S312 (without performing inverse symmetry processing).

In step S313, the difference matrix size transformation section 562 determines whether or not residual_down_sampling_flag is equal to true. If it is determined that residual_down_sampling_flag is equal to true, the difference matrix size transformation section 562 causes the process to proceed to step S314, and up-converts the difference matrix to a size corresponding to the current region to be dequantized. After the difference matrix is up-converted, the difference matrix size transformation section 562 causes the process to proceed to step S315.

Further, if it is determined in step S313 that residual_down_sampling_flag is not equal to true, the difference matrix size transformation section 562 causes the process to proceed to step S315 while omitting the processing of step S312 (without up-converting the difference matrix).

In step S315, the computation section 564 adds the difference matrix to the prediction matrix to generate a quantization matrix for the current region. When the processing of step S315 is completed, the quantization matrix decoding process ends.

By performing a quantization matrix decoding process in the manner described above, the image decoding device 300 can suppress an increase in the amount of coding of a quantization matrix.

2. Second Embodiment

2-1. Other Example of Matrix Processing Section

Figure 22:
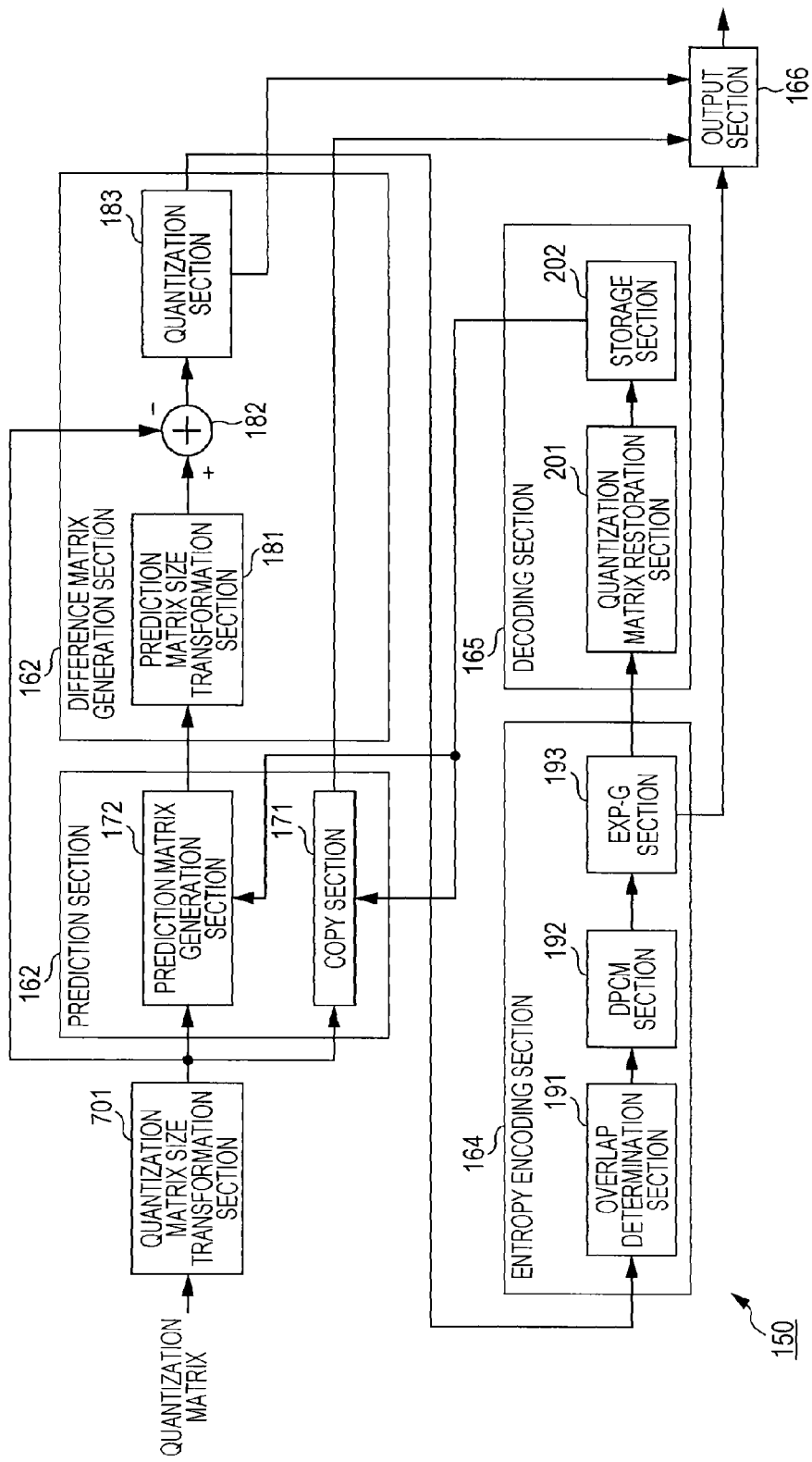
FIG. 22 is a block diagram illustrating another example configuration of the matrix processing section.

FIG. 22 is a block diagram illustrating another example configuration of the matrix processing section 150 to which the present technology is applied.

In the example illustrated in FIG. 22, the matrix processing section 150 does not include the difference matrix size transformation section 163 which is included in the configuration illustrated in FIG. 4. In other words, the output of the quantization section 183 is supplied to the overlap determination section 191 of the entropy encoding section 164.

The matrix processing section 150 illustrated in FIG. 22 further includes a quantization matrix size transformation section 701.

The quantization matrix size transformation section 701 converts the size of a quantization coefficient input to the matrix processing section 150 to a size less than or equal to a maximum size for transmission (transmission size). The converted size is arbitrary as long as the size is less than or equal to the transmission size. A minimum size as much as possible may be used to reduce the amount of coding of a quantization matrix as much as possible. In addition, the processing of the quantization matrix size transformation section 701 or the prediction matrix size transformation section 181 can only be down-conversion, making it possible to simplify (facilitate) the processing of the quantization matrix size transformation section 701 and the prediction matrix size transformation section 181.

In this case, the prediction matrix size transformation section 181 converts the size of the prediction matrix to the size of the down-converted quantization matrix.

Note that, similarly to the first embodiment, these conversion (down-conversion) methods are arbitrary, and may include downsampling and subsampling.

That is, in this case, a difference matrix of the same size as that of the quantization matrix converted by the quantization matrix size transformation section 701 is encoded and transmitted.

Accordingly, similarly to the first embodiment, the image encoding device 10 can suppress an increase in the amount of coding of a quantization matrix.

2-2. Other Example of Flow of Quantization Matrix Encoding Process

Figure 23:
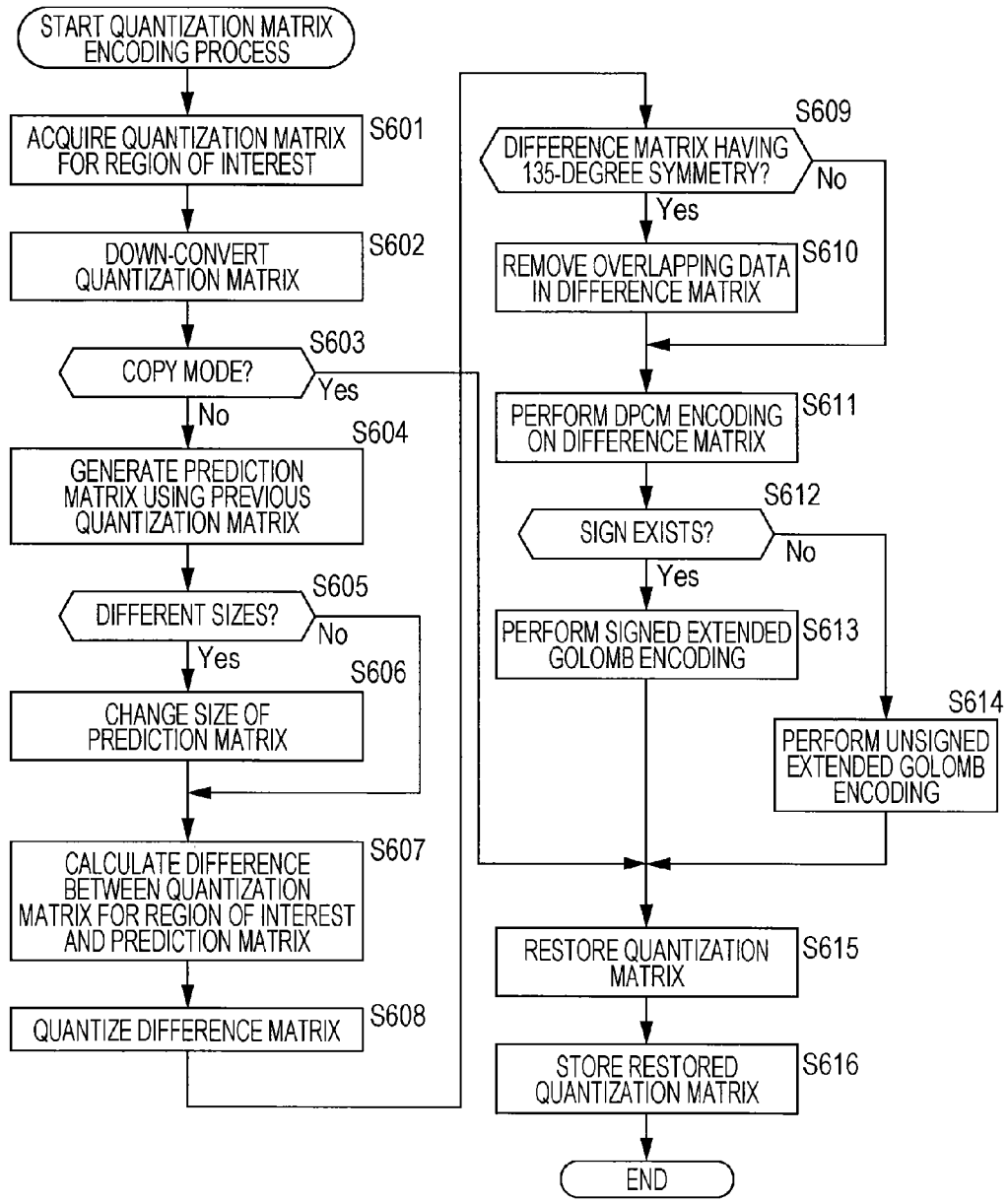
FIG. 23 is a flowchart illustrating another example of the flow of the quantization matrix encoding process.

An example of the flow of a quantization matrix encoding process in the above-described exemplary case is as illustrated in a flowchart of FIG. 23.

Specifically, when a quantization matrix encoding process is started, in step S601, the quantization matrix size transformation section 701 acquires a quantization matrix for a current region. Then, in step S602, the quantization matrix size transformation section 701 down-converts the quantization matrix to a predetermined size.

Figure 7:
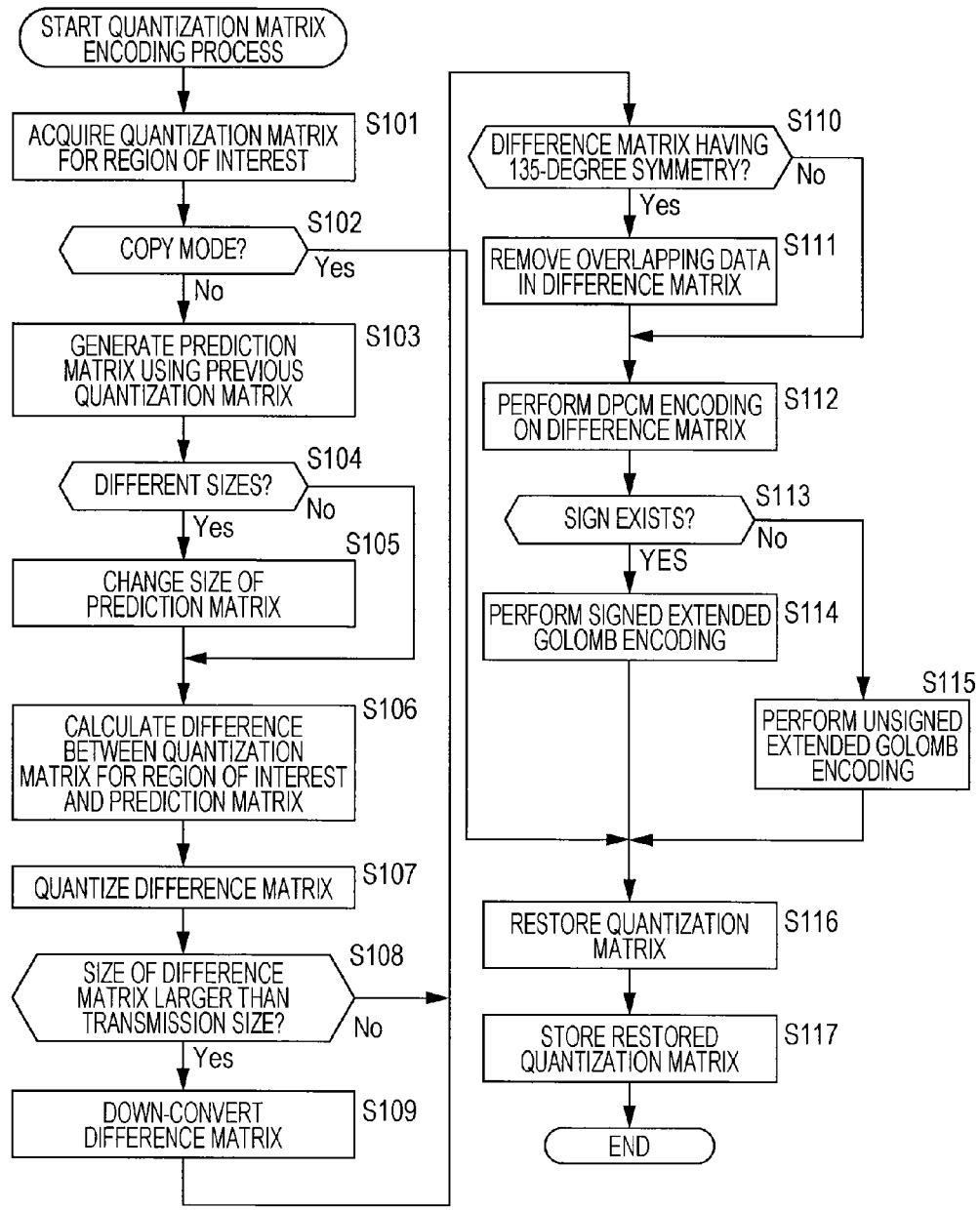
FIG. 7 is a flowchart illustrating an example of the flow of a quantization matrix encoding process.

The processing of steps S603 to S608 is executed in a manner similar to that of the processing of steps S102 to S107 in FIG. 7. The processing corresponding to steps S108 and S109 in FIG. 7 is not performed (omitted), and the processing of steps S609 to S616 is executed in a manner similar to the processing of steps S110 to S117 in FIG. 7.

The matrix processing section 150 performs a quantization matrix encoding process in the manner described above. Accordingly, similarly to the first embodiment, the image encoding device 10 can suppress an increase in the amount of coding of a quantization matrix.

2-3. Other Example of Matrix Generation Section

Figure 24:
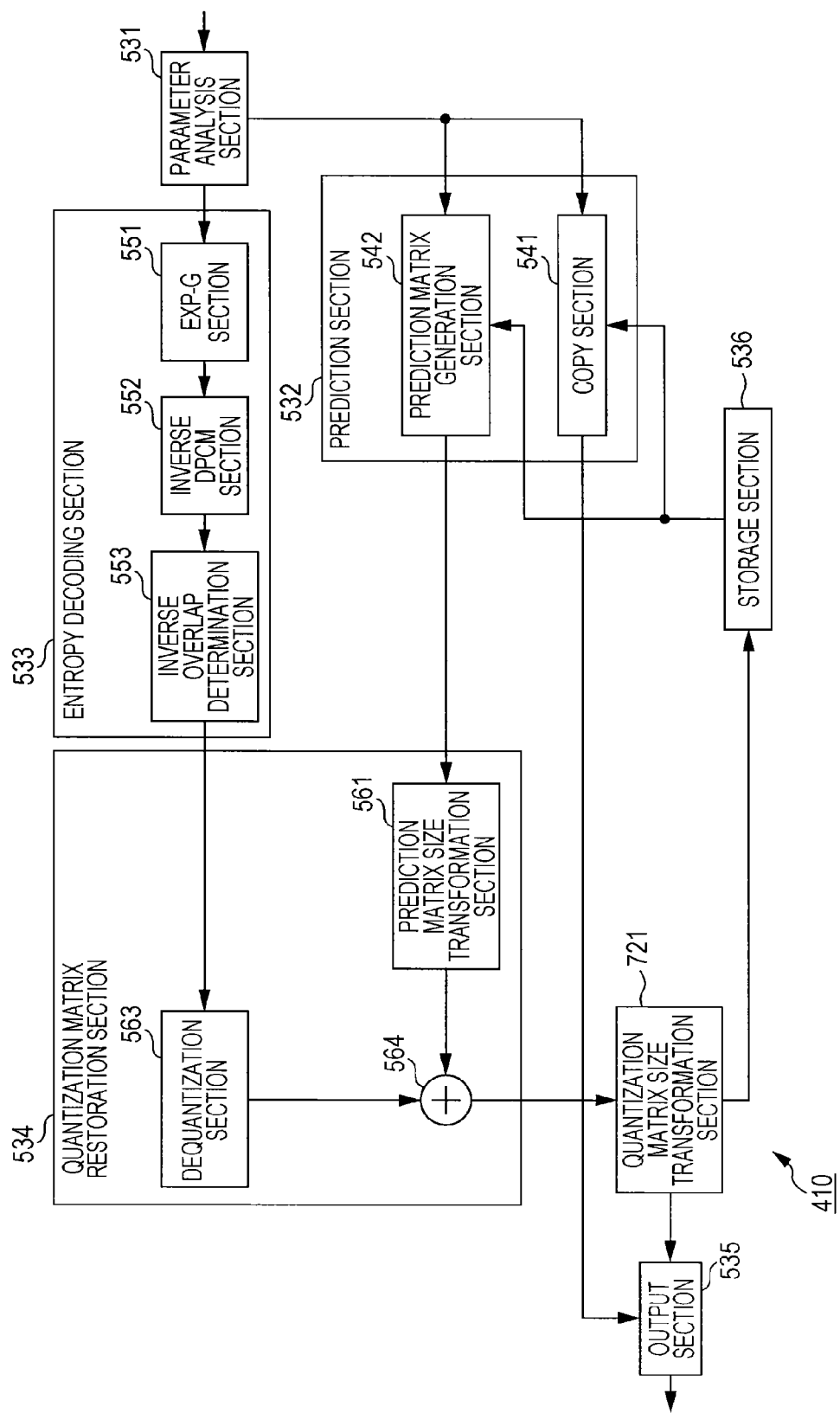
FIG. 24 is a block diagram illustrating another example configuration of the matrix generation section.

FIG. 24 is a block diagram illustrating another example configuration of the matrix generation section 410 of the image decoding device 300. The matrix generation section 410 illustrated in FIG. 24 is a processing section corresponding to the matrix processing section 150 illustrated in FIG. 22. Specifically, the matrix generation section 410 illustrated in FIG. 24 decodes the encoded data (various flags and parameters, extended Golomb codes generated from a difference matrix, etc.) concerning a quantization matrix generated by the matrix processing section 150 illustrated in FIG. 22, and restores a quantization matrix for the current region.

Also in this case, the matrix generation section 410 basically has a configuration similar to that in the example illustrated in FIG. 19 but does not include the difference matrix size transformation section 562, unlike the example illustrated in FIG. 19. Accordingly, the difference matrix output from the inverse overlap determination section 553 is supplied to the dequantization section 563.

In addition, in the example illustrated in FIG. 24, unlike the example illustrated in FIG. 19, the matrix generation section 410 further includes a quantization matrix size transformation section 721.

The quantization matrix size transformation section 721 is a processing section corresponding to the quantization matrix size transformation section 701 illustrated in FIG. 22, for performing a process opposite to the process of the quantization matrix size transformation section 701. Specifically, the quantization matrix size transformation section 721 up-converts a quantization matrix of a smaller size than a maximum size allowed for transmission (transmission size) to a size corresponding to the current region to be dequantized.

The quantization matrix size transformation section 721 acquires the quantization matrix generated by the computation section 564 by adding the prediction matrix to the difference matrix. The size of the quantization matrix is equal to the size obtained by down-conversion by the quantization matrix size transformation section 701. The quantization matrix size transformation section 721 up-converts the size of the quantization matrix to a size corresponding to the current region to be dequantized. The quantization matrix size transformation section 721 supplies the up-converted quantization matrix to the output section 535 to supply the up-converted quantization matrix to the dequantization section 440, or supplies the up-converted quantization matrix to the storage section 536 for storage.

Accordingly, also in this case, the matrix generation section 410 up-converts the quantization matrix down-converted to a size less than or equal to the transmission size before being transmitted to a size corresponding to the current region to be dequantized. Accordingly, the image decoding device 300 can suppress an increase in the amount of coding of a quantization matrix.

The flow of the quantization matrix decoding process in this exemplary case is basically similar to that described with reference to the flowchart illustrated in FIG. 21, except the following processing: Instead of a residual matrix being up-converted in step S314, the quantization matrix size transformation section 721 up-converts the quantization matrix generated by the processing of step S315.

The matrix generation section 410 performs a quantization matrix decoding process in the manner described above. Accordingly, similarly to the first embodiment, the image decoding device 300 can suppress an increase in the amount of coding of a quantization matrix.

3. Third Embodiment

Upconversion

Figure 25:
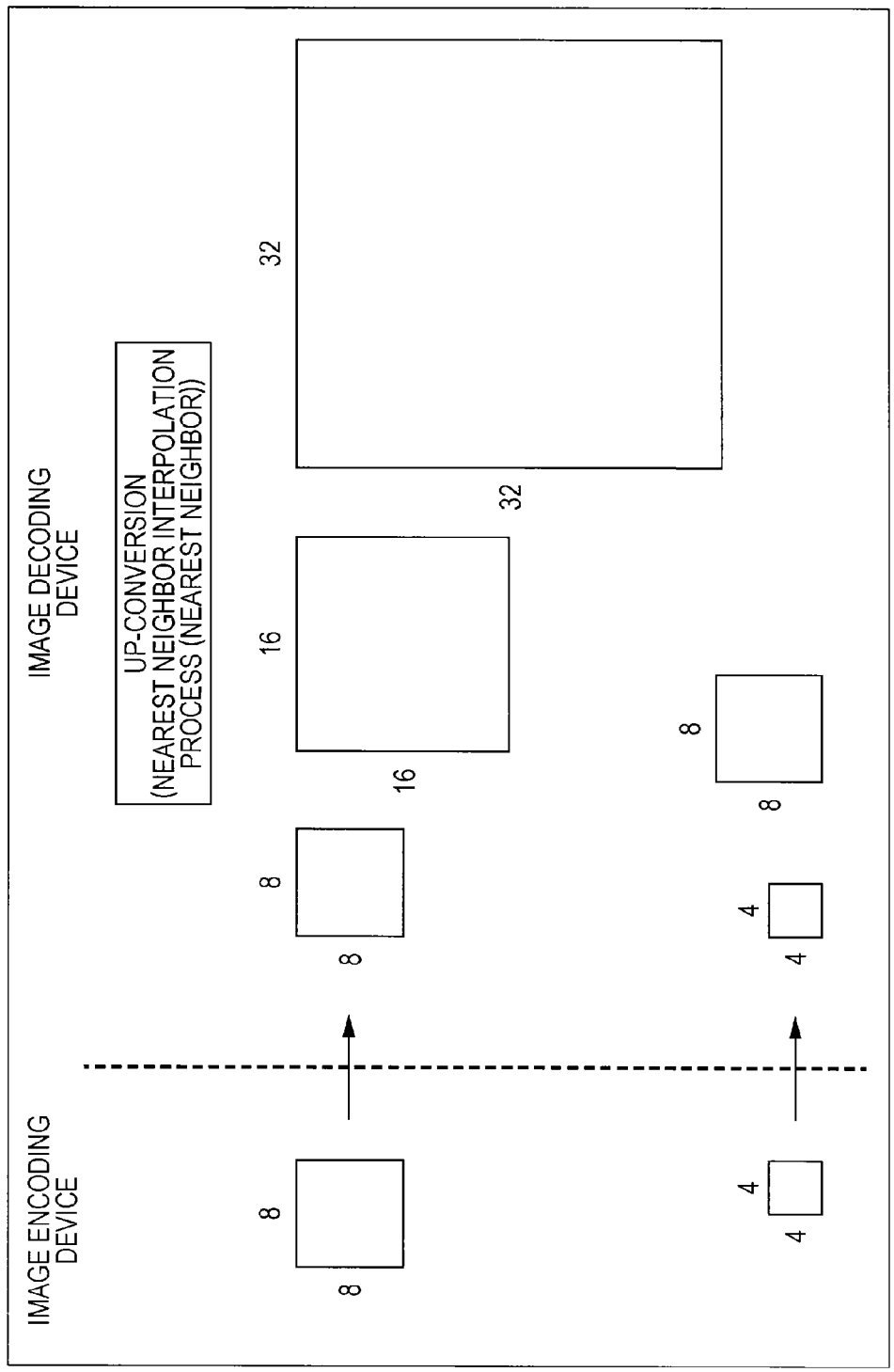
FIG. 25 is a diagram illustrating an example of how a difference matrix is transmitted.

FIG. 25 is a diagram illustrating an example of how a difference matrix is transmitted. The size of a quantization matrix (difference matrix between a quantization matrix and a prediction matrix thereof) to be transmitted from the image encoding device 10 (FIG. 1) to the image decoding device 300 (FIG. 16) is limited to a size less than or equal to a predetermined maximum size (transmission size). For example, the size of a quantization matrix to be transmitted from the image encoding device 10 to the image decoding device 300 is limited to the same size as the size (also referred to as a default quantization matrix size) of a fundamental matrix prepared in advance (also referred to as a default quantization matrix). That is, in this case, the transmission size is equal to a maximum value of a default quantization matrix size. For example, if a 4×4 quantization matrix and an 8×8 quantization matrix are set as default quantization matrices, the transmission size is 8×8.

Specifically, if a quantization matrix used in a quantization process is larger than the transmission size, the image encoding device 10 down-converts the quantization matrix or the prediction matrix to the transmission size or less or down-converts a determined difference matrix to the transmission size or less to generate a difference matrix of a size less than or equal to the transmission size. This down-conversion operation is performed by, for example, the difference matrix size transformation section 163, the prediction matrix size transformation section 181, the quantization matrix size transformation section 701, and the like.

The image decoding device 300 up-converts the transmitted difference matrix or a quantization matrix determined from the difference matrix to a size corresponding to the current region to be dequantized, and uses the up-converted matrix in the dequantization process. That is, if the transmission size is equal to the maximum value of the default quantization matrix size, the image decoding device 300 receives a quantization matrix of the same size as the default quantization matrix size. For example, the image decoding device 300 receives a quantization matrix of the same size as the maximum size of the default quantization matrix. The image decoding device 300 performs a dequantization process using the received quantization matrix or using a quantization matrix obtained by the up-conversion of the quantization matrix. Note that this up-conversion operation is performed by, for example, the difference matrix size transformation section 562, the prediction matrix size transformation section 561, the quantization matrix size transformation section 721, and the like.

Note that the image encoding device 10 may also transmit a quantization matrix (difference matrix) having a smaller size than a maximum size allowed for transmission (transmission size), which is different from the quantization matrix (difference matrix) used in the quantization process, to the image decoding device 300. For example, the image encoding device 10 may prepare a plurality of quantization matrices (difference matrices) having different sizes, select a quantization matrix from among the quantization matrices, and use the selected quantization matrix for the quantization process. In this case, when performing a quantization process using a quantization matrix of a larger size than the transmission size among a prepared matrix group, the image encoding device 10 may transmit a quantization matrix (difference matrix) having a smaller size than the transmission size among the matrix group, instead of down-converting the quantization matrix. In other words, in this case, the size transformation (down-conversion) operation of the image encoding device 10 is omitted. Additionally, the image encoding device 10 can also up-convert a quantization matrix (difference matrix) having a smaller size than the transmission size and perform a quantization process. Also in this case, similarly, the size transformation (down-conversion) operation of the image encoding device 10 is omitted.

Whatever the case may be, only a quantization matrix (difference matrix) having a size less than or equal to the transmission size is transmitted regardless of whether or not size transformation (down-conversion) is actually to be performed. That is, the image decoding device 300 performs size transformation (up-conversion) on the transmitted quantization matrix to a size corresponding to the current region to be dequantized (such as a CU or a TU) regardless of whether or not the image encoding device 10 has actually performed size transformation (down-conversion).

The image decoding device 300 omits the size transformation (up-conversion) of the quantization matrix (difference matrix) (or may perform size transformation by a factor of 1) only when the size used in the quantization process is the same as the size during transmission.

For example, it is assumed that the transmission size is 8×8. In this case, for example, a difference matrix is transmitted as an 8×8 square matrix or a 4×4 square matrix. For example, as illustrated in the upper part of FIG. 25, when a difference matrix is to be transmitted as an 8×8 square matrix, the image decoding device 300 up-converts the difference matrix to a size corresponding to the current region to be dequantized, such as a 16×16 square matrix or a 32×32 square matrix. Further, for example, as illustrated in the lower part of FIG. 25, when a difference matrix is to be transmitted as a 4×4 square matrix, the difference matrix is up-converted to a size corresponding to the current region to be dequantized, such as an 8×8 square matrix.

As a matter of course, this difference matrix may also be up-converted to a size other than the sizes in the example illustrated in FIG. 25 (e.g., a 64×64 square matrix).

Note that if the size of the current region to be dequantized is equal to the size of the transmitted quantization matrix, this up-conversion is omitted (or size transformation by a factor of 1 is performed), and an 8×8 square matrix is used in the form of an 8×8 difference matrix as it is. Also, a 4×4 square matrix is used in the form of a 4×4 difference matrix as it is.

For example, it is assumed that the image encoding device 10 quantizes 4×4 blocks using a 4×4 quantization matrix, quantizes 8×8 blocks using an 8×8 quantization matrix, up-converts the 8×8 quantization matrix to generate a 16×16 quantization matrix, quantizes 16×16 blocks using the 16×16 quantization matrix, up-converts the 8×8 quantization matrix to generate a 32×32 quantization matrix, quantizes 32×32 blocks using the 32×32 quantization matrix, and transmits the 4×4 quantization matrix and the 8×8 quantization matrix to the image decoding device 300. Also in this case, similarly to the image encoding device 10, the image decoding device 300 quantizes 4×4 blocks using the received 4×4 quantization matrix, and quantizes 8×8 blocks using the received 8×8 quantization matrix. Further, similarly to the image encoding device 10, the image decoding device 300 up-converts the received 8×8 quantization matrix to generate a 16×16 quantization matrix, quantizes 16×16 blocks using the 16×16 quantization matrix, up-converts the received 8×8 quantization matrix to generate a 32×32 quantization matrix, and quantizes 32×32 blocks using the 32×32 quantization matrix.

Figure 26:
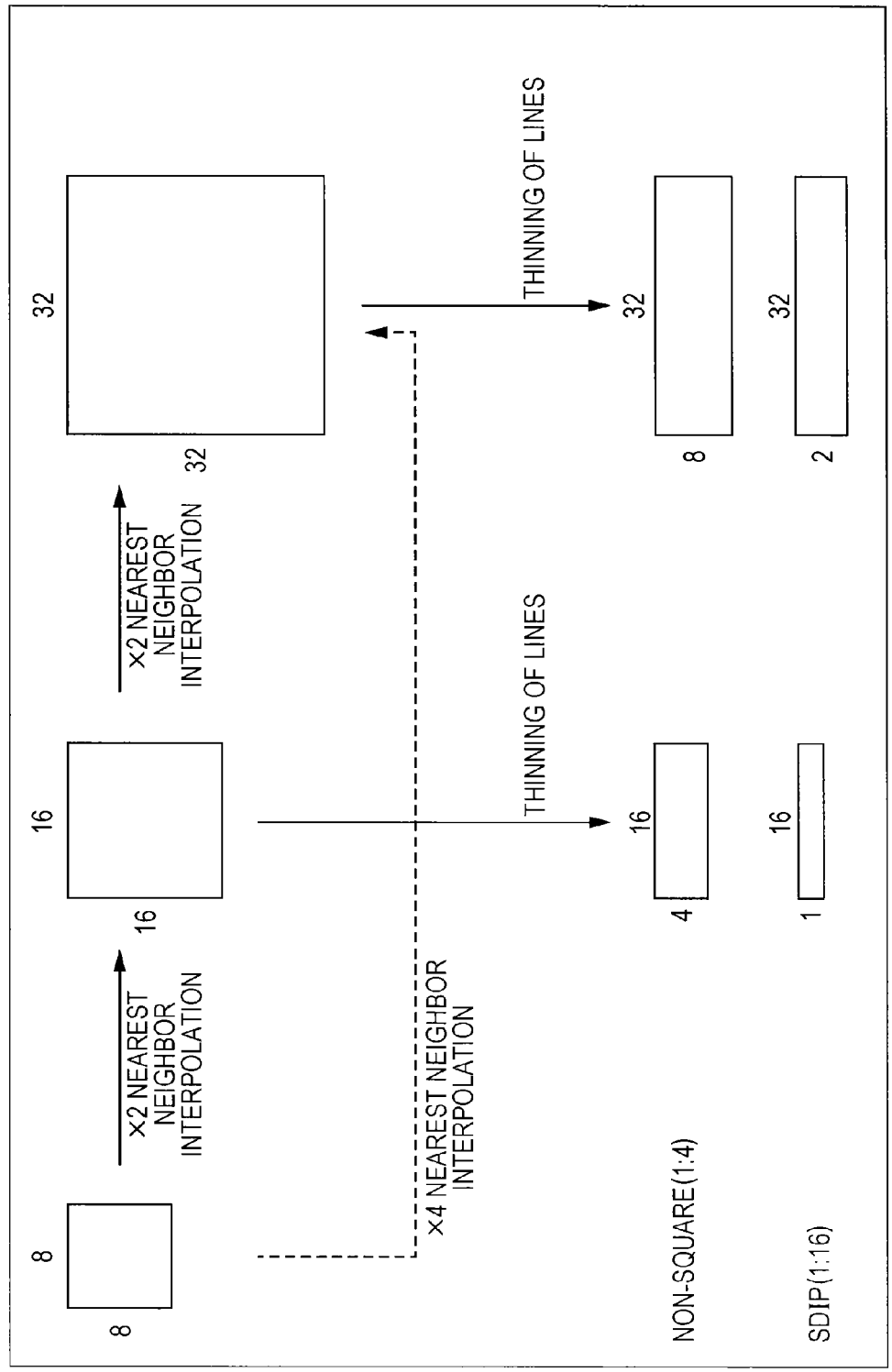
FIG. 26 is a diagram illustrating an example of how up-conversion is performed.

Next, a description will be made of how the image decoding device 300 performs size transformation (up-conversion). FIG. 26 illustrates an example of how up-conversion is performed. A process of the difference matrix size transformation section 562 (FIG. 19) will be described hereinafter as an example.

A specific up-conversion method is arbitrary. For example, up-conversion may be implemented using a nearest neighbor interpolation process. The nearest neighbor interpolation process is a process for interpolating neighboring elements of an element by creating copies of the corresponding element in a matrix before interpolation. The neighboring elements are elements adjacent to an element in a matrix before interpolation or elements that are close to an element in a matrix before interpolation.

For example, a nearest neighbor interpolation process (a ×2 nearest neighbor interpolation process) that allows the number of elements to double in each of the vertical and horizontal directions is a process for generating a 2×2 square matrix from each element in a matrix before interpolation. Specifically, three neighboring elements are interpolated using each element in a matrix before interpolation. The three neighboring elements include, for example, right, lower, and lower right elements adjacent to the element in the matrix before interpolation. The above-described process is performed on each element in a matrix before interpolation, thereby allowing the number of vertical elements and the number of horizontal elements in a square matrix to double.

In the example illustrated in FIG. 20, a nearest neighbor interpolation process is applied to a 4×4 square matrix to generate an 8×8 square matrix. In the matrices illustrated in FIG. 20, gray rectangular blocks represent elements in a matrix before interpolation. A copy of each of the gray-colored elements is created, and neighboring elements of each element (which are represented by blank rectangular blocks in the matrices illustrated in FIG. 20) are each interpolated.

As a matter of course, other elements (e.g., an upper adjacent element, a left adjacent element, etc.) may also be used as three neighboring elements. Preferably, elements are interpolated in a direction corresponding to the processing order. Furthermore, while a description has been given of the use of copies of an original element for interpolation, the values of elements to be interpolated may be determined using certain computation. However, the use of copies in the manner described above can reduce the load of interpolation (can make interpolation easier).

Referring back to FIG. 26, the transmitted difference matrix can be up-converted to a plurality of sizes. For example, as illustrated in FIG. 26, an 8×8 difference matrix can be up-converted to a 16×16 square matrix or a 32×32 square matrix.

For example, an 8×8 difference matrix is up-converted to a 16×16 difference matrix using a ×2 nearest neighbor interpolation process. Furthermore, a ×2 nearest neighbor interpolation process is applied to the 16×16 difference matrix to up-convert the 16×16 difference matrix to a 32×32 difference matrix. As a matter of course, a ×2 nearest neighbor interpolation process can further be repeated to implement up-conversion to a 64×64 or larger square matrix. That is, by repeating a ×2 nearest neighbor interpolation process makes it possible to implement up-conversion to a square matrix of a size corresponding to the number of times a ×2 nearest neighbor interpolation process has been repeated.

Note that a matrix may be magnified by an arbitrary factor through a nearest neighbor interpolation process, and the factor is not limited to 2, as described above. For example, a nearest neighbor interpolation process (a ×4 nearest neighbor interpolation process) that allows the number of elements to quadruple in each of the vertical and horizontal directions may also be made feasible. The ×4 nearest neighbor interpolation process is implemented in a manner that is basically similar to that of a ×2 nearest neighbor interpolation process, except for different magnification factors. That is, in the ×4 nearest neighbor interpolation process, a 4×4 square matrix is generated from each element in a matrix before interpolation so that the 4×4 square matrix has the element positioned at the upper left thereof. In other words, on the basis of one element in a matrix before interpolation, 15 neighboring elements thereof are interpolated. The above-described process is performed on each element in a matrix before interpolation, thereby transforming each of the number of vertical elements and the number of horizontal elements in a square matrix into quadruple elements.

In FIG. 26, as indicated by a dotted line arrow, the 8×8 difference matrix can be up-converted to a 32×32 difference matrix by applying a ×4 nearest neighbor interpolation process. Specifically, one 8×8 quantization matrix (or difference matrix) may be up-converted to generate both a 16×16 quantization matrix (or difference matrix) and a 32×32 quantization matrix (or difference matrix), or the 16×16 quantization matrix (or difference matrix) and the 32×32 quantization matrix (or difference matrix) may be generated by the up-conversion of different 8×8 quantization matrices (or difference matrices). In the former case, a 4×4 quantization matrix (or difference matrix) and an 8×8 quantization matrix (or difference matrix) may be transmitted from the image encoding device 10 to the image decoding device 300. In the latter case, a 4×4 quantization matrix (or difference matrix), an 8×8 quantization matrix (or difference matrix) which can be up-converted to 16×16, and an 8×8 quantization matrix (or difference matrix) which can be up-converted to 32×32 may be transmitted from the image encoding device 10 to the image decoding device 300.

By using a nearest neighbor interpolation process in the manner described above, the difference matrix size transformation section 562 can easily perform size transformation on a difference matrix.

In addition, the nearest neighbor interpolation process described above can also be applied to the up-conversion into a non-square matrix.

For example, an 8×8 difference matrix is transformed into a 16×16 square matrix by a ×2 nearest neighbor interpolation process, and is further transformed into a non-square matrix of 4 vertical by 16 horizontal by thinning out elements in certain lines of the square matrix.

In this case, 4 lines out of 16 lines may be extracted, and the lines to be thinned out are arbitrary. For example, one for every four lines may be extracted. Alternatively, for example, the first, fifth, ninth, and thirteenth lines from the top may be extracted. Alternatively, for example, the third, seventh, eleventh, and fifteenth lines from the top may be extracted. The lines to be extracted may be determined in advance, or arbitrary four lines (or one for every four lines) may be selected from among 16 lines using a certain method.

Further, for example, an 8×8 difference matrix is transformed into a 32×32 square matrix by a ×2 nearest neighbor interpolation process performed twice or by a ×4 nearest neighbor interpolation process performed once. The 32×32 square matrix is further transformed into a non-square matrix of 8 vertical by 32 horizontal by thinning out elements in certain lines of the square matrix.

In this case, similarly to the non-square matrix of 4 vertical by 16 horizontal described above, 8 lines out of 32 lines may be extracted, and the lines to be thinned out are arbitrary. For example, the first, fifth, ninth, thirteenth, seventeenth, twenty-first, twenty-fifth, and twenty-ninth lines from the top may be extracted. The lines to be extracted may be determined in advance, or arbitrary eight lines (or one for every four lines) may be selected from among 32 lines using a certain method.

While transformation to a non-square matrix having a ratio of 1 vertical to 4 horizontal has been described, a transformed matrix may have any horizontal and vertical ratio. For example, a square matrix may be transformed in size to a non-square matrix having a ratio of 4 vertical to 1 horizontal by thinning out the elements in the square matrix on a column-by-column basis, instead of on a line-by-line basis, in a manner similar to that in the case of line-by-line thinning.

Furthermore, for example, a short distance intra prediction method for improving coding efficiency by using small-sized non-square prediction units was proposed in "CE6.b1 Report on Short Distance Intra Prediction Method" (JCTVC-E278, March 2011). In the short distance intra prediction method, prediction units of various sizes such as 1×4 pixels, 2×8 pixels, 4×16 pixels, 4×1 pixels, 8×2 pixels, and 16×4 pixels may be set in an image. In this case, which size of the vertical and horizontal sizes of a prediction unit is larger depends on the setting of the prediction unit.

The amount of thinning of lines or columns is adjusted to enable size transformation into non-square matrices having various horizontal and vertical ratios. For example, one line is extracted from a 16×16 square matrix to implement size transformation into a non-square matrix having a ratio of 1 vertical to 16 horizontal. Similarly, arbitrary two lines may be extracted from a 32×32 square matrix to implement size transformation into a non-square matrix having a ratio of 2 vertical to 32 horizontal.

Using a nearest neighbor interpolation process in the manner described above, the difference matrix size transformation section 562 can easily perform size transformation from a difference matrix to a non-square matrix.

While size transformation into a non-square matrix by using both a nearest neighbor interpolation process and thinning of lines (or columns), this is not given in a limiting sense. For example, size transformation into a non-square matrix may also be implemented using only a nearest neighbor interpolation process.

Figure 27:
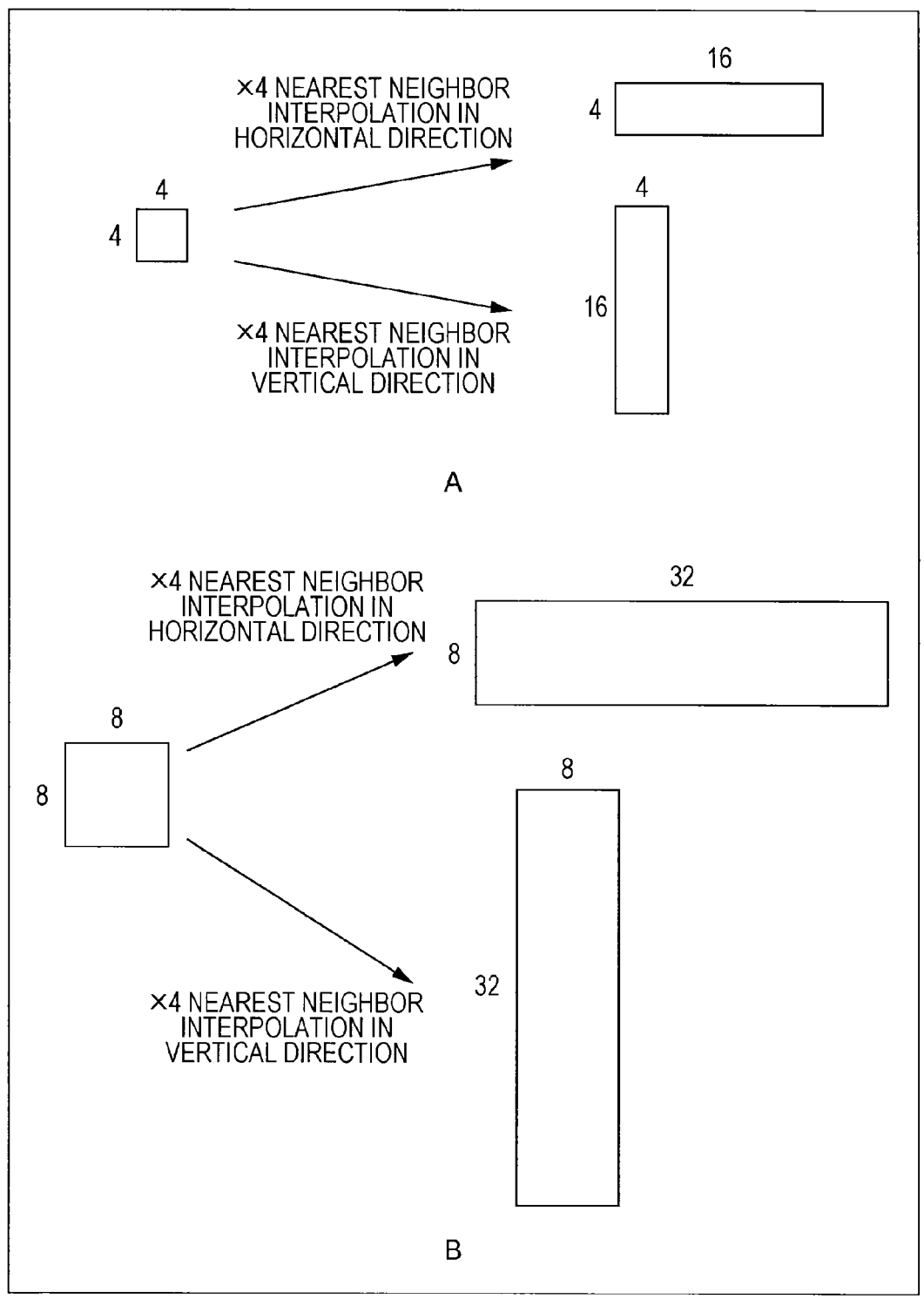
FIG. 27 includes diagrams illustrating an example of how up-conversion is performed.

For example, as illustrated in part A of FIG. 27, a 4×4 square matrix can be quadrupled only in the horizontal direction (a ×4 nearest neighbor interpolation process in the horizontal direction) to implement size transformation into a 4×16 non-square matrix. The ×4 nearest neighbor interpolation process in the horizontal direction is a process for generating a 1×4 non-square matrix from each element in a matrix before interpolation. That is, three neighboring elements are interpolated using each element in a matrix before interpolation. The three neighboring elements include, for example, three elements horizontally arranged right adjacent to an element in a matrix before interpolation. The above-described process is performed on each element in a matrix before interpolation, thereby allowing only the number of horizontal elements in a square matrix to quadruple.

Furthermore, for example, as illustrated in part A of FIG. 27, a 4×4 square matrix can be quadrupled only in the vertical direction (a ×4 nearest neighbor interpolation process in the vertical direction) to implement size transformation into a 16×4 non-square matrix. The ×4 nearest neighbor interpolation process in the vertical direction is a process for generating a 4×1 non-square matrix from each element in a matrix before interpolation. That is, three neighboring elements are interpolated using each element in a matrix before interpolation. The three neighboring elements include, for example, three elements vertically arranged below and adjacent to an element in a matrix before interpolation. The above-described process is performed on each element in a matrix before interpolation, thereby allowing only the number of vertical elements in a square matrix to quadruple.

An 8×8 square matrix can also be subjected to size transformation in a similar manner. For example, as illustrated in part B of FIG. 27, an 8×8 square matrix may be subjected to the ×4 nearest neighbor interpolation process in the horizontal direction to implement size transformation into an 8×32 non-square matrix. Further, for example, as illustrated in part B of FIG. 27, an 8×8 square matrix may be subjected to the ×4 nearest neighbor interpolation process in the vertical direction to implement size transformation into a 32×8 non-square matrix.

In the manner described above, using a nearest neighbor interpolation process the difference matrix size transformation section 562 can easily perform size transformation from a difference matrix to a non-square matrix.

Note that the size transformation using a nearest neighbor interpolation process, described above, may be performed on a matrix of any size. In addition, a quantization matrix or a prediction matrix may also be subjected to size transformation using a nearest neighbor interpolation process in a manner similar to that described above for a difference matrix. That is, the quantization matrix size transformation section 721 can also easily perform size transformation on a quantization matrix using a nearest neighbor interpolation process. The above similarly applies to the prediction matrix size transformation section 561.

In the foregoing description, a size transformation process for a quantization matrix, a prediction matrix, or a difference matrix between the quantization matrix and the prediction matrix has been described. This size transformation process may be a process for actually generating a matrix whose size has been transformed, or may be a process (read control of matrix data) for setting how to read each element in a matrix from a memory without actually generating data of the matrix.

In the size transformation process describe above, each element in a matrix after size transformation is constituted by any of the elements of the matrix before size transformation. That is, a matrix after size transformation may be generated by reading elements in a matrix before size transformation which is stored in a memory using a certain method, for example, reading some of the elements of the matrix or reading one element a plurality of times. In other words, a method for reading each element is defined (or read control of matrix data is performed) to substantially implement the size transformation described above. With this method, a process such as writing matrix data subjected to size transformation to the memory may become unnecessary. Further, the method of reading matrix data subjected to size transformation basically depends on the way how a nearest neighbor interpolation process is performed and the like, and can thus be implemented by processing with comparatively low load, such as selecting an appropriate one of a plurality of options prepared in advance. Accordingly, such a method enables a reduction in the load of size transformation.

That is, the size transformation process described above, which includes a process for actually generating matrix data subjected to size transformation, also includes such read control of the matrix data.

In the foregoing description, a difference matrix is down-converted and transmitted, or a difference matrix generated from a down-converted quantization matrix is transmitted. In the present technology, it is only required to provide a reduction in the amount of coding of information concerning a quantization matrix. Thus, these examples are not given in a limiting sense. For example, a prediction process may be omitted and a quantization matrix for the current region, instead of a difference matrix, may be down-converted and transmitted. In this case, on the decoder side, it is only required to up-convert the transmitted quantization matrix to a size corresponding to the current region to be dequantized. In this case, the encoding and decoding process using DPCM encoding and decoding described above in the first to third embodiments may or may not be performed on the quantization matrix to be transmitted. It is to be understood that the encoding and decoding process to be performed on the quantization matrix to be transmitted may be of any type, and is not limited to that in the examples described above.

In addition, the amount of coding for information on parameters and flags concerning a quantization matrix, such as the size of the quantization matrix and the list ID, may be reduced by, for example, taking a difference between the information and the previously transmitted information and transmitting the difference.

4. Fourth Embodiment

Application to Multi-View Image Encoding and Multi-View Image Decoding

Figure 28:
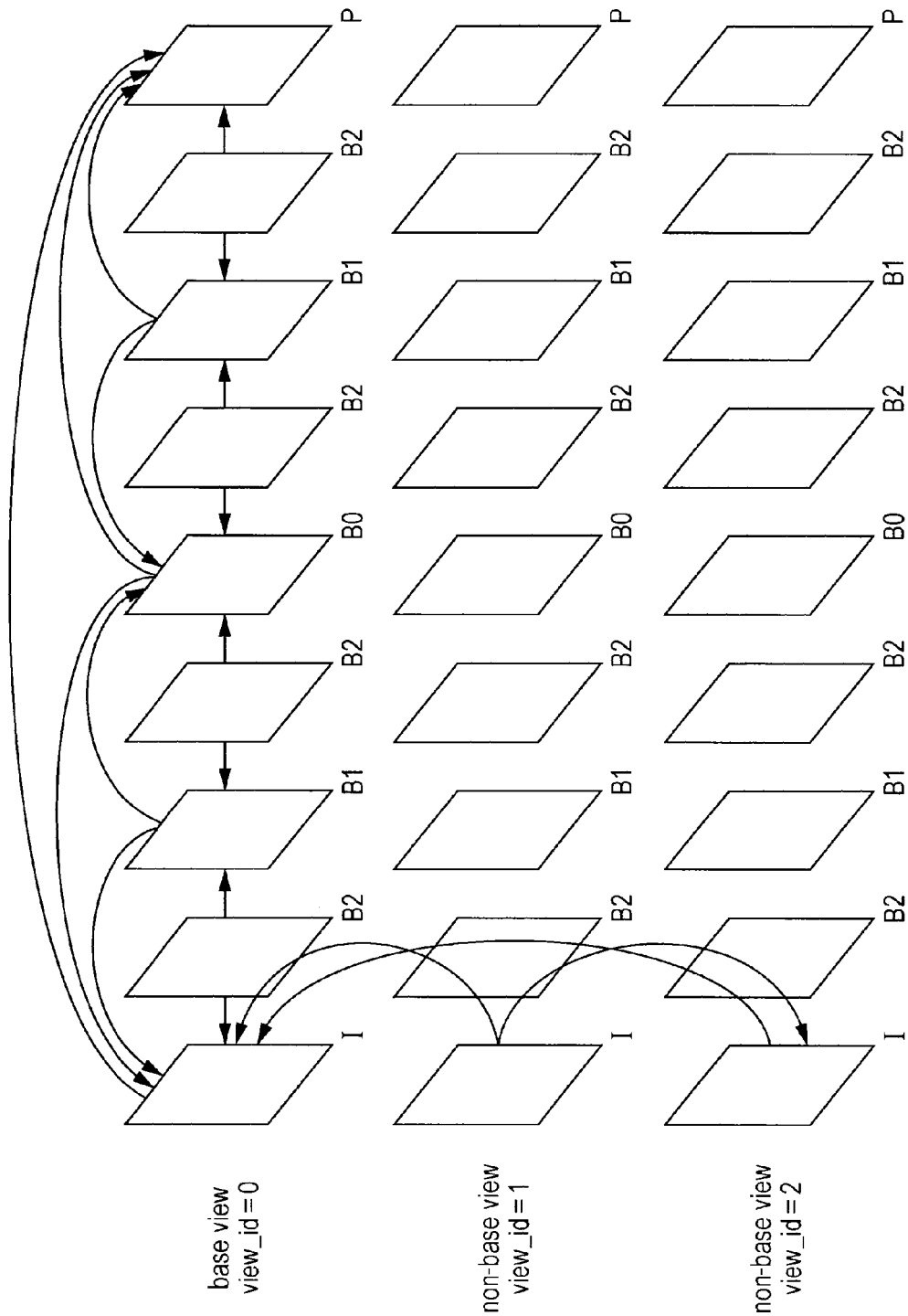
FIG. 28 is a diagram illustrating an example of a multi-view image encoding scheme.

The series of processes described above can be applied to multi-view image encoding and multi-view image decoding. FIG. 28 illustrates an example of a multi-view image encoding scheme.

As illustrated in FIG. 28, multi-view images include images at a plurality of views, and an image at one of the plurality of views is designated as an image of a base view. The images other than the image of the base view are handled as images of non-base view.

When multi-view images as illustrated in FIG. 28 are to be encoded and decoded, an image of each view is encoded and decoded. The method described above in the first to third embodiments may be applied to the encoding and decoding for each view. Accordingly, an increase in the amount of coding of a quantization matrix can be suppressed.

Furthermore, flags and parameters used in the method described above in the first to third embodiments may be shared between the encoding and decoding for each view. For example, a quantization matrix may be shared between the encoding and decoding for each view. As a matter of course, any other necessary information may also be shared between the encoding and decoding for each view.

For example, when a quantization matrix which is included in a sequence parameter set (SPS) or a picture parameter set (PPS) is to be transmitted, if those (SPS and PPS) are shared among views, the quantization matrix is also shared. Accordingly, an increase in the amount of coding of a quantization matrix can be suppressed.

Furthermore, matrix elements in a quantization matrix for the base view may be changed in accordance with the disparity values between views. Further, an offset value for adjusting non-base view matrix elements with regard to matrix elements in a quantization matrix for the base view may be transmitted. Accordingly, an increase in the amount of coding of a quantization matrix can be suppressed.

For example, a quantization matrix for each view may be separately transmitted in advance. When a quantization matrix is to be changed for each view, only information indicating the difference from the corresponding one of the quantization matrices transmitted in advance may be transmitted. The information indicating the difference is arbitrary, and may be, for example, information in units of 4×4 or 8×8 or a difference between matrices.

Note that if a quantization matrix is shared among views although an SPS or a PPS is not shared, the SPSs or PPSs for other views may be referenced (i.e., quantization matrices for other views may be used).

Moreover, if such multi-view images are represented as images having, as components, YUV images and depth images (Depth) corresponding to the amount of disparity between views, an independent quantization matrix for the image of each component (Y, U, V, and Depth) may be used.

For example, since a depth image (Depth) is an image of an edge, quantization matrices are not necessary. Thus, even though an SPS or a PPS specifies the use of a quantization matrix, a quantization matrix may not be applied (or a quantization matrix in which all the matrix elements are the same (flat) may be applied) to a depth image (Depth).

[Multi-View Image Encoding Device]

Figure 29:
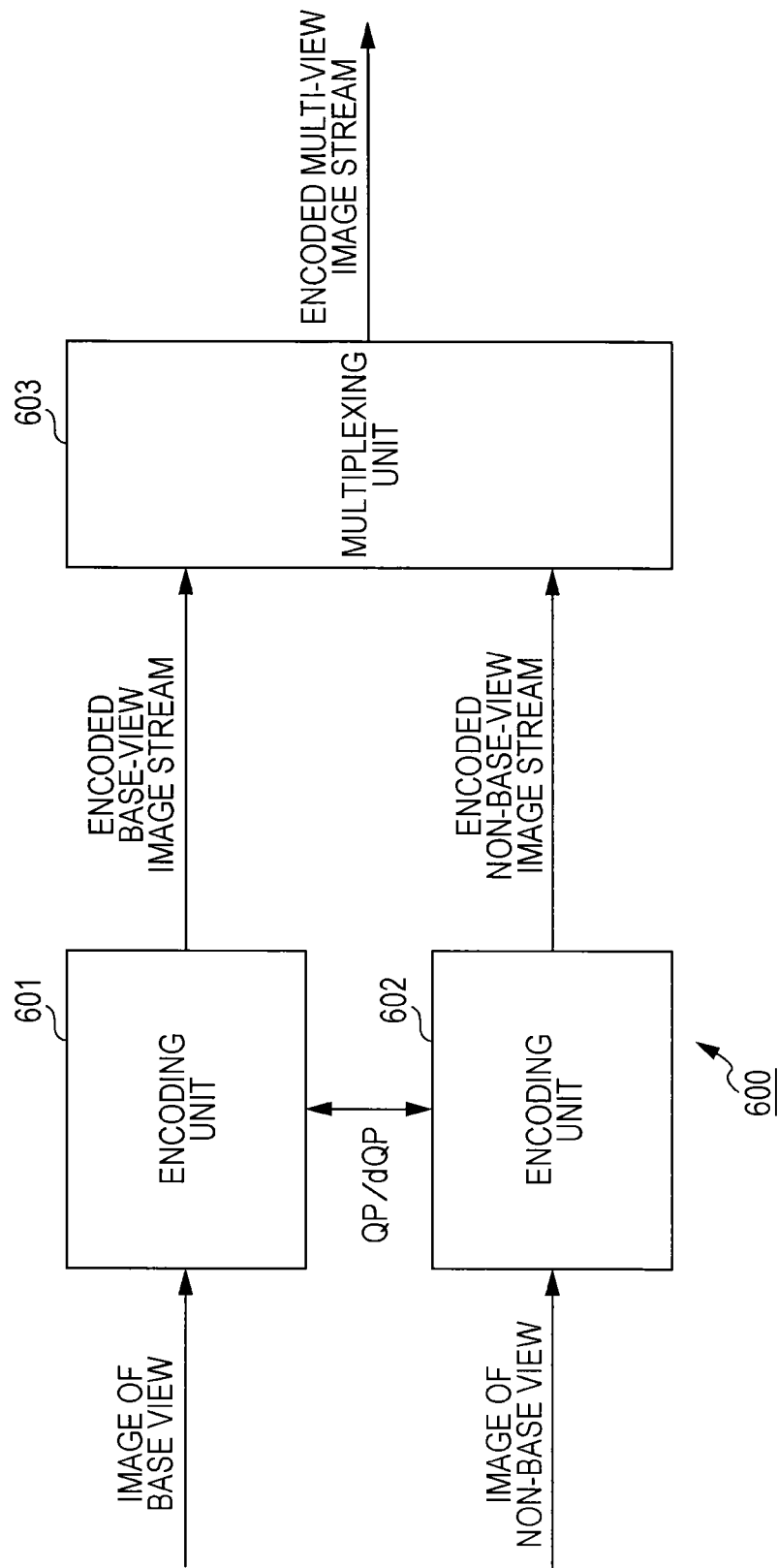
FIG. 29 is a diagram illustrating a main example configuration of a multi-view image encoding device to which the present technology is applied.

FIG. 29 is a diagram illustrating a multi-view image encoding device for performing the multi-view image encoding operation described above. As illustrated in FIG. 29, a multi-view image encoding device 600 includes an encoding unit 601, an encoding unit 602, and a multiplexing unit 603.

The encoding unit 601 encodes an image of a base view to generate an encoded base-view image stream. The encoding unit 602 encodes an image of a non-base view to generate an encoded non-base-view image stream. The multiplexing unit 603 multiplexes the encoded base-view image stream generated by the encoding unit 601 and the encoded non-base-view image stream generated by the encoding unit 602 to generate an encoded multi-view image stream.

The image encoding device 10 (FIG. 1) can be used for each of the encoding unit 601 and the encoding unit 602 of the multi-view image encoding device 600. That is, for example, as described above, the encoding unit 601 and the encoding unit 602 can perform a quantization process or the like using the same quantization matrix. Accordingly, an increase in the amount of coding of a quantization matrix can be suppressed.

[Multi-View Image Decoding Device]

Figure 30:
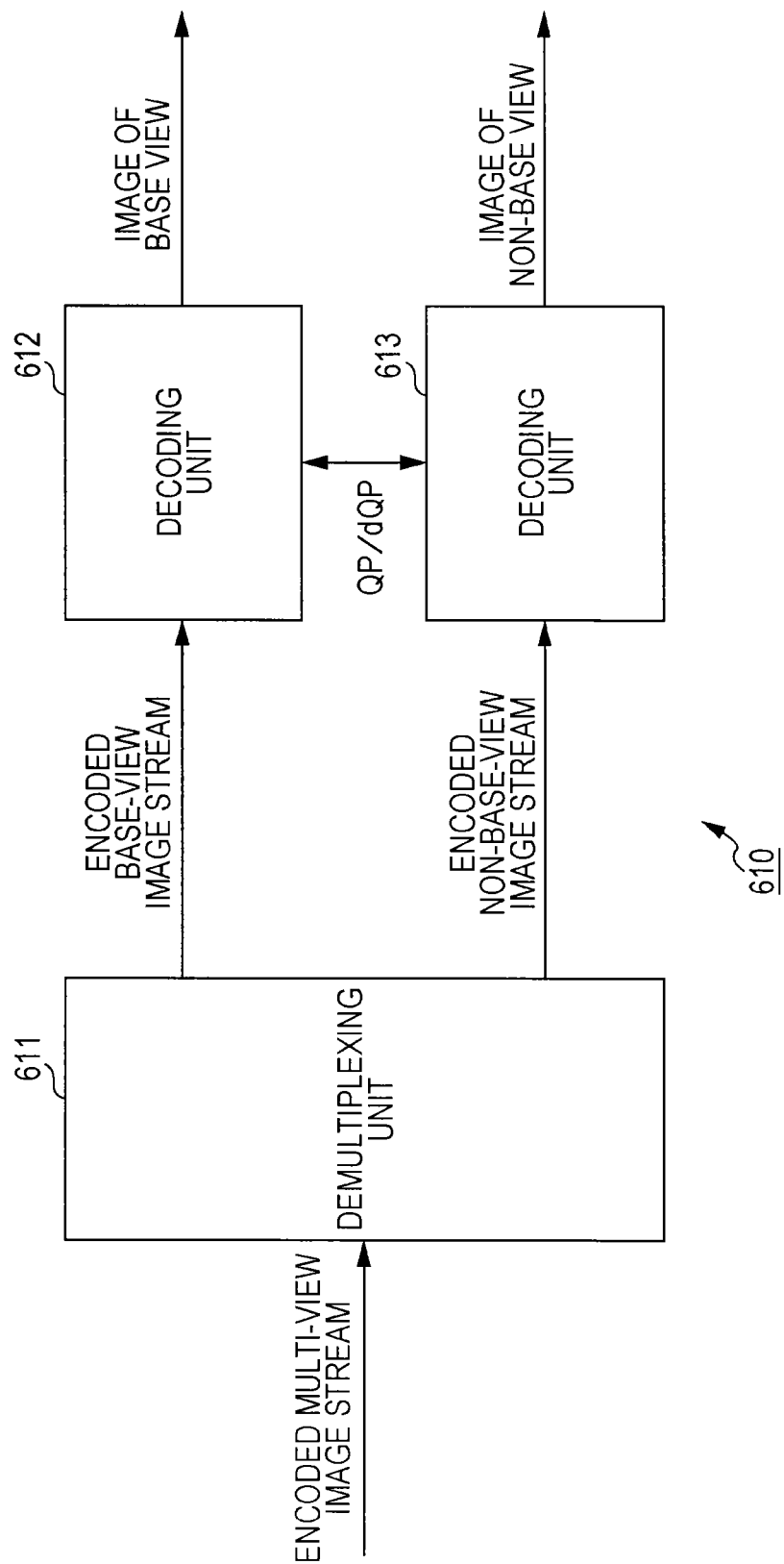
FIG. 30 is a diagram illustrating a main example configuration of a multi-view image decoding device to which the present technology is applied.

FIG. 30 is a diagram illustrating a multi-view image decoding device for performing the multi-view image decoding operation described above. As illustrated in FIG. 30, a multi-view image decoding device 610 includes a demultiplexing unit 611, a decoding unit 612, and a decoding unit 613.

The demultiplexing unit 611 demultiplexes an encoded multi-view image stream in which an encoded base-view image stream and an encoded non-base-view image stream have been multiplexed, and extracts the encoded base-view image stream and the encoded non-base-view image stream. The decoding unit 612 decodes the encoded base-view image stream extracted by the demultiplexing unit 611 to obtain an image of a base view. The decoding unit 613 decodes the encoded non-base-view image stream extracted by the demultiplexing unit 611 to obtain an image of a non-base view.

The image decoding device 300 (FIG. 16) can be used for each of the decoding unit 612 and the decoding unit 613 of the multi-view image decoding device 610. That is, for example, as described above, the decoding unit 612 and the decoding unit 613 can perform a dequantization process or the like using the same quantization matrix. Accordingly, an increase in the amount of coding of a quantization matrix can be suppressed.

5. Fifth Embodiment

Application to Layered Image Encoding and Layered Image Decoding

Figure 31:
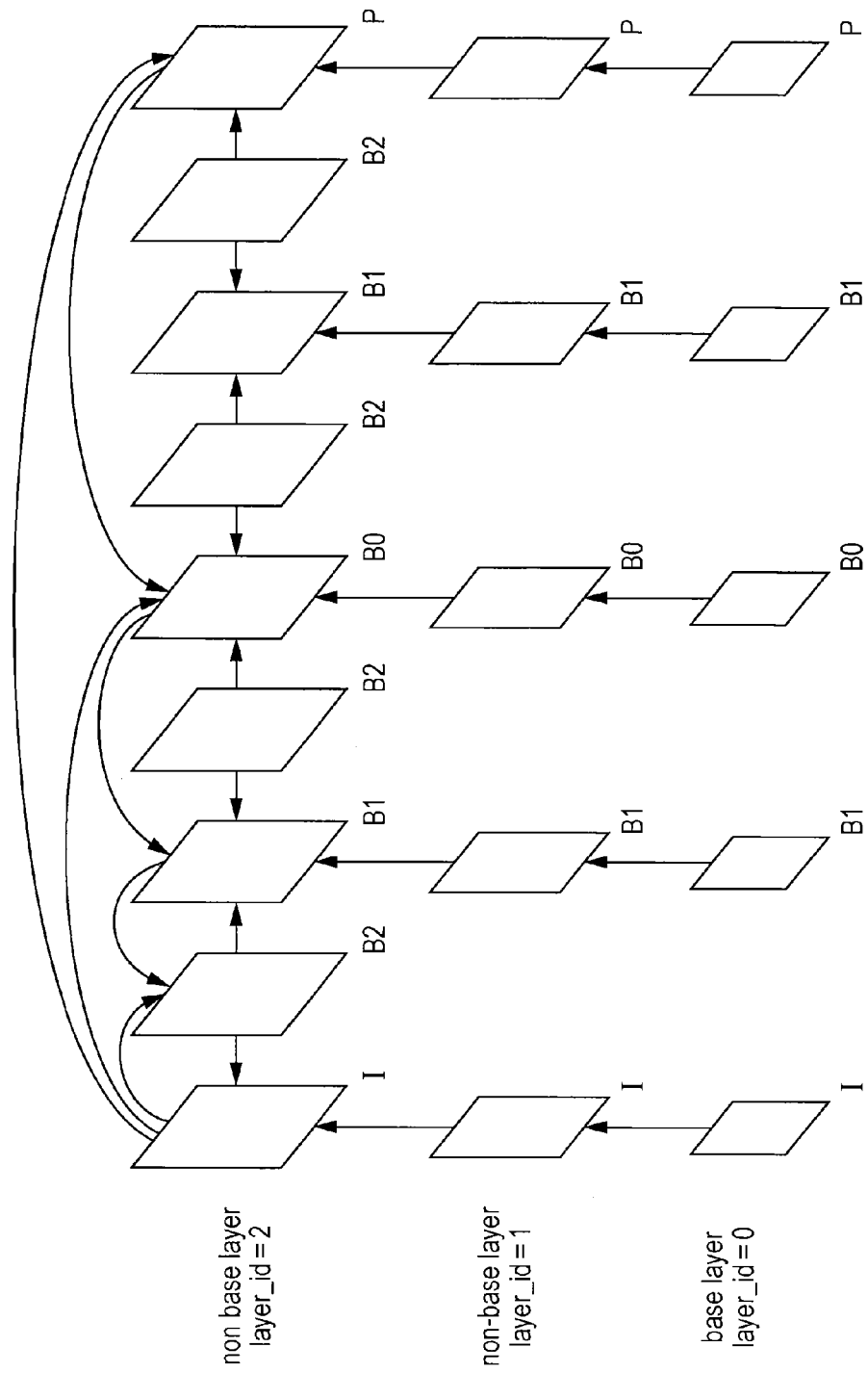
FIG. 31 is a diagram illustrating an example of a layered image encoding scheme.

The series of processes described above is applicable to layered image encoding and layered image decoding. FIG. 31 illustrates an example of a layered image encoding scheme.

As illustrated in FIG. 31, layered images include images of a plurality of layers, and an image of one of the plurality of layers is designated as an image of a base layer. The images other than the image of the base layer are handled as images of non-base layers (also referred to as enhancement layers).

When layered images as illustrated in FIG. 31 are to be encoded and decoded, an image of each layer is encoded and decoded. The method described above may be applied to the encoding and decoding for each layer. Accordingly, an increase in the amount of coding of a quantization matrix can be suppressed.

Furthermore, flags and parameters used in the method described above in the first to third embodiments may be shared between the encoding and decoding for each layer. For example, a quantization matrix may be shared between the encoding and decoding for each layer. As a matter of course, any other necessary information may also be shared between the encoding and decoding for each layer.

Examples of such layered images include images layered in spatial resolution (also referred to as images with spatial resolution scalability) (spatial scalability). In layered images with spatial resolution scalability, the resolutions of the images differ from layer to layer. For example, a layer of an image having the spatially lowest resolution is designated as a base layer, and a layer of an image having a higher resolution than the base layer is designated as a non-base layer (or an enhancement layer).

Image data of a non-base layer (an enhancement layer) may be data independent of the other layers, and, similarly to the base layer, an image having a resolution in the corresponding layer may be obtained only using the image data. Generally, however, image data of a non-base layer (an enhancement layer) is data corresponding to a difference image between the image of the corresponding layer and an image of another layer (e.g., a layer one layer below the corresponding layer). In this case, an image having a resolution corresponding to the base layer is obtained only using the image data of the base layer while an image having a resolution corresponding to a non-base layer (an enhancement layer) is obtained by the combination of the image data of the layer and the image data of another layer (e.g., a layer one layer below the layer). Accordingly, redundancy of image data between layers can be suppressed.

In layered images having spatial resolution scalability, the resolutions of the images differ from layer to layer. Thus, the resolutions of the units of encoding and decoding processing for the respective layers also differ from one another. Accordingly, if a quantization matrix is shared between the encoding and decoding for individual layers, the quantization matrix may be up-converted in accordance with the resolution ratio of each layer.

For example, it is assumed that an image of the base layer has a resolution of 2K (e.g., 1920×1080), and an image of a non-base layer (an enhancement layer) has a resolution of 4K (e.g., 3840×2160). In this case, for example, the 16×16 size of the image of the base layer (2K image) corresponds to the 32×32 size of the image of the non-base layer (4K image). The quantization matrix is also up-converted as appropriate in accordance with the corresponding resolution ratio.

For example, a 4×4 quantization matrix used for the quantization and dequantization of a base layer is up-converted to 8×8 and is used in the quantization and dequantization of a non-base layer. Similarly, an 8×8 quantization matrix of a base layer is up-converted to 16×16 in a non-base layer. Similarly, a quantization matrix up-converted to 16×16 and used in a base layer is up-converted to 32×32 in a non-base layer.

Note that parameters which provide scalability properties are not limited to spatial resolution, and may include, for example, temporal resolution (temporal scalability). In layered images having temporal resolution scalability, the frame rates of the images differ from layer to layer. Other examples include bit-depth scalability in which the bit-depth of image data differs from layer to layer, and chroma scalability in which the format of components differs from layer to layer.

Still other examples include SNR scalability in which the signal to noise ratios (SNRs) of the images differ from layer to layer.

In view of improvement in image quality, desirably, the lower the signal-to-noise ratio an image has, the smaller the quantization error is made. To that end, in SNR scalability, desirably, different quantization matrices (non-common quantization matrices) are used for the quantization and dequantization of each layer in accordance with the signal-to-noise ratio. For this reason, as described above, if a quantization matrix is shared among layers, an offset value for adjusting matrix elements for an enhancement layer with regard to matrix elements in a quantization matrix for the base layer may be transmitted. More specifically, information indicating the difference between a common quantization matrix and an actually used quantization matrix may be transmitted on a layer-by-layer basis. For example, the information indicating the difference may be transmitted in a sequence parameter set (SPS) or picture parameter set (PPS) for each layer. The information indicating the difference is arbitrary. For example, the information may be a matrix having elements representing difference values between corresponding elements in both quantization matrices, or may be a function indicating the difference.

[Layered Image Encoding Device]

Figure 32:
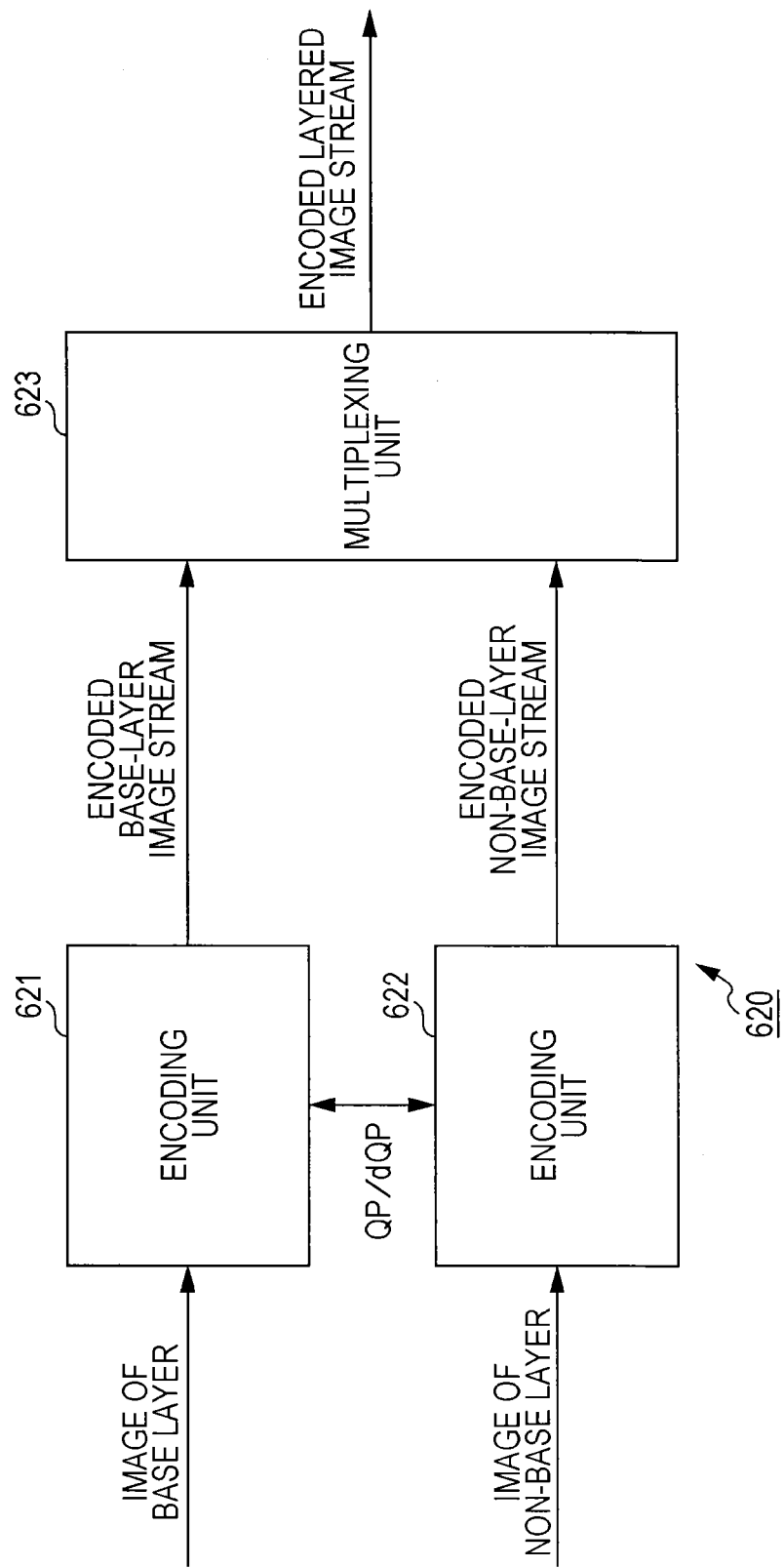
FIG. 32 is a diagram illustrating a main example configuration of a layered image encoding device to which the present technology is applied.

FIG. 32 is a diagram illustrating a layered image encoding device for performing the layered image encoding operation described above. As illustrated in FIG. 32, a layered image encoding device 620 includes an encoding unit 621, an encoding unit 622, and a multiplexing unit 623.

The encoding unit 621 encodes an image of a base layer to generate an encoded base-layer image stream. The encoding unit 622 encodes an image of a non-base layer to generate an encoded non-base-layer image stream. The multiplexing unit 623 multiplexes the encoded base-layer image stream generated by the encoding unit 621 and the encoded non-base-layer image stream generated by the encoding unit 622 to generate an encoded layered-image stream.

The image encoding device 10 (FIG. 1) can be used for each of the encoding unit 621 and the encoding unit 622 of the layered image encoding device 620. That is, for example, as described above, the encoding unit 621 and the encoding unit 622 can perform a quantization process or the like using the same quantization matrix. Accordingly, an increase in the amount of coding of a quantization matrix can be suppressed.

[Layered Image Decoding Device]

Figure 33:
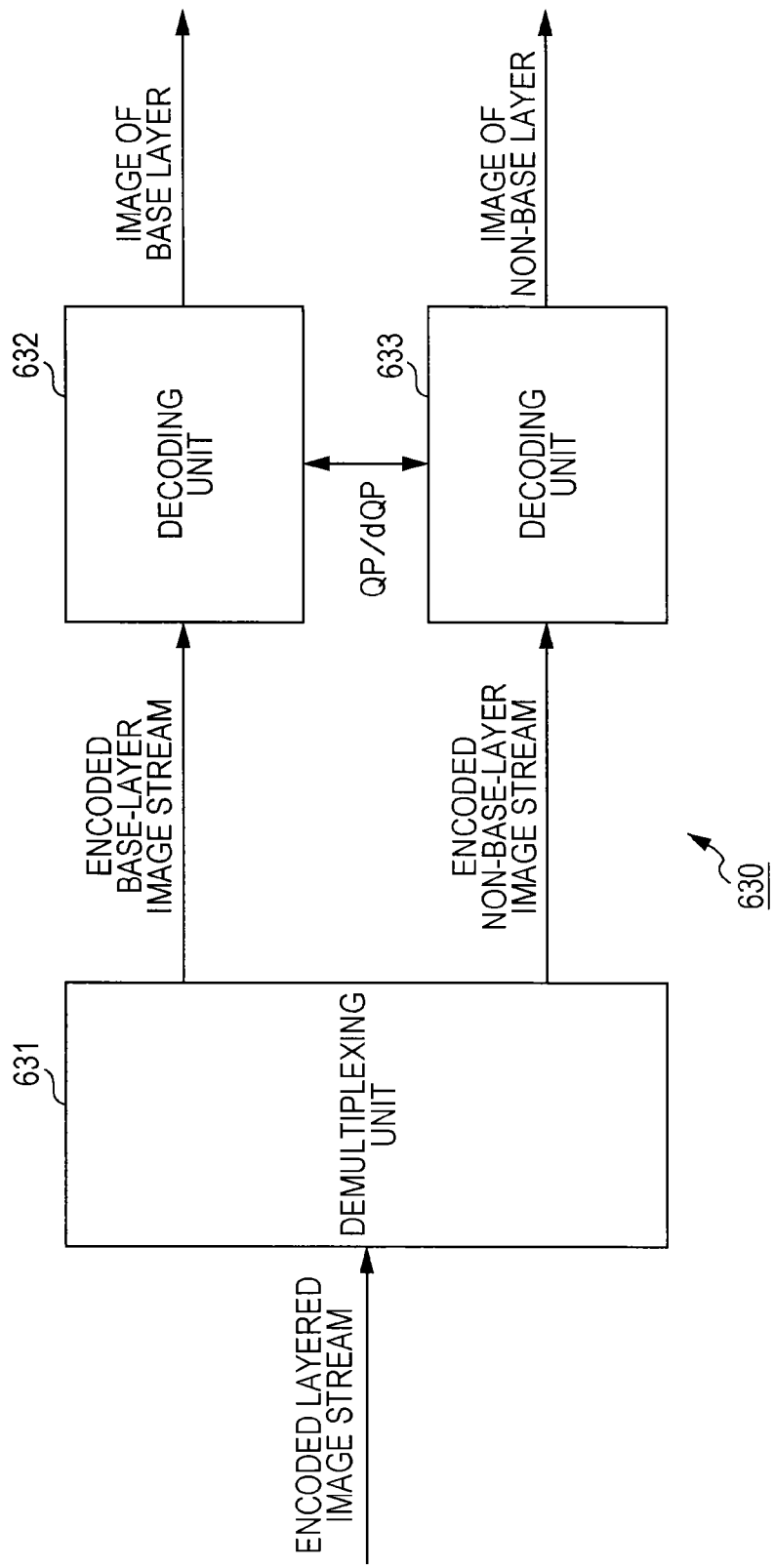
FIG. 33 is a diagram illustrating a main example configuration of a layered image decoding device to which the present technology is applied.

FIG. 33 is a diagram illustrating a layered image decoding device for performing the layered image decoding operation described above. As illustrated in FIG. 33, a layered image decoding device 630 includes a demultiplexing unit 631, a decoding unit 632, and a decoding unit 633.

The demultiplexing unit 631 demultiplexes an encoded layered-image stream in which an encoded base-layer image stream and an encoded non-base-layer image stream have been multiplexed, and extracts the encoded base-layer image stream and the encoded non-base-layer image stream. The decoding unit 632 decodes the encoded base-layer image stream extracted by the demultiplexing unit 631 to obtain an image of a base layer. The decoding unit 633 decodes the encoded non-base-layer image stream extracted by the demultiplexing unit 631 to obtain an image of a non-base layer.

The image decoding device 300 (FIG. 16) can be used for each of the decoding unit 632 and the decoding unit 633 of the layered image decoding device 630. That is, for example, as described above, the decoding unit 632 and the decoding unit 633 can perform a quantization process or the like using the same quantization matrix. Accordingly, an increase in the amount of coding of a quantization matrix can be suppressed.

6. Sixth Embodiment

Computer

The series of processes described above can be executed by hardware or can also be executed by software. In this case, for example, a computer as illustrated in FIG. 34 may be constructed.

Figure 34:
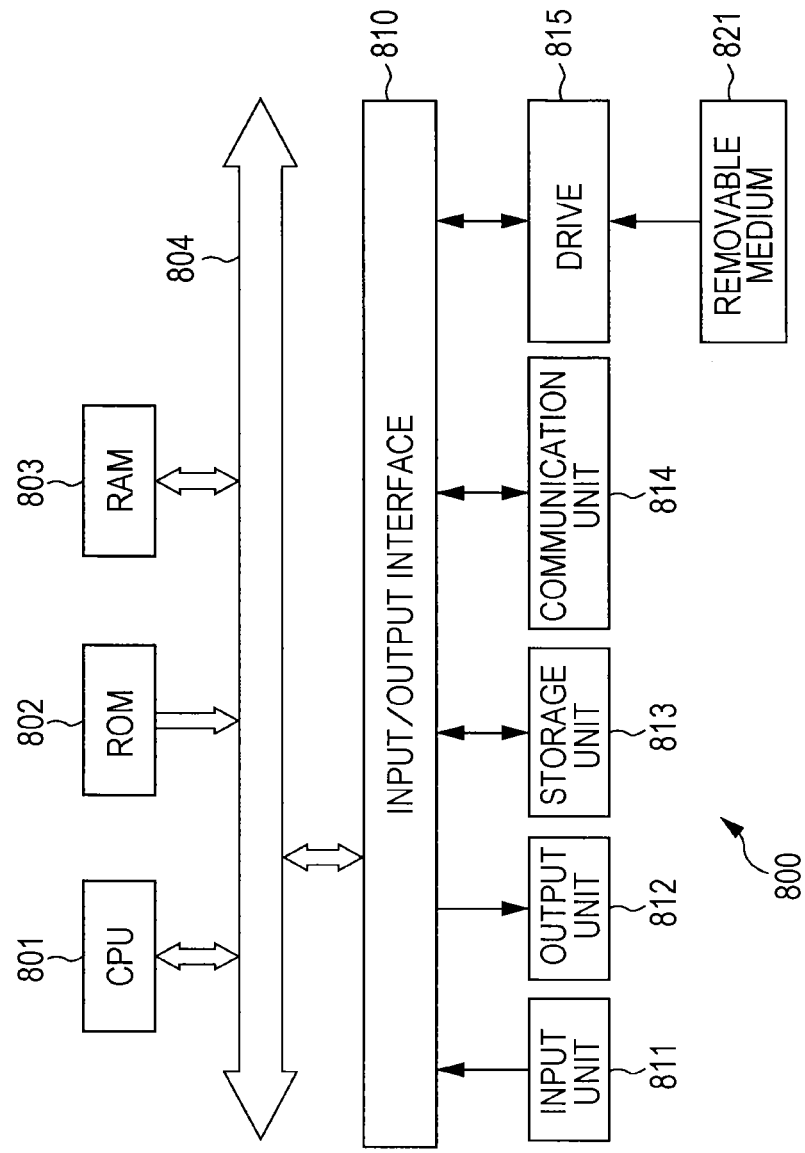
FIG. 34 is a block diagram illustrating a main example configuration of a computer.

In FIG. 34, a CPU (Central Processing Unit) 801 in a computer 800 executes various processing operations in accordance with a program stored in a ROM (Read Only Memory) 802 or a program loaded into a RAM (Random Access Memory) 803 from a storage unit 813. The RAM 803 also stores, as desired, data and the like necessary for the CPU 801 to execute various processing operations.

The CPU 801, the ROM 802, and the RAM 803 are connected to one another via a bus 804. An input/output interface 810 is also connected to the bus 804.

The input/output interface 810 is connected to an input unit 811, an output unit 812, the storage unit 813, and a communication unit 814. The input unit 811 includes a keyboard, a mouse, a touch panel, an input terminal, and so forth. The output unit 812 includes desired output devices, such as a speaker and a display including a CRT (Cathode Ray Tube), an LCD (Liquid Crystal Display), and an OELD (Organic ElectroLuminescence Display), an output terminal, and so forth. The storage unit 813 includes a desired storage medium such as a hard disk or a flash memory, and a control unit that controls the input and output of the storage medium. The communication unit 814 includes desired wired or wireless communication devices such as a modem, a LAN interface, a USB (Universal Serial Bus) device, and a Bluetooth (registered trademark) device. The communication unit 814 performs communication processing with other communication devices via networks including, for example, the Internet.

A drive 815 is further connected to the input/output interface 810, if necessary. A removable medium 821 such as a magnetic disk, an optical disk, a magneto-optical disk, or a semiconductor memory is placed in the drive 815, as desired. The drive 815 reads a computer program, data, and the like from the removable medium 821 placed therein in accordance with the control of, for example, the CPU 801. The read data and computer program are supplied to, for example, the RAM 803. The computer program read from the removable medium 821 is further installed into the storage unit 813, if necessary.

When the series of processes described above is executed by software, a program constituting the software is installed from a network or a recording medium.

Examples of the recording medium include, as illustrated in FIG. 34, the removable medium 821, which is distributed separately from the device body to deliver the program to a user, such as a magnetic disk (including a flexible disk), an optical disk (including a CD-ROM (Compact Disc-Read Only Memory) and a DVD (Digital Versatile Disc)), a magneto-optical disk (including a MD (Mini Disc)), or a semiconductor memory on which the program is recorded. Other examples of the recording medium include devices delivered to a user in a manner of being incorporated in advance in the device body, such as the ROM 802 and the hard disk included in the storage unit 813 on which the program is recorded.

Note that the program which the computer executes may be a program in which processing operations are performed in a time-series manner in the order stated herein, or may be a program in which processing operations are performed in parallel or at necessary timings such as when called.

In addition, steps describing a program stored in a recording medium, as used herein, include, of course, processing operations performed in a time-series manner in the order stated, and processing operations executed in parallel or individually but not necessarily performed in a time-series manner.

Furthermore, the term "system", as used herein, refers to an overall apparatus including a plurality of devices (apparatuses).

In addition, a configuration described above as a single device (or processing section) may be divided into a plurality of devices (or processing sections). Conversely, a configuration described above as a plurality of devices (or processing sections) may be combined into a single device (or processing section). Additionally, of course, a configuration other than that described above may be added to the configuration of each device (or each processing section). Furthermore, part of the configuration of a certain device (or processing section) may be included in the configuration of another device (or another processing section) if the devices (or processing sections) have substantially the same configuration and/or operation in terms of a whole system. In other words, embodiments of the present technology are not limited to the foregoing embodiments, and a variety of modifications can be made without departing from the scope of the present technology.

The image encoding device 10 (FIG. 1) and the image decoding device 300 (FIG. 16) according to the foregoing embodiments may be applied to various pieces of electronic equipment such as a transmitter or a receiver used to deliver data via satellite broadcasting, wire broadcasting such as cable TV, or the Internet or used to deliver data to or from terminals via cellular communication, a recording apparatus for recording images on media such as an optical disk, a magnetic disk, and a flash memory, and a reproducing apparatus for reproducing images from such storage media. Four exemplary applications will be described hereinafter.

7. Seventh Embodiment

Television Apparatus

Figure 35:
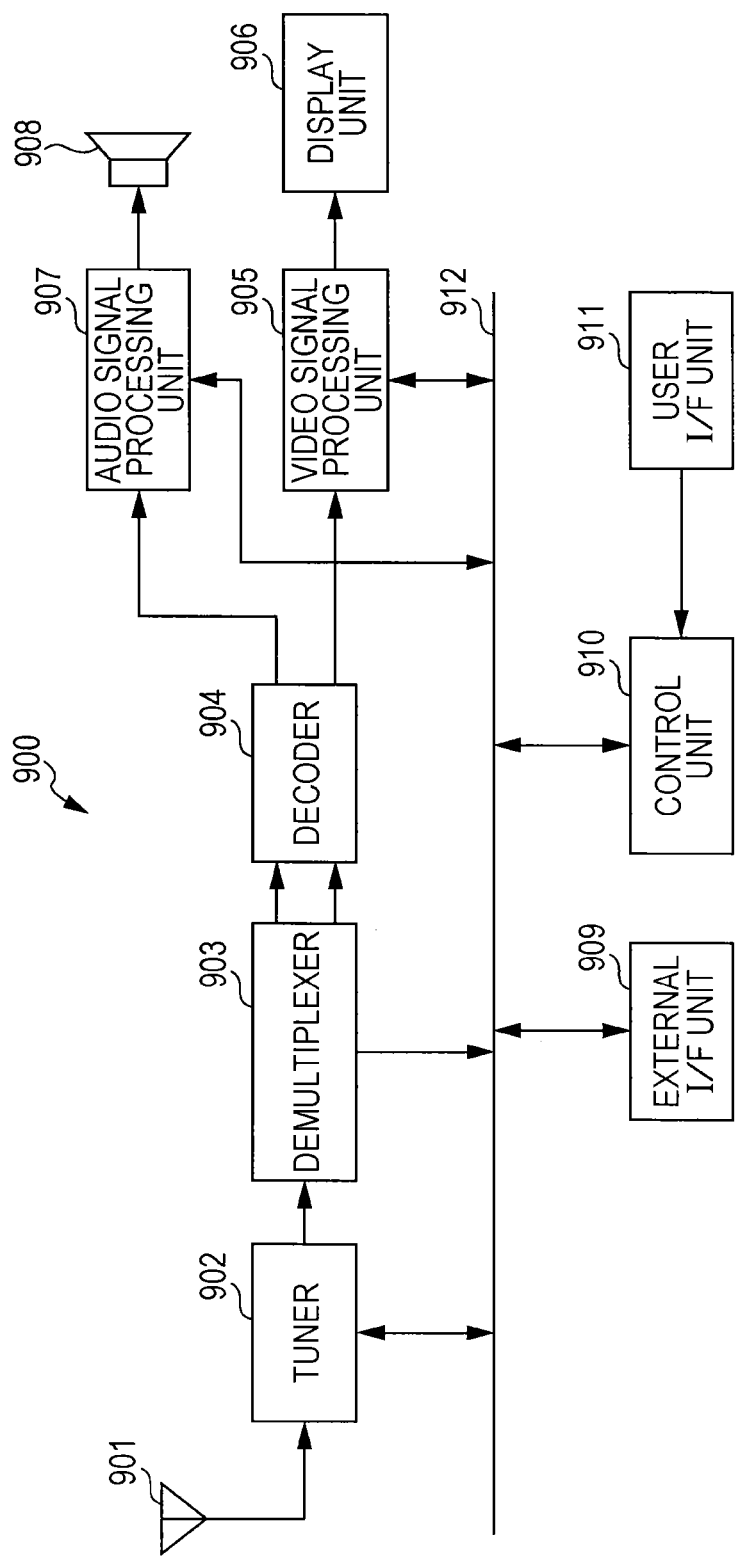
FIG. 35 is a block diagram illustrating a main example configuration of a television apparatus.

FIG. 35 illustrates an example of a schematic configuration of a television apparatus to which the foregoing embodiments are applied. A television apparatus 900 includes an antenna 901, a tuner 902, a demultiplexer 903, a decoder 904, a video signal processing unit 905, a display unit 906, an audio signal processing unit 907, a speaker 908, an external interface 909, a control unit 910, a user interface 911, and a bus 912.

The tuner 902 extracts a signal in a desired channel from a broadcast signal received via the antenna 901, and demodulates the extracted signal. Then, the tuner 902 outputs an encoded bit stream obtained by demodulation to the demultiplexer 903. In other words, the tuner 902 functions as a transmission unit in the television apparatus 900 for receiving an encoded stream including encoded images.

The demultiplexer 903 demultiplexes the encoded bit stream into a video stream and an audio stream of a program to be viewed, and outputs the streams obtained by demultiplexing to the decoder 904. Further, the demultiplexer 903 extracts auxiliary data such as EPG (Electronic Program Guide) from the encoded bit stream, and supplies the extracted data to the control unit 910. Note that the demultiplexer 903 may also descramble the encoded bit stream if the encoded bit stream has been scrambled.

The decoder 904 decodes the video stream and audio stream input from the demultiplexer 903. Then, the decoder 904 outputs video data obtained by the decoding process to the video signal processing unit 905. The decoder 904 further outputs audio data generated by the decoding process to the audio signal processing unit 907.

The video signal processing unit 905 reproduces the video data input from the decoder 904, and causes video to be displayed on the display unit 906. The video signal processing unit 905 may also cause an application screen supplied via a network to be displayed on the display unit 906. The video signal processing unit 905 may further perform additional processing, such as noise removal, on the video data in accordance with the settings. In addition, the video signal processing unit 905 may also generate a GUI (Graphical User Interface) image such as a menu, a button, or a cursor, and superimpose the generated image on an output image.

The display unit 906 is driven by a drive signal supplied from the video signal processing unit 905, and displays video or an image on a video surface of a display device (such as a liquid crystal display, a plasma display, or an OELD (Organic ElectroLuminescence Display) (organic EL display)).

The audio signal processing unit 907 performs reproduction processes, such as D/A conversion and amplification, on the audio data input from the decoder 904, and causes audio to be output from the speaker 908. The audio signal processing unit 907 may further perform additional processing, such as noise removal, on the audio data.

The external interface 909 is an interface for connecting the television apparatus 900 to an external device or a network. For example, a video stream or audio stream received via the external interface 909 may be decoded by the decoder 904. In other words, the external interface 909 also functions as a transmission unit in the television apparatus 900 for receiving an encoded stream including encoded images.

The control unit 910 includes a processor such as a CPU, and memories such as a RAM and a ROM. The memories store a program to be executed by the CPU, program data, EPG data, data acquired via a network, and so forth. The program stored in the memories is read and executed by the CPU when, for example, the television apparatus 900 is started. The CPU executes the program to control the operation of the television apparatus 900 in accordance with, for example, an operation signal input from the user interface 911.

The user interface 911 is connected to the control unit 910. The user interface 911 includes, for example, buttons and switches for allowing the user to operate the television apparatus 900, a receiving unit for a remote control signal, and so forth. The user interface 911 detects an operation of the user via the above-described components to generate an operation signal, and outputs the generated operation signal to the control unit 910.

The bus 912 serves to connect the tuner 902, the demultiplexer 903, the decoder 904, the video signal processing unit 905, the audio signal processing unit 907, the external interface 909, and the control unit 910 to one another.

In the television apparatus 900 having the configuration described above, the decoder 904 has the function of the image decoding device 300 (FIG. 16) according to the foregoing embodiments. Accordingly, the television apparatus 900 can suppress an increase in the amount of coding of a quantization matrix.

8. Eighth Embodiment

Mobile Phone

Figure 36:
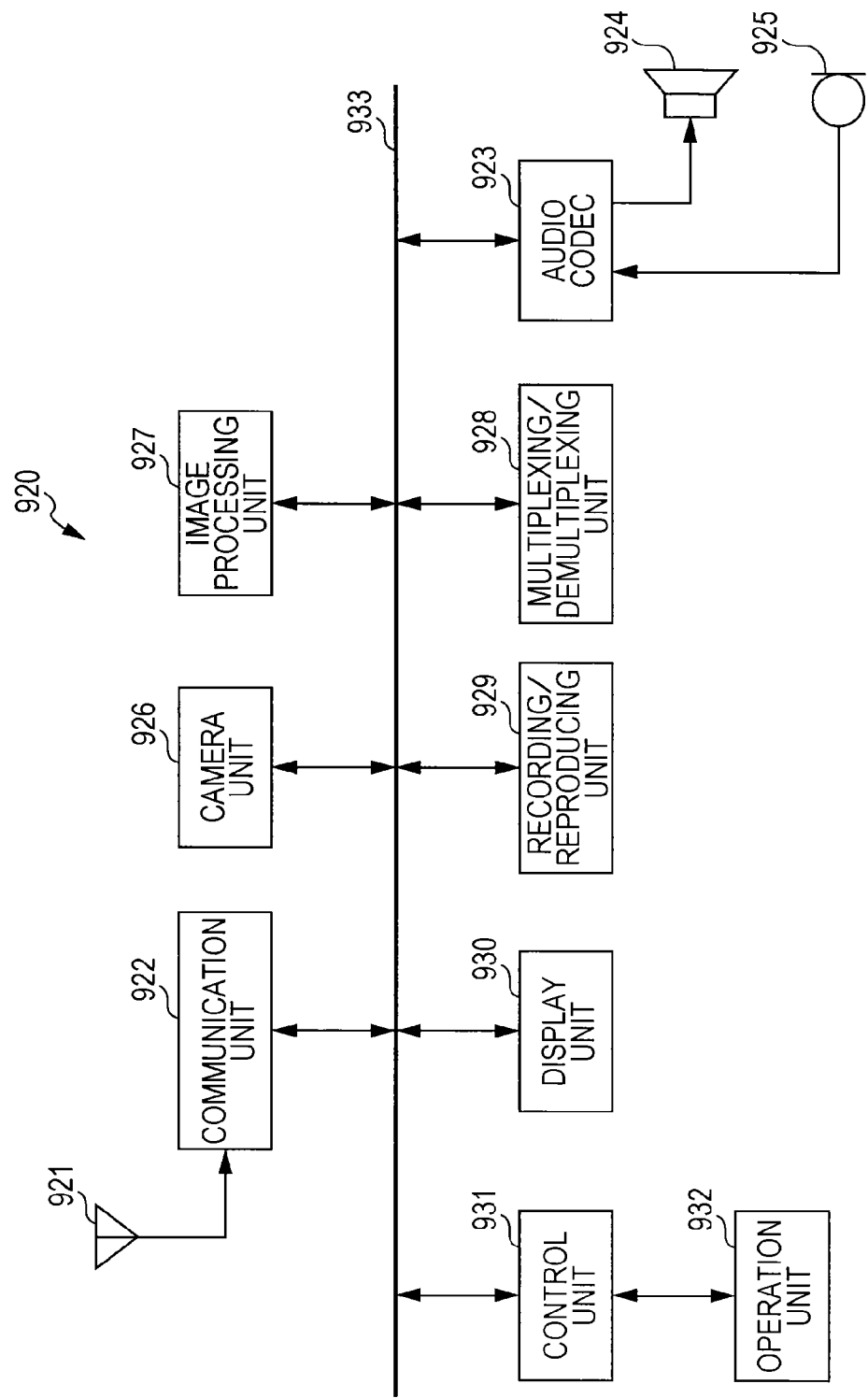
FIG. 36 is a block diagram illustrating a main example configuration of a mobile terminal.

FIG. 36 illustrates an example of a schematic configuration of a mobile phone to which the foregoing embodiments are applied. A mobile phone 920 includes an antenna 921, a communication unit 922, an audio codec 923, a speaker 924, a microphone 925, a camera unit 926, an image processing unit 927, a multiplexing/demultiplexing unit 928, a recording/reproducing unit 929, a display unit 930, a control unit 931, an operation unit 932, and a bus 933.

The antenna 921 is connected to the communication unit 922. The speaker 924 and the microphone 925 are connected to the audio codec 923. The operation unit 932 is connected to the control unit 931. The bus 933 serves to connect the communication unit 922, the audio codec 923, the camera unit 926, the image processing unit 927, the multiplexing/demultiplexing unit 928, the recording/reproducing unit 929, the display unit 930, and the control unit 931 to one another.

The mobile phone 920 performs operations, such as transmitting and receiving an audio signal, transmitting and receiving an electronic mail or image data, capturing an image, and recording data, in various operation modes including a voice call mode, a data communication mode, an image capture mode, and a videophone mode.

In the voice call mode, an analog audio signal generated by the microphone 925 is supplied to the audio codec 923. The audio codec 923 converts the analog audio signal into audio data, and performs A/D conversion and compression on the converted audio data. The audio codec 923 then outputs the compressed audio data to the communication unit 922. The communication unit 922 encodes and modulates the audio data, and generates a transmission signal. The communication unit 922 then transmits the generated transmission signal to a base station (not illustrated) via the antenna 921. Further, the communication unit 922 amplifies a radio signal received via the antenna 921, and performs frequency conversion on the amplified signal to acquire a reception signal. Then, the communication unit 922 demodulates and decodes the reception signal to generate audio data, and outputs the generated audio data to the audio codec 923. The audio codec 923 expands the audio data, and performs D/A conversion to generate an analog audio signal. The audio codec 923 then supplies the generated audio signal to the speaker 924 to cause audio to be output.

Furthermore, in the data communication mode, for example, the control unit 931 generates text data that forms an electronic mail in accordance with an operation of the user via the operation unit 932. Further, the control unit 931 causes text to be displayed on the display unit 930. The control unit 931 further generates electronic mail data in accordance with a transmission instruction given from the user via the operation unit 932, and outputs the generated electronic mail data to the communication unit 922. The communication unit 922 encodes and modulates the electronic mail data to generate a transmission signal. Then, the communication unit 922 transmits the generated transmission signal to the base station (not illustrated) via the antenna 921. Further, the communication unit 922 amplifies a radio signal received via the antenna 921, and performs frequency conversion on the amplified signal to acquire a reception signal. Then, the communication unit 922 demodulates and decodes the reception signal to restore electronic mail data, and outputs the restored electronic mail data to the control unit 931. The control unit 931 causes the content of the electronic mail to be displayed on the display unit 930, and also causes the electronic mail data to be stored in a storage medium of the recording/reproducing unit 929.

The recording/reproducing unit 929 includes a desired readable/writable storage medium. The storage medium may be, for example, a built-in storage medium such as a RAM or a flash memory, or an external storage medium such as a hard disk, a magnetic disk, a magneto-optical disk, an optical disk, a USB memory, or a memory card.

Furthermore, in the image capture mode, for example, the camera unit 926 captures an image of an object to generate image data, and outputs the generated image data to the image processing unit 927. The image processing unit 927 encodes the image data input from the camera unit 926, and causes an encoded stream to be stored in the storage medium of the recording/reproducing unit 929.

Furthermore, in the videophone mode, for example, the multiplexing/demultiplexing unit 928 multiplexes the video stream encoded by the image processing unit 927 and the audio stream input from the audio codec 923, and outputs a multiplexed stream to the communication unit 922. The communication unit 922 encodes and modulates the stream to generate a transmission signal. Then, the communication unit 922 transmits the generated transmission signal to the base station (not illustrated) via the antenna 921. Further, the communication unit 922 amplifies a radio signal received via the antenna 921, and performs frequency conversion on the amplified signal to acquire a reception signal. The transmission signal and the reception signal may include an encoded bit stream. Then, the communication unit 922 demodulates and decodes the reception signal to restore a stream, and outputs the restored stream to the multiplexing/demultiplexing unit 928. The multiplexing/demultiplexing unit 928 demultiplexes the input stream into a video stream and an audio stream, and outputs the video stream and the audio stream to the image processing unit 927 and the audio codec 923, respectively. The image processing unit 927 decodes the video stream to generate video data. The video data is supplied to the display unit 930, and a series of images is displayed by the display unit 930. The audio codec 923 expands the audio stream, and performs D/A conversion to generate an analog audio signal. The audio codec 923 then supplies the generated audio signal to the speaker 924 to cause audio to be output.

In the mobile phone 920 having the configuration described above, the image processing unit 927 has the function of the image encoding device 10 (FIG. 1) and the function of the image decoding device 300 (FIG. 16) according to the foregoing embodiments. Accordingly, the mobile phone 920 can suppress an increase in the amount of coding of a quantization matrix.

In addition, while a description has been given of the mobile phone 920, for example, an image encoding device and an image decoding device to which the present technology is applied may be used in, similarly to the mobile phone 920, any apparatus having an imaging function and a communication function similar to those of the mobile phone 920, such as a PDA (Personal Digital Assistants), a smartphone, a UMPC (Ultra Mobile Personal Computer), a netbook, or a notebook personal computer.

9. Ninth Embodiment

Recording/Reproducing Apparatus

Figure 37:
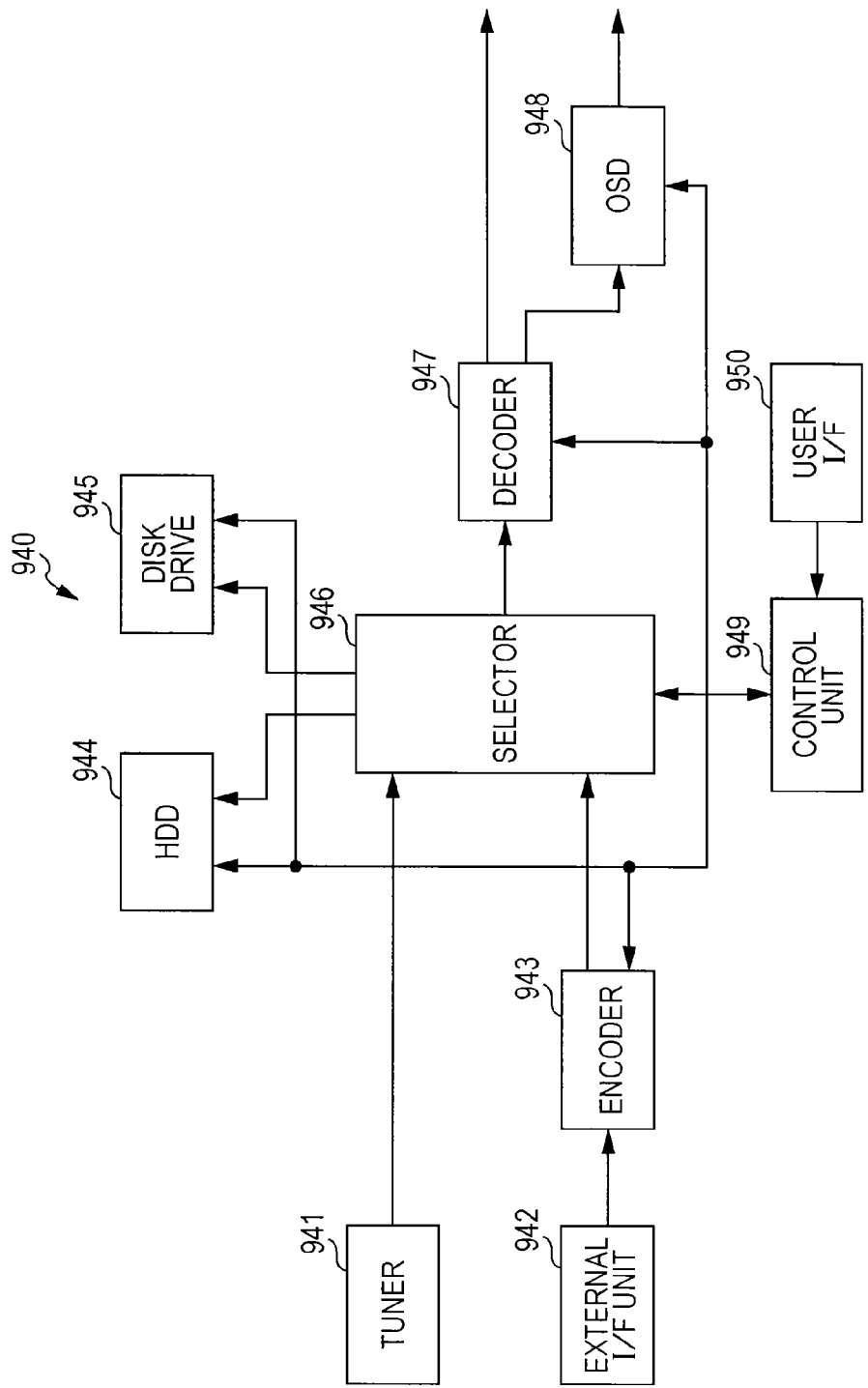
FIG. 37 is a block diagram illustrating a main example configuration of a recorder/reproducer.

FIG. 37 illustrates an example of a schematic configuration of a recorder/reproducer to which the foregoing embodiments are applied. A recorder/reproducer 940 encodes, for example, audio data and video data of a received broadcast program, and records the encoded audio data and video data on a recording medium. In addition, the recorder/reproducer 940 may also encode audio data and video data acquired from, for example, another apparatus, and record the encoded audio data and video data on a recording medium. Further, the recorder/reproducer 940 reproduces, for example, data recorded on a recording medium using a monitor and a speaker in accordance with an instruction given from a user. In this case, the recorder/reproducer 940 decodes audio data and video data.

The recorder/reproducer 940 includes a tuner 941, an external interface 942, an encoder 943, an HDD (Hard Disk Drive) 944, a disk drive 945, a selector 946, a decoder 947, an OSD (On-Screen Display) 948, a control unit 949, and a user interface 950.

The tuner 941 extracts a signal in a desired channel from a broadcast signal received via an antenna (not illustrated), and demodulates the extracted signal. The tuner 941 then outputs an encoded bit stream obtained by demodulation to the selector 946. In other words, the tuner 941 functions as a transmission unit in the recorder/reproducer 940.

The external interface 942 is an interface for connecting the recorder/reproducer 940 to an external device or a network. The external interface 942 may be, for example, an IEEE 1394 interface, a network interface, a USB interface, a flash memory interface, or the like. For example, video data and audio data received via the external interface 942 are input to the encoder 943. In other words, the external interface 942 functions as a transmission unit in the recorder/reproducer 940.

The encoder 943 encodes video data and audio data input from the external interface 942 if the video data and audio data have not been encoded. The encoder 943 then outputs an encoded bit stream to the selector 946.

The HDD 944 records an encoded bit stream including compressed content data such as video and audio, various programs, and other data on an internal hard disk. Further, the HDD 944 reads the above-described data from the hard disk when reproducing video and audio.

The disk drive 945 records and reads data on and from a recording medium placed therein. The recording medium placed in the disk drive 945 may be, for example, a DVD disk (such as DVD-Video, DVD-RAM, DVD-R, DVD-RW, DVD+R, or DVD+RW) or a Blu-ray (registered trademark) disc.

The selector 946 selects an encoded bit stream input from the tuner 941 or the encoder 943 when recording video and audio, and outputs the selected encoded bit stream to the HDD 944 or the disk drive 945. When reproducing video and audio, the selector 946 outputs an encoded bit stream input from the HDD 944 or the disk drive 945 to the decoder 947.

The decoder 947 decodes the encoded bit stream to generate video data and audio data. The decoder 947 then outputs the generated video data to the OSD 948. The decoder 947 further outputs the generated audio data to an external speaker.

The OSD 948 reproduces the video data input from the decoder 947, and displays video. In addition, the OSD 948 may also superimpose a GUI image such as a menu, a button, or a cursor on the video to be displayed.

The control unit 949 includes a processor such as a CPU, and memories such as a RAM and a ROM. The memories store a program to be executed by the CPU, program data, and so forth. The program stored in the memories is read and executed by the CPU when, for example, the recorder/reproducer 940 is started. The CPU executes the program to control the operation of the recorder/reproducer 940 in accordance with, for example, an operation signal input from the user interface 950.

The user interface 950 is connected to the control unit 949. The user interface 950 includes, for example, buttons and switches for allowing the user to operate the recorder/reproducer 940, a receiving unit for a remote control signal, and so forth. The user interface 950 detects an operation of the user via the above-described components to generate an operation signal, and outputs the generated operation signal to the control unit 949.

In the recorder/reproducer 940 having the configuration described above, the encoder 943 has the function of the image encoding device 10 (FIG. 1) according to the foregoing embodiments. The decoder 947 has the function of the image decoding device 300 (FIG. 16) according to the foregoing embodiments. Accordingly, the recorder/reproducer 940 can suppress an increase in the amount of coding of a quantization matrix.

10. Tenth Embodiment

Imaging Apparatus

Figure 38:
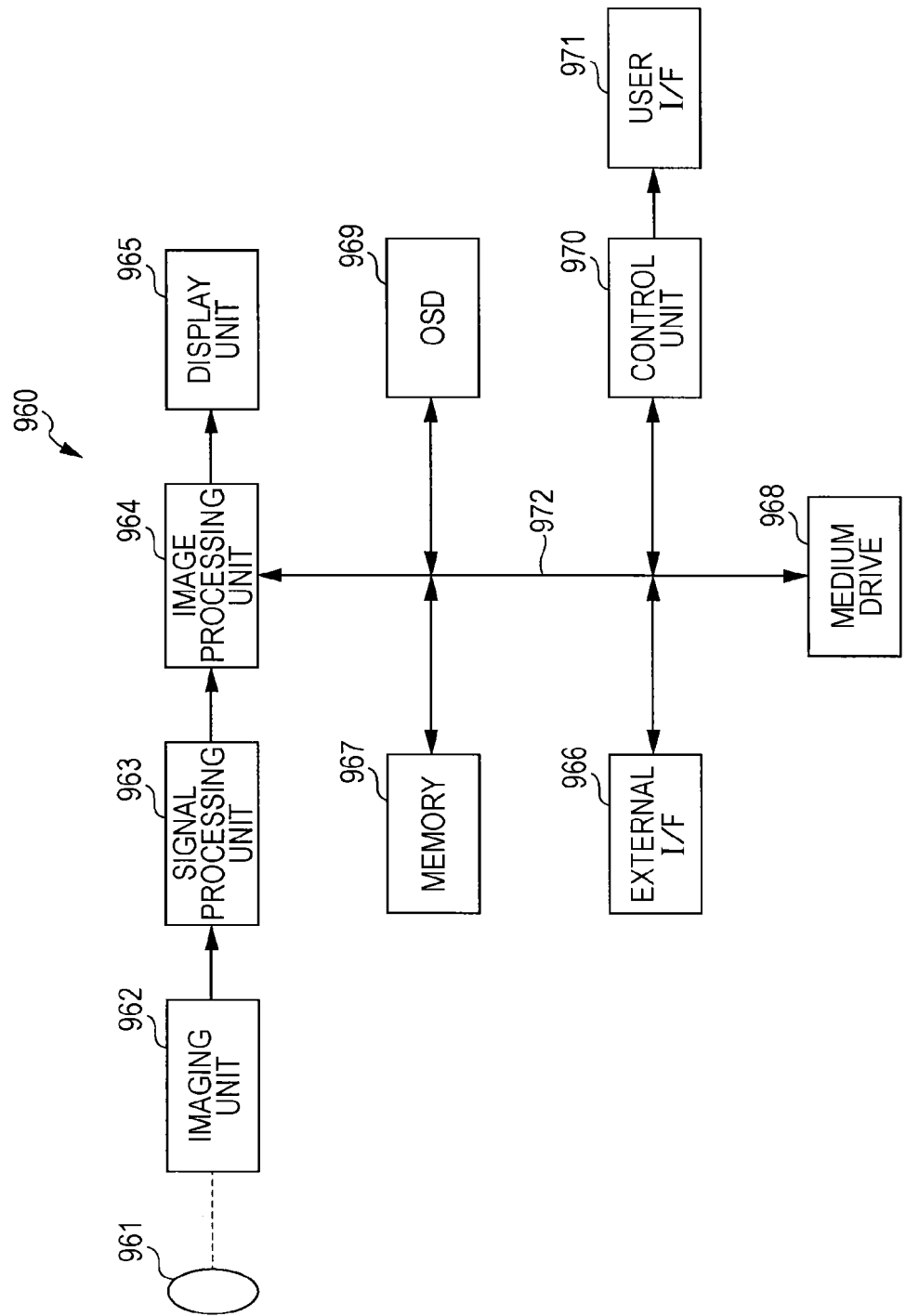
FIG. 38 is a block diagram illustrating a main example configuration of an imaging apparatus.

FIG. 38 illustrates an example of a schematic configuration of an imaging apparatus to which the foregoing embodiments are applied. An imaging apparatus 960 captures an image of an object to generate image data, encodes the image data, and records the encoded image data on a recording medium.

The imaging apparatus 960 includes an optical block 961, an imaging unit 962, a signal processing unit 963, an image processing unit 964, a display unit 965, an external interface 966, a memory 967, a medium drive 968, an OSD 969, a control unit 970, a user interface 971, and a bus 972.

The optical block 961 is connected to the imaging unit 962. The imaging unit 962 is connected to the signal processing unit 963. The display unit 965 is connected to the image processing unit 964. The user interface 971 is connected to the control unit 970. The bus 972 serves to connect the image processing unit 964, the external interface 966, the memory 967, the medium drive 968, the OSD 969, and the control unit 970 to one another.

The optical block 961 includes a focus lens, an aperture mechanism, and so forth. The optical block 961 forms an optical image of the object on an imaging surface of the imaging unit 962. The imaging unit 962 includes an image sensor such as a CCD or CMOS image sensor, and converts the optical image formed on the imaging surface into an image signal serving as an electrical signal by performing photoelectric conversion. The imaging unit 962 then outputs the image signal to the signal processing unit 963.

The signal processing unit 963 performs various camera signal processing operations, such as knee correction, gamma correction, and color correction, on the image signal input from the imaging unit 962. The signal processing unit 963 outputs the image data subjected to camera signal processing operations to the image processing unit 964.

The image processing unit 964 encodes the image data input from the signal processing unit 963 to generate encoded data. The image processing unit 964 then outputs the generated encoded data to the external interface 966 or the medium drive 968. Further, the image processing unit 964 decodes the encoded data input from the external interface 966 or the medium drive 968 to generate image data. The image processing unit 964 then outputs the generated image data to the display unit 965. In addition, the image processing unit 964 may also output the image data input from the signal processing unit 963 to the display unit 965 to cause an image to be displayed. In addition, the image processing unit 964 may also superimpose display data acquired from the OSD 969 on the image to be output to the display unit 965.

The OSD 969 generates a GUI image such as a menu, a button, or a cursor, and outputs the generated image to the image processing unit 964.

The external interface 966 is formed as, for example, a USB input/output terminal. The external interface 966 connects, for example, the imaging apparatus 960 to a printer when printing an image. A drive is further connected to the external interface 966, if necessary. A removable medium such as a magnetic disk or an optical disk is placed in the drive, and a program read from the removable medium may be installed into the imaging apparatus 960. In addition, the external interface 966 may also be formed as a network interface to be connected to a network such as a LAN or the Internet. In other words, the external interface 966 functions as a transmission unit in the imaging apparatus 960.

The recording medium to be placed in the medium drive 968 may be, for example, any readable/writable removable medium such as a magnetic disk, a magneto-optical disk, an optical disk, or a semiconductor memory. Alternatively, a recording medium may be fixedly attached to the medium drive 968, and may form a built-in hard disk drive or a non-portable storage section such as an SSD (Solid State Drive).

The control unit 970 includes a processor such as a CPU, and memories such as a RAM and a ROM. The memories store a program to be executed by the CPU, program data, and so forth. The program stored in the memories is read and executed by the CPU when, for example, the imaging apparatus 960 is started. The CPU executes the program to control the operation of the imaging apparatus 960 in accordance with, for example, an operation signal input from the user interface 971.

The user interface 971 is connected to the control unit 970. The user interface 971 includes, for example, buttons, switches, and so forth for allowing the user to operate the imaging apparatus 960. The user interface 971 detects an operation of the user via the above-described components to generate an operation signal, and outputs the generated operation signal to the control unit 970.

In the imaging apparatus 960 having the configuration described above, the image processing unit 964 has the function of the image encoding device 10 (FIG. 1) and the function of the image decoding device 300 (FIG. 16) according to the foregoing embodiments. Accordingly, the imaging apparatus 960 can suppress an increase in the amount of coding of a quantization matrix.

As a matter of course, an image encoding device and an image decoding device to which the present technology is applied may also be used in apparatuses other than the apparatuses described above or in systems.

11. Exemplary Application of Scalable Coding

[First System]

Next, a specific example of use of scalable coded data which has been scalably coded (hierarchically coded) will be described. Scalable coding is used for, for example, the selection of data to be transmitted, as in an example illustrated in FIG. 39.

Figure 39:
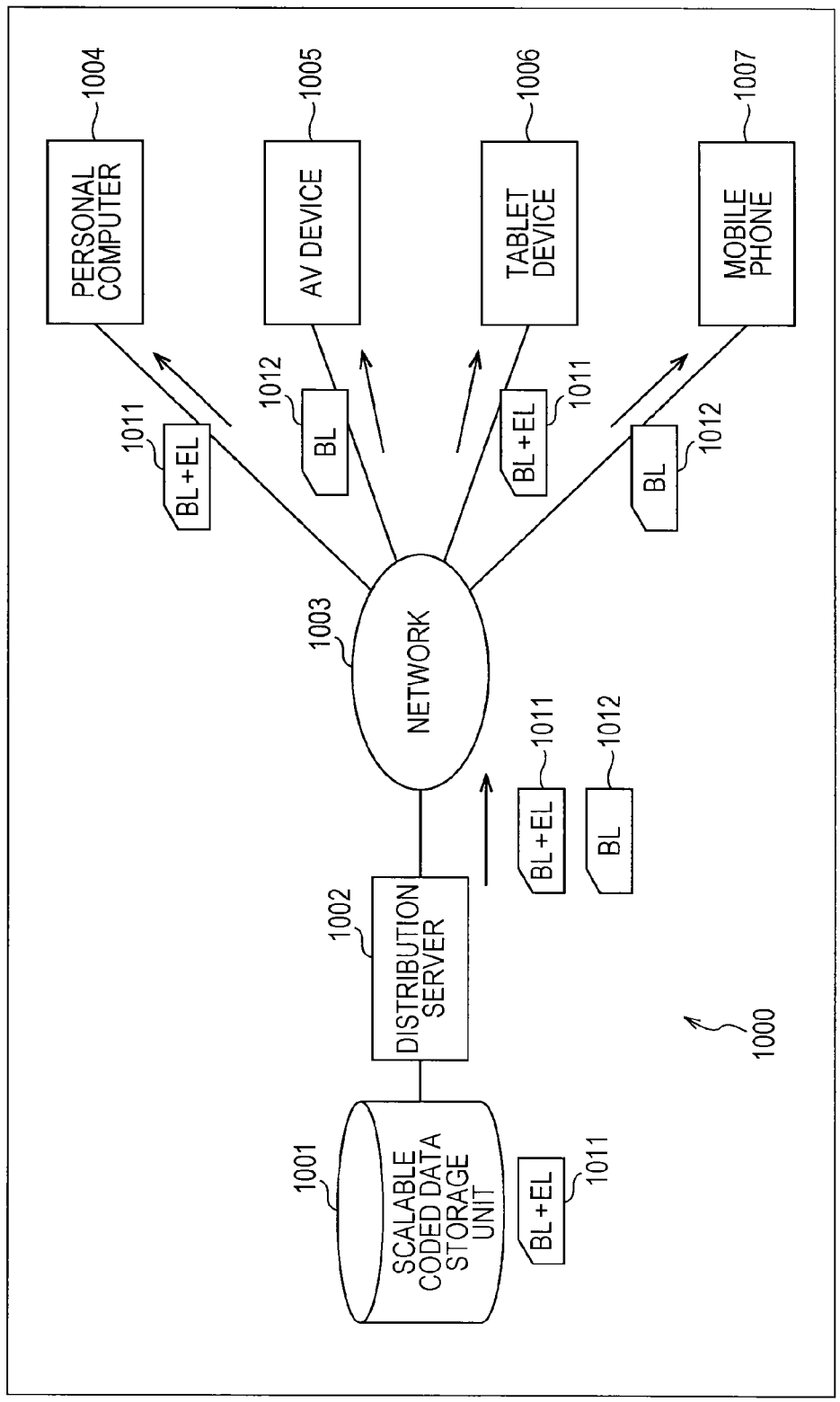
FIG. 39 is a diagram illustrating an example of the use of scalable coding.

In a data transmission system 1000 illustrated in FIG. 39, a distribution server 1002 reads scalable coded data stored in a scalable coded data storage unit 1001, and distributes the scalable coded data to terminal devices, such as a personal computer 1004, an AV device 1005, a tablet device 1006, and a mobile phone 1007, via a network 1003.

In this case, the distribution server 1002 selects encoded data having desired quality in accordance with the performance of the terminal device, the communication environment, and the like, and transmits the selected encoded data. Even if the distribution server 1002 transmits data having quality higher than necessary, the terminal device may not always obtain a high-quality image, and delay or overflow may be caused. In addition, such data may occupy communication bandwidth more than necessary, or may increase the load on the terminal device more than necessary. Conversely, even if the distribution server 1002 transmits data having quality lower than necessary, the terminal device may not necessarily obtain an image with a sufficient quality. Thus, the distribution server 1002 reads the scalable coded data stored in the scalable coded data storage unit 1001, if necessary, as encoded data having quality appropriate for the performance of the terminal device, communication environment, and the like, and transmits the read encoded data.

For example, it is assumed that the scalable coded data storage unit 1001 stores scalable coded data (BL+EL) 1011 which has been scalably coded. The scalable coded data (BL+EL) 1011 is encoded data including a base layer and an enhancement layer, and is data which is decoded to obtain both an image of the base layer and an image of the enhancement layer.

The distribution server 1002 selects an appropriate layer in accordance with the performance of a terminal device that transmits data, the communication environment, and the like, and reads the data of the layer. For example, the distribution server 1002 reads high-quality scalable coded data (BL+EL) 1011 from the scalable coded data storage unit 1001, and transmits the read scalable coded data (BL+EL) 1011 to devices having high processing capabilities, namely, the personal computer 1004 or the tablet device 1006, as it is. In contrast, for example, the distribution server 1002 extracts the data of the base layer from the scalable coded data (BL+EL) 1011, and transmits the extracted data of the base layer to devices having low processing capabilities, namely, the AV device 1005 and the mobile phone 1007, as scalable coded data (BL) 1012 having the same content as the scalable coded data (BL+EL) 1011 but having lower quality than the scalable coded data (BL+EL) 1011.

The use of scalable coded data in this manner facilitates the adjustment of the amount of data, thereby suppressing the occurrence of delay or overflow and suppressing an unnecessary increase in the load on a terminal device or a communication medium. Furthermore, the scalable coded data (BL+EL) 1011 has reduced redundancy between layers, and therefore has a smaller amount of data than data having individually encoded data of the respective layers. Accordingly, the storage area of the scalable coded data storage unit 1001 can be more efficiently utilized.

Note that since various devices such as the personal computer 1004, the AV device 1005, the tablet device 1006, and the mobile phone 1007 are applicable as terminal devices, the hardware performance of terminal devices differs from device to device. In addition, since various applications may be executed by terminal devices, the software capabilities of the applications may vary. Furthermore, the network 1003 serving as a communication medium may be implemented as any communication line network which can be wired, wireless, or both, such as the Internet and a LAN (Local Area Network), and have various data transmission capabilities. Such performance and capabilities may vary depending on other communication and the like.

Accordingly, prior to the start of transmission of data, the distribution server 1002 may communicate with a terminal device to which the data is to be transmitted, and may obtain information concerning the capabilities of the terminal device, such as the hardware performance of the terminal device or the performance of application (software) executed by the terminal device, and also information concerning the communication environment, such as the available bandwidth of the network 1003. In addition, the distribution server 1002 may select an appropriate layer on the basis of the obtained information.

Note that a layer may be extracted by a terminal device. For example, the personal computer 1004 may decode the transmitted scalable coded data (BL+EL) 1011, and display an image of a base layer or an image of an enhancement layer. Alternatively, for example, the personal computer 1004 may extract the scalable coded data (BL) 1012 of the base layer from the transmitted scalable coded data (BL+EL) 1011, store the extracted scalable coded data (BL) 1012, transfer the extracted scalable coded data (BL) 1012 to another device, or decode the extracted scalable coded data (BL) 1012 to display an image of the base layer.

As a matter of course, the number of scalable coded data storage units 1001, the number of distribution servers 1002, the number of networks 1003, and the number of terminal devices may be arbitrary. In addition, while a description has been given of an example in which the distribution server 1002 transmits data to a terminal device, other examples of use may be found. The data transmission system 1000 may be used in any system that selects an appropriate layer, when transmitting encoded data which has been scalably coded to a terminal device, in accordance with the capabilities of the terminal device, the communication environment, and the like.

In addition, the present technology can also be applied to the data transmission system 1000 as illustrated in FIG. 39 described above in a manner similar to application to the hierarchical encoding and hierarchical decoding described above with reference to FIG. 31 to FIG. 33, thereby achieving advantages similar to the advantages described above with reference to FIG. 31 to FIG. 33.

[Second System]

Figure 40:
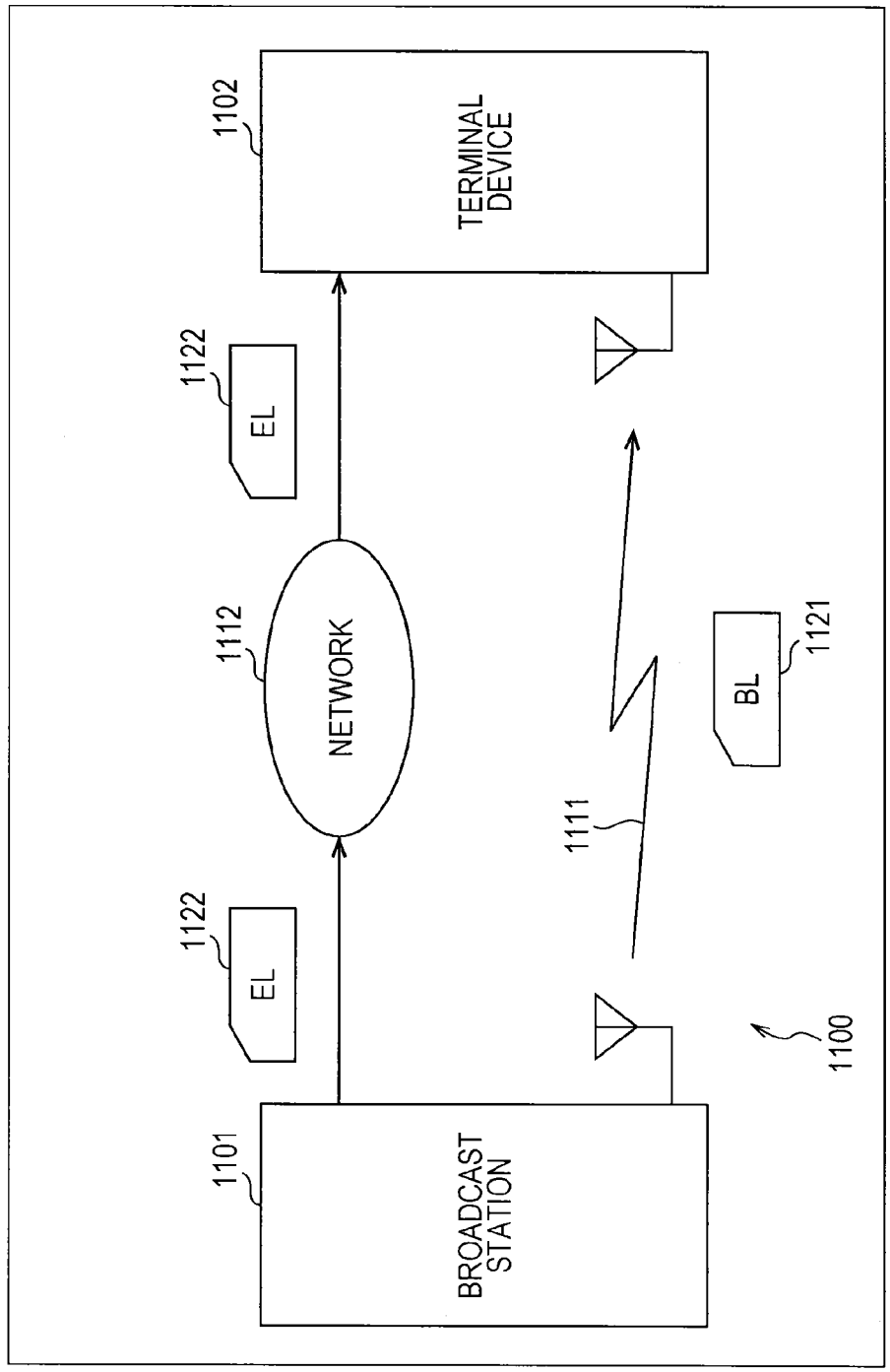
FIG. 40 is a block diagram illustrating another example of the use of scalable coding.

Scalable coding is also used for, for example, as in an example illustrated in FIG. 40, transmission via a plurality of communication media.

In a data transmission system 1100 illustrated in FIG. 40, a broadcast station 1101 transmits scalable coded data (BL) 1121 of a base layer via terrestrial broadcasting 1111. The broadcast station 1101 further transmits (e.g. packetizes and transmits) scalable coded data (EL) 1122 of an enhancement layer via a desired network 1112 formed of a communication network which can be wired, wireless, or both.

A terminal device 1102 has a function for receiving the terrestrial broadcasting 1111 from the broadcast station 1101, and receives the scalable coded data (BL) 1121 of the base layer transmitted via the terrestrial broadcasting 1111. The terminal device 1102 further has a communication function for performing communication via the network 1112, and receives the scalable coded data (EL) 1122 of the enhancement layer transmitted via the network 1112.

The terminal device 1102 decodes the scalable coded data (BL) 1121 of the base layer acquired via the terrestrial broadcasting 1111 in accordance with, for example, a user instruction or the like to obtain an image of the base layer, stores the scalable coded data (BL) 1121, or transfers the scalable coded data (BL) 1121 to another device.

Further, the terminal device 1102 combines the scalable coded data (BL) 1121 of the base layer acquired via the terrestrial broadcasting 1111 with the scalable coded data (EL) 1122 of the enhancement layer acquired via the network 1112 in accordance with, for example, a user instruction or the like to obtain scalable coded data (BL+EL), and decodes the scalable coded data (BL+EL) to obtain an image of the enhancement layer, stores the scalable coded data (BL+EL), or transfers the scalable coded data (BL+EL) to another device.

As described above, scalable coded data can be transmitted via, for example, communication media different from one layer to another. Thus, the load can be distributed, and delay or overflow can be suppressed from occurring.

Further, a communication medium to be used for transmission may be selectable for each layer in accordance with the situation. For example, the scalable coded data (BL) 1121 of the base layer having a relatively large amount of data may be transmitted via a communication medium having a large bandwidth, and the scalable coded data (EL) 1122 of the enhancement layer having a relatively small amount of data may be transmitted via a communication medium having a narrow bandwidth. Alternatively, for example, the communication medium via which the scalable coded data (EL) 1122 of the enhancement layer is to be transmitted may be switched between the network 1112 and the terrestrial broadcasting 1111 in accordance with the available bandwidth of the network 1112. As a matter of course, the above similarly applies to data of an arbitrary layer.

Control in the manner described above can further suppress an increase in the load of data transmission.

As a matter of course, the number of layers is arbitrary, and the number of communication media to be used for transmission is also arbitrary. In addition, the number of terminal devices 1102 to which data is to be distributed is also arbitrary. In addition, while a description has been given in the context of broadcasting from the broadcast station 1101 by way of example, other examples of use may be found. The data transmission system 1100 may be applied to any system that divides encoded data which has been subjected to scalable coding into a plurality of segments in units of layers and transmits the data segments via a plurality of lines.

In addition, the present technology can also be applied to the data transmission system 1100 as illustrated in FIG. 40 described above in a manner similar to application to the hierarchical encoding and hierarchical decoding described above with reference to FIG. 31 to FIG. 33, thereby achieving advantages similar to the advantages described above with reference to FIG. 31 to FIG. 33.

[Third System]

Figure 41:
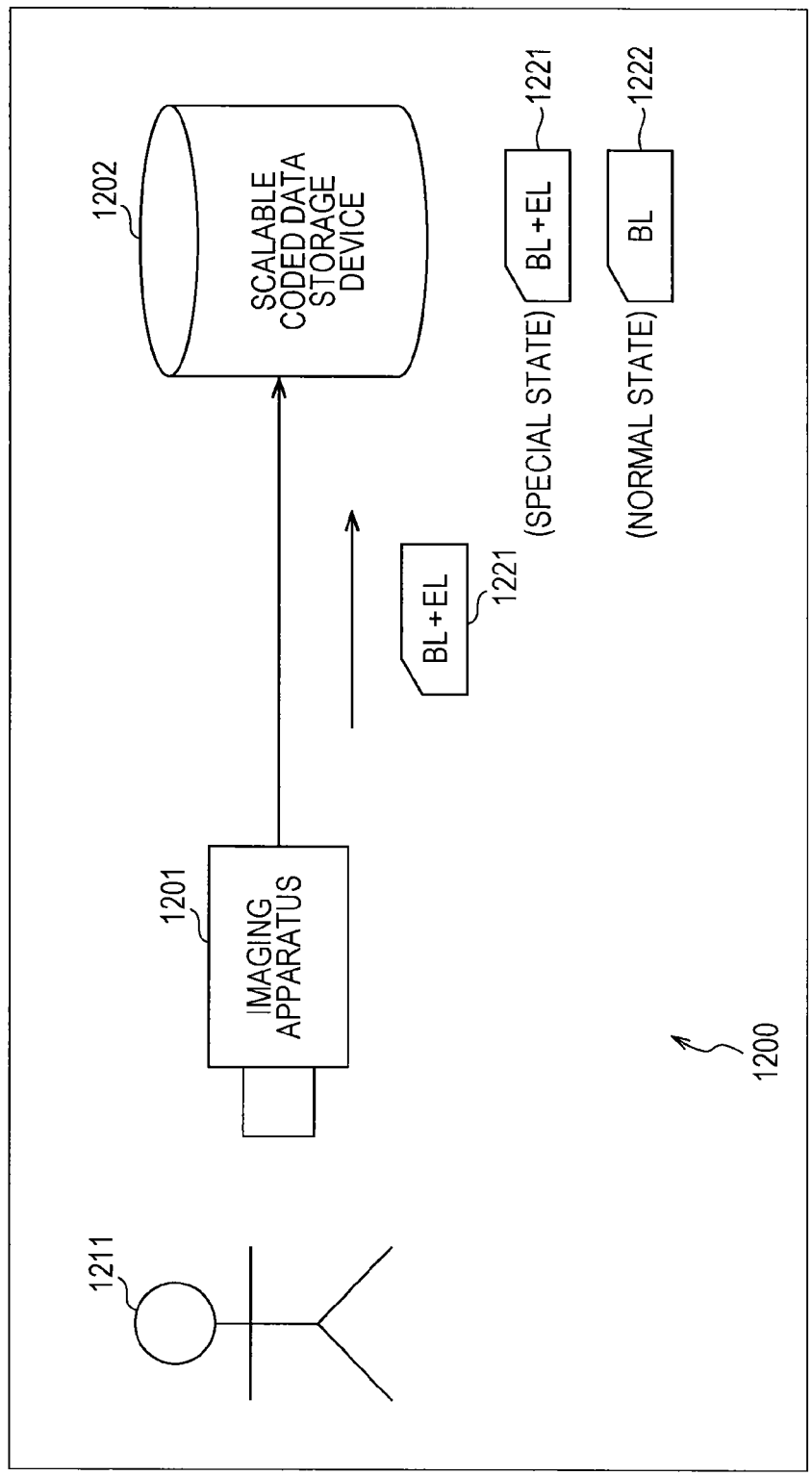
FIG. 41 is a block diagram illustrating still another example of the use of scalable coding.

Scalable coding is also used for, for example, as in an example illustrated in FIG. 41, the storage of encoded data.

In an imaging system 1200 illustrated in FIG. 41, an imaging apparatus 1201 performs scalable coding on image data obtained by capturing an image of an object 1211, and supplies the resulting data to a scalable coded data storage device 1202 as scalable coded data (BL+EL) 1221.

The scalable coded data storage device 1202 stores the scalable coded data (BL+EL) 1221 supplied from the imaging apparatus 1201 at the quality corresponding to the situation. For example, in a normal state, the scalable coded data storage device 1202 extracts data of a base layer from the scalable coded data (BL+EL) 1221, and stores the extracted data of the base layer as scalable coded data (BL) 1222 of the base layer having a low quality and a small amount of data. In contrast, for example, in a special state, the scalable coded data storage device 1202 stores the scalable coded data (BL+EL) 1221 having a high quality and a large amount of data, as it is.

Accordingly, the scalable coded data storage device 1202 can save an image at high quality only when necessary. This can suppress an increase in the amount of data while suppressing a reduction in the worth of the image due to a reduction in quality, and can improve use efficiency of the storage area.

For example, it is assumed that the imaging apparatus 1201 is a security camera. If an object to be monitored (e.g., intruder) does not appear in a captured image (normal state), it may be probable that the captured image does not have important content. Thus, a reduction in the amount of data is prioritized, and the image data (scalable coded data) of the image is stored at low quality. In contrast, if an object to be monitored appears as the object 1211 in a captured image (special state), it may be probable that the captured image has important content. Thus, image quality is prioritized, and the image data (scalable coded data) of the image is stored at high quality.

Note that either the normal state or the special state may be determined by, for example, the scalable coded data storage device 1202 by analyzing an image. Alternatively, the imaging apparatus 1201 may determine the normal state or the special state, and may transmit the determination result to the scalable coded data storage device 1202.

Note that the determination of either the normal state or the special state may be based on an arbitrary standard, and an image on which the determination is based may have any content. As a matter of course, conditions other than the content of an image may be used as the determination standard. The mode may be changed in accordance with, for example, the magnitude, waveform, or the like of recorded audio, or may be changed at intervals of a predetermined period of time. Alternatively, the mode may be changed in accordance with an external instruction such as a user instruction.

In addition, while a description has been given of an example of changing between two states, namely, normal state and special state, the number of states is arbitrary, and the state change may be made between more than two states, such as a normal state, a less special state, a special state, and a more special state. Note that the upper limit number of states to be changed depends on the number of layers of scalable coded data.

Further, the imaging apparatus 1201 may determine the number of layers of scalable coding in accordance with the state. For example, in a normal state, the imaging apparatus 1201 may generate scalable coded data (BL) 1222 of the base layer having a low quality and a small amount of data, and supply the generated scalable coded data (BL) 1222 to the scalable coded data storage device 1202. Further, for example, in a special state, the imaging apparatus 1201 may generate scalable coded data (BL+EL) 1221 of the base layer having a high quality and a large amount of data, and supply the generated scalable coded data (BL+EL) 1221 to the scalable coded data storage device 1202.

While a security camera has been described as an example, the imaging system 1200 may be used in any application, and the application is not limited to a security camera.

In addition, the present technology can also be applied to the imaging system 1200 as illustrated in FIG. 41 described above in a manner similar to application to the hierarchical encoding and hierarchical decoding described above with reference to FIG. 31 to FIG. 33, thereby achieving advantages similar to the advantages described above with reference to FIG. 31 to FIG. 33.

Note that the present technology is also applicable to HTTP streaming, such as MPEG DASH, in which an appropriate piece of encoded data is selected in units of segments from among a plurality of pieces of encoded data prepared in advance and having different resolutions and is used. In other words, information concerning encoding and decoding may also be shared between a plurality of pieces of encoded data.

Note that an example has been described herein in which a quantization matrix and a parameter related to a quantization matrix are transmitted from the encoder side to the decoder side. A technique for transmitting quantization matrices and parameters related to quantization matrices may be to transmit or record the quantization matrix parameters as separate data associated with an encoded bit stream without multiplexing the quantization matrix parameters into the encoded bit stream. The term "associate", as used herein, means allowing an image (which may be part of an image, such as a slice or block) included in a bit stream to be linked to information corresponding to the image when the image is decoded. That is, the information may be transmitted on a transmission path different from that for the image (or bit stream). Further, the information may be recorded on a recording medium different from that for the image (or bit stream) (or recorded in a different recording area of the same recording medium). Furthermore, the information and the image (or bit stream) may be associated with each other in arbitrary units such as a plurality of frames, one frame, or a portion in a frame.

While preferred embodiments of the present disclosure have been described in detail with reference to the accompanying drawings, the technical scope of the present disclosure is not limited to such examples. It is self-explanatory that any person having ordinary knowledge in the technical field of the present disclosure could achieve various changes or modifications within the scope of the technical idea as defined in the appended claims, and it is to be understood that such changes or modifications may also fall within the technical scope of the present disclosure.

Note that the present technology may also provide following configurations.

(1) An image processing device including:
a receiving unit configured to receive encoded data and a quantization matrix, the encoded data being obtained by performing an encoding process on an image, the quantization matrix being limited to a size less than or equal to a transmission size that is a maximum size allowed for transmission;

a decoding unit configured to perform a decoding process on the encoded data received by the receiving unit to generate quantized data;

an up-conversion unit configured to up-convert the quantization matrix received by the receiving unit from the transmission size to a size that is identical to a block size, the block size being a processing unit in which dequantization is performed; and a dequantization unit configured to dequantize the quantized data generated by the decoding unit using the quantization matrix up-converted by the up-conversion unit.

(2) The image processing device according to any of (1) and (3) through (19), wherein
the quantization matrix received by the receiving unit has, as the transmission size, a size that is identical to a default quantization matrix size.

(3) The image processing device according to any of (1), (2), and (4) through (19), wherein
the quantization matrix received by the receiving unit has, as the transmission size, a size that is identical to a maximum size of a default quantization matrix.

(4) The image processing device according to any of (1) through (3) and (5) through (19), wherein
the transmission size is 8×8, and
the quantization matrix received by the receiving unit has an 8×8 size.

(5) The image processing device according to any of (1) through (4) and (6) through (19), wherein
the up-conversion unit up-converts the quantization matrix limited to the size less than or equal to the transmission size, by performing an interpolation process on a matrix element in the quantization matrix received by the receiving unit.

(6) The image processing device according to any of (1) through (5) and (7) through (19), wherein
the up-conversion unit up-converts the quantization matrix limited to the size less than or equal to the transmission size, by performing a nearest neighbor interpolation process on a matrix element in the quantization matrix received by the receiving unit.

(7) The image processing device according to any of (1) through (6) and (8) through (19), wherein
the transmission size is 8×8, and
the up-conversion unit up-converts a quantization matrix having an 8×8 size to a quantization matrix having a 16×16 size by performing the nearest neighbor interpolation process on a matrix element in the quantization matrix having an 8×8 size.

(8) The image processing device according to any of (1) through (7) and (9) through (19), wherein
the up-conversion unit up-converts a quantization matrix having an 8×8 size to a quantization matrix having a 32×32 size by performing the nearest neighbor interpolation process on a matrix element in the quantization matrix having an 8×8 size.

(9) The image processing device according to any of (1) through (8) and (10) through (19), wherein
the up-conversion unit up-converts a square quantization matrix limited to a size less than or equal to the transmission size to a non-square quantization matrix by performing an interpolation process on a matrix element in the square quantization matrix.

(10) The image processing device according to any of (1) through (9) and (11) through (19), wherein
the transmission size is 8×8, and
the up-conversion unit up-converts a quantization matrix having an 8×8 size to a quantization matrix having an 8×32 size or a quantization matrix having a 32×8 size, by performing the interpolation process on a matrix element in the quantization matrix having an 8×8 size.

(11) The image processing device according to any of (1) through (10) and (12) through (19), wherein the transmission size is 8×8, and the up-conversion unit up-converts a quantization matrix having a 4×4 size to a quantization matrix having a 4×16 size or a quantization matrix having a 16×4 size, by performing the interpolation process on a matrix element in the quantization matrix having a 4×4 size.

(12) The image processing device according to any of (1) through (11) and (13) through (19), wherein the transmission size is 8×8, and the up-conversion unit up-converts a quantization matrix having an 8×8 size to a quantization matrix having a 2×32 size, a quantization matrix having a 32×2 size, a quantization matrix having a 1×16 size, or a quantization matrix having a 16×1 size, by performing the interpolation process on a matrix element in the quantization matrix having an 8×8 size.

(13) The image processing device according to any of (1) through (12) and (14) through (19), wherein a coding unit that is a processing unit in which a decoding process is performed and a transform unit that is a processing unit in which a transform process is performed have a layered structure, the decoding unit performs a decoding process on the encoded data using a unit having a layered structure, and the up-conversion unit up-converts the quantization matrix received by the receiving unit from the transmission size to a size of a transform unit that is a processing unit in which dequantization is performed.

(14) The image processing device according to any of (1) through (13) and (15) through (19), wherein the quantization matrix is set as a quantization matrix having matrix elements which differ in accordance with a block size that is a processing unit in which dequantization is performed, the receiving unit receives a quantization matrix having matrix elements which differ in accordance with a block size that is a processing unit in which dequantization is performed, and the up-conversion unit up-converts the quantization matrix received by the receiving unit, using a quantization matrix having matrix elements which differ in accordance with a block size that is a processing unit in which dequantization is performed.

(15) The image processing device according to any of (1) through (14) and (16) through (19), wherein the transmission size is 8×8, and the up-conversion unit up-converts a first quantization matrix in a case where a block size that is a processing unit in which dequantization is performed is 16×16, and up-converts a second quantization matrix having matrix elements which differ from the first quantization matrix in a case where a block size that is a processing unit in which dequantization is performed is 32×32.

(16) The image processing device according to any of (1) through (15) and (17) through (19), wherein the receiving unit receives a quantization matrix which differs in accordance with a size to up-convert, and the up-conversion unit performs up-conversion using a quantization matrix corresponding to a size to up-convert.

(17) The image processing device according to any of (1) through (16), (18), and (19), wherein the receiving unit receives a first quantization matrix used for up-conversion to a first size, and a second quantization matrix used for up-conversion to a second size larger than the first size, and the up-conversion unit up-converts the first quantization matrix received by the receiving unit in a case where a transform unit is equal to the first size.

(18) The image processing device according to any of (1) through (17) and (19), wherein the up-conversion unit up-converts the second quantization matrix received by the receiving unit in a case where a transform unit is equal to the second size.

(19) The image processing device according to any of (1) through (18), wherein the first size is 16×16, and the second size is 32×32.

(20) An image processing method for an image processing device, including:

receiving encoded data and a quantization matrix, the encoded data being obtained by performing an encoding process on an image, the quantization matrix being limited to a size less than or equal to a transmission size that is a maximum size allowed for transmission;

performing a decoding process on the received encoded data to generate quantized data;

up-converting the received quantization matrix from the transmission size to a size that is identical to a block size, the block size being a processing unit in which dequantization is performed; and dequantizing the generated quantized data using the up-converted quantization matrix, wherein the image processing method is performed by the image processing device.

(21) An image processing device including:

a setting unit configured to set a quantization matrix used for up-conversion from a transmission size that is a maximum size allowed for transmission to a size that is identical to a block size, the block size being a processing unit in which quantized data obtained by quantizing an image is dequantized;

a quantization unit configured to quantize the image using the quantization matrix set by the setting unit to generate quantized data;

an encoding unit configured to perform an encoding process on the quantized data generated by the quantization unit to generate encoded data; and a transmission unit configured to transmit the encoded data generated by the encoding unit and the quantization matrix set by the setting unit, the quantization matrix being limited to a size less than or equal to the transmission size.

(22) The image processing device according to any of (21) and (23) through (25), wherein the transmission size is 8×8, and the quantization matrix set by the setting unit is 8×8.

(23) The image processing device according to any of (21), (22), (24), and (25), wherein the quantization matrix is a quantization matrix used for up-conversion from an 8×8 size to a 16×16 size or a 32×32 size.

(24) The image processing device according to any of (21) through (23), and (25), wherein the quantization matrix is a quantization matrix used for up-conversion to a 32×32 size.

(25) The image processing device according to any of (21) through (24), wherein a coding unit that is a processing unit in which an encoding process is performed and a transform unit that is a processing unit in which a transform process is performed have a layered structure, and the encoding unit performs an encoding process on the quantized data using a unit having a layered structure.

(26) An image processing method for an image processing device, including:

setting a quantization matrix used for up-conversion from a transmission size that is a maximum size allowed for transmission to a size that is identical to a block size, the block size being a processing unit in which quantized data obtained by quantizing an image is dequantized;

quantizing the image using the set quantization matrix to generate quantized data;

performing an encoding process on the generated quantized data to generate encoded data; and transmitting the generated encoded data and the set quantization matrix, the quantization matrix being limited to a size less than or equal to the transmission size, wherein the image processing method is performed by the image processing device.

REFERENCE SIGNS LIST 10 image encoding device, 14 orthogonal transform/quantization section, 16 lossless encoding section, 150 matrix processing section, 152 prediction section, 154 difference computation section, 161 prediction section, 162 difference matrix generation section, 163 difference matrix size transformation section, 164 entropy encoding section, 165 decoding section, 166 output section, 171 copy section, 172 prediction matrix generation section, 181 prediction matrix size transformation section, 182 computation section, 183 quantization section, 191 overlap determination section, 192 DPCM section, 193 exp-G section, 201 quantization matrix restoration section, 202 storage section, 300 image decoding device, 313 dequantization/inverse orthogonal transform section, 410 matrix generation section, 531 parameter analysis section, 532 prediction section, 533 entropy decoding section, 534 quantization matrix restoration section, 535 output section, 536 storage section, 541 copy section, 542 prediction matrix generation section, 551 exp-G section, 552 inverse DPCM section, 553 inverse overlap determination section, 561 prediction matrix size transformation section, 562 difference matrix size transformation section, 563 dequantization section, 564 computation section, 701 quantization matrix size transformation section, 721 quantization matrix size transformation section

The invention claimed is:

1. An image processing device comprising:
circuitry configured to
decode a bit stream including image data and a first 8×8 quantization matrix corresponding to an 8×8 transform unit, a second 8×8 quantization matrix associated with a 16×16 quantization matrix corresponding to a 16×16 transform unit, and a third 8×8 quantization matrix, different from the second 8×8 quantization matrix, associated with a 32×32 quantization matrix corresponding to a 32×32 transform unit to generate quantized image data;
set a 16×16 quantization matrix from the second 8×8 quantization matrix in a case where an inverse orthogonal transform is to be performed using the 16×16 transform unit and set a 32×32 quantization matrix from the third 8×8 quantization matrix in a case where the inverse orthogonal transform is to be performed using the 32×32 transform unit; and
dequantize the generated quantized image data using the set 16×16 quantization matrix or the set 32×32 quantization matrix.

2. The image processing device according to claim 1, wherein the circuitry sets the 16×16 quantization matrix by performing an interpolation process on a matrix element in the second 8×8 quantization matrix.

3. The image processing device according to claim 2, wherein the circuitry sets the 16×16 quantization matrix by performing a nearest neighbor interpolation process on a matrix element in the second 8×8 quantization matrix.

4. The image processing device according to claim 3, wherein
the circuitry dequantizes the generated quantized image data using the set 32×32 quantization matrix.

5. The image processing device according to claim 4, wherein the circuitry sets the 32×32 quantization matrix by performing an interpolation process on a matrix element in the third 8×8 quantization matrix.

6. The image processing device according to claim 5, wherein the circuitry sets the 32×32 quantization matrix by performing a nearest neighbor interpolation process on a matrix element in the third 8×8 quantization matrix.

7. The image processing device according to claim 1, wherein the circuitry dequantizes the generated quantized image data using the first 8×8 quantization matrix in a case where an inverse orthogonal transform is to be performed using the 8×8 transform unit.

8. The image processing device according to claim 7, wherein the first 8×8 quantization matrix, the second 8×8 quantization matrix, and the third 8×8 quantization matrix are included in a picture parameter set of the bit stream.

9. The image processing device according to claim 8, wherein the circuitry is further configured to perform an inverse orthogonal transform on a transform coefficient data obtained by dequantizing the quantized image data, using the 8×8 transform unit, the 16×16 transform unit, or the 32×32 transform unit.

10. An image processing method comprising:
decoding a bit stream including a first 8×8 quantization matrix corresponding to an 8×8 transform unit, a second 8×8 quantization matrix associated with a 16×16 quantization matrix corresponding to a 16×16 transform unit, and a third 8×8 quantization matrix, different from the second 8×8 quantization matrix, associated with a 32×32 quantization matrix corresponding to a 32×32 transform unit to generate quantized image data;
setting a 16×16 quantization matrix from the second 8×8 quantization matrix in a case where an inverse orthogonal transform is to be performed using the 16×16 transform unit and setting a 32×32 quantization matrix from the third 8×8 quantization matrix in a case where the inverse orthogonal transform is to be performed using the 32×32 transform unit; and
dequantizing the generated quantized image data using the set 16×16 quantization matrix or the set 32×32 quantization matrix.

* * * * *